US011853915B1

(12) United States Patent
Wojchouski

(10) Patent No.: US 11,853,915 B1
(45) Date of Patent: Dec. 26, 2023

(54) AUTOMATED SCREENING, REMEDIATION, AND DISPOSITION OF ISSUES IN ENERGY FACILITIES

(71) Applicant: Xcel Energy Inc., Minneapolis, MN (US)

(72) Inventor: Dylan D. Wojchouski, Maple Lake, MN (US)

(73) Assignee: Xcel Energy Inc., Minneapolis, MN (US)

( * ) Notice: Subject to any disclaimer, the term of this patent is extended or adjusted under 35 U.S.C. 154(b) by 0 days.

(21) Appl. No.: 17/980,496

(22) Filed: Nov. 3, 2022

(51) Int. Cl.
 *G06Q 10/0631* (2023.01)
 *G06Q 50/06* (2012.01)
(52) U.S. Cl.
 CPC ........ *G06Q 10/0631* (2013.01); *G06Q 50/06* (2013.01)
(58) Field of Classification Search
 None
 See application file for complete search history.

(56) References Cited

U.S. PATENT DOCUMENTS

| | | | |
|---|---|---|---|
| 5,970,437 A | 10/1999 | Gorman et al. | |
| 7,269,569 B2 | 9/2007 | Spira et al. | |
| 8,606,548 B2 | 12/2013 | Webster et al. | |
| 10,169,743 B2 | 1/2019 | Castel et al. | |
| 11,080,127 B1* | 8/2021 | Vincent | G06N 5/048 |
| 2010/0125528 A1 | 5/2010 | Reddy | |
| 2012/0143564 A1* | 6/2012 | Li | G05B 23/0283 |
| | | | 703/2 |
| 2013/0063264 A1* | 3/2013 | Oktem | G08B 29/02 |
| | | | 706/50 |
| 2017/0308640 A1* | 10/2017 | Brelje | G06F 30/15 |
| 2017/0314961 A1* | 11/2017 | Chen | G06F 17/18 |
| 2020/0075027 A1* | 3/2020 | Arantes | A61B 5/7465 |

(Continued)

OTHER PUBLICATIONS

Peshave, Akshay, et al. "Evaluating Vector Representations of Short Text Data for Automating Recommendations of Maintenance Cases." Oct. 28, 2022. Annual Conference of the PHM Society. vol. 14. No. 1. 2022. (Year: 2022).*

(Continued)

*Primary Examiner* — Sara Grace Brown
(74) *Attorney, Agent, or Firm* — Barnes & Thornburg LLP

(57) ABSTRACT

Disclosed are techniques for evaluating a condition in a CAP report. The techniques can include receiving a CAP report from a computing device, extracting condition evaluation information from the CAP report based on structured and unstructured user-inputted information included in the CAP report to identify details regarding the condition in a regulated facility, retrieving models from a data store, each model being configured to use different portions of the conditions evaluation information to automatically assess different aspects of the condition, applying different portions of the extracted condition evaluation information to each model to generate assessments related to the condition, where each assessment includes a corresponding confidence value indicating a degree of certainty regarding an assessment's accuracy, determining at least one recommendation related to the condition based on the assessments and confidence values, and generating and transmitting output for the condition to the computing device.

25 Claims, 32 Drawing Sheets

(56) References Cited

U.S. PATENT DOCUMENTS

| | | | |
|---|---|---|---|
| 2020/0117903 A1* | 4/2020 | Goel | G06V 10/764 |
| 2020/0241518 A1* | 7/2020 | Poh | G06N 20/00 |
| 2020/0293019 A1* | 9/2020 | Putman | G05B 19/41805 |
| 2021/0264332 A1* | 8/2021 | Pingali | G06N 3/08 |
| 2021/0286604 A1* | 9/2021 | Peccoud | G06F 8/54 |
| 2021/0303867 A1* | 9/2021 | Vaughan | G06V 20/52 |
| 2021/0336979 A1* | 10/2021 | Barkan | H04L 63/16 |
| 2021/0374500 A1* | 12/2021 | Ghosh | G06N 20/20 |
| 2022/0026895 A1* | 1/2022 | Leitch | G06N 20/00 |
| 2022/0113695 A1* | 4/2022 | Liu | G06Q 10/0635 |
| 2022/0120727 A1* | 4/2022 | Al-Dabbagh | G01N 33/2888 |
| 2022/0156667 A1* | 5/2022 | Bellenguez | G06Q 10/06375 |
| 2022/0188181 A1* | 6/2022 | Saha | G06F 9/4881 |
| 2022/0285938 A1* | 9/2022 | Mehta | G05B 13/0265 |
| 2022/0292377 A1* | 9/2022 | Benedetti | G06N 20/10 |
| 2022/0373171 A1* | 11/2022 | Deodhar | F23N 3/002 |
| 2022/0404778 A1* | 12/2022 | Huang | G05B 13/0255 |

OTHER PUBLICATIONS

Sesmero, M. Paz, Agapito I. Ledezma, and Araceli Sanchis. "Generating ensembles of heterogeneous classifiers using stacked generalization." 2015. Wiley interdisciplinary reviews: data mining and knowledge discovery 5.1 (2015): 21-34. (Year: 2015).*

Agarwal, Vivek, et al. Machine Learning and Economic Models to Enable Risk-Informed Condition Based Maintenance of a Nuclear Plant Asset. Mar. 2021, No. INL/EXT-21-61984-Rev000. Idaho National Lab.(INL), Idaho Falls, ID (United States), 2021. (Year: 2021).*

Giuliani, M., et al. "Flaring events prediction and prevention through advanced big data analytics and machine learning algorithms." 2019, Offshore Mediterranean Conference and Exhibition. OMC. (Year: 2019).*

Murari, A., et al. "Stacking of predictors for the automatic classification of disruption types to optimize the control logic." Feb. 17, 2021, Nuclear Fusion 61.3 (2021): 036027. (Year: 2021).*

[No Author Listed], "Automate your CAP screening tasks with AI," Nuclearn, upon information and belief, available no later than Nov. 3, 2022, 1 page.

[No Author Listed], "Automating corrective action programs in the nuclear industry," EPRI, Jun. 2022, 126 pages.

* cited by examiner

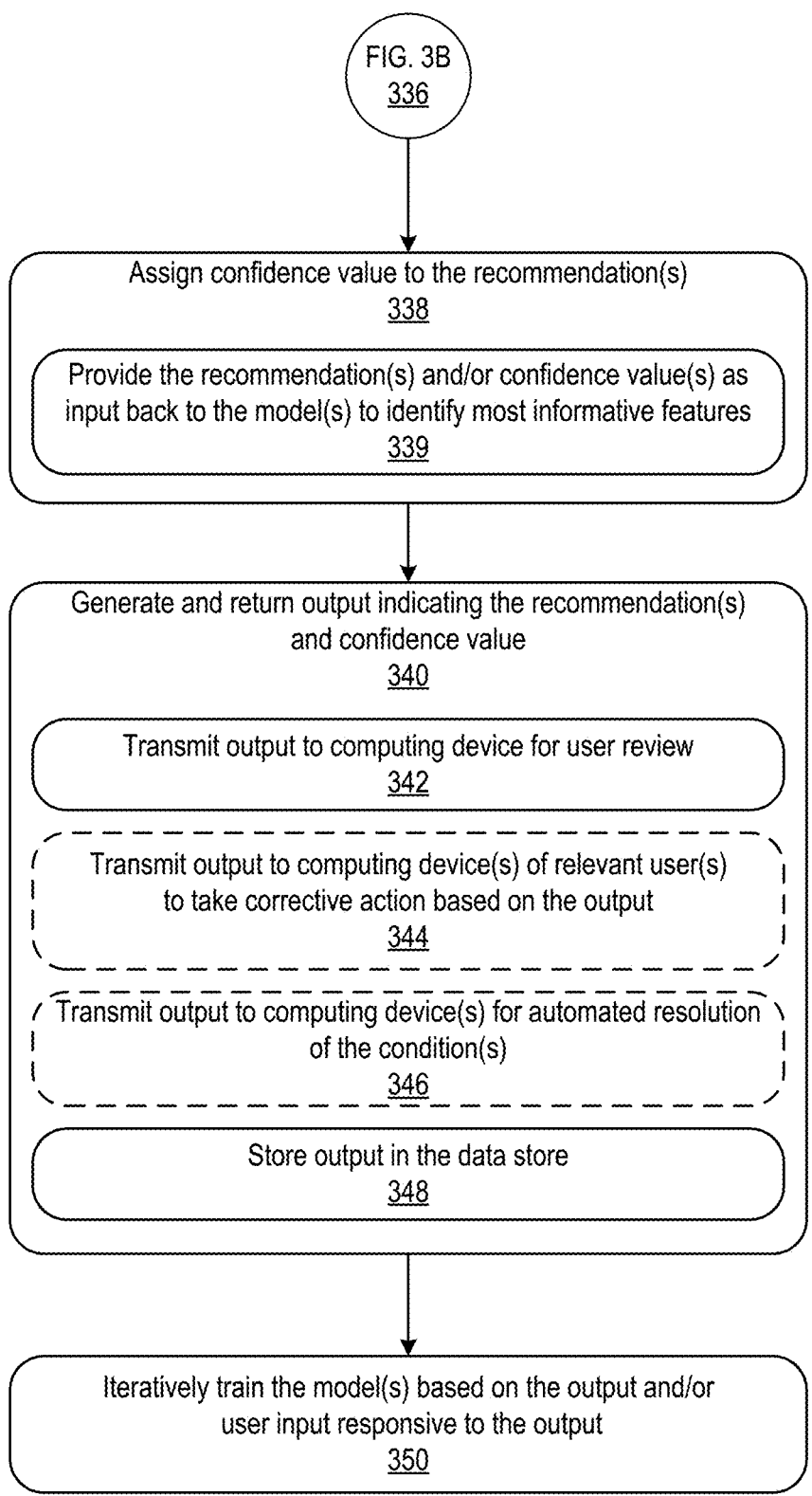

AUTOMATED SCREENING, REMEDIATION, AND DISPOSITION OF ISSUES IN ENERGY FACILITIES

TECHNICAL FIELD

This document generally describes devices, systems, and methods related to automatically screening, remediating, and/or disposing of issues and negative conditions within nuclear and/or other regulated energy facilities that are managed through Corrective Action Program (CAP) systems.

BACKGROUND

Nuclear facilities (e.g., nuclear power plants) and other types of energy facilities have corrective action programs (CAPs) that are used to establish thresholds for identification of negative conditions, or issues, in a facility, screening criteria for determining significance of such conditions, and requirements for developing corrective actions responsive to the conditions. CAPs provide standardized interfaces through which workers in a facility can raise issues and negative conditions within the facility, which may range from non-critical, such as a crack in sidewalk, to critical conditions, such as conditions that may implicate the potentially unsafe operating conditions within the facility. CAPs that have been submitted by workers are routed to relevant administrators and specialists to triage, remedy, and resolve the issues that have been raised in CAP reports. CAPs can include structured and unstructured data fields through which workers are able to submit information, including several text fields that prompt workers to describe and explain the issue that is the source of the CAP. As a result, the same issue submitted by multiple different workers may be described in multiple different ways, using varied vocabulary, phrasing, and grammar, and the manual review of CAPs may similarly vary depending on the human user reviewing the CAP, their experience level, and familiarity with the issues that are described.

SUMMARY

The document generally describes technology for improved CAP systems that are configured to more accurately, consistently, and quickly identify, screen, remediate, and correct negative conditions in a nuclear facility or other regulated facility through unique combinations of trained machine-learning models. As discussed above in the background section, CAP systems have traditionally relied on human actors (e.g., workers in nuclear facilities or other regulated facilities) to triage and resolve negative conditions, and to ensure regulatory compliance. For example, CAP reports can be manually reviewed by humans to identify the negative conditions and prioritize those conditions to receive appropriate attention, which can involve such human reviewers weighing the CAP reports based on a variety of factors, including human-perceived significance of the conditions. Additionally, the human reviewers can assign the CAPs to particular groups, teams, or workers within a facility for resolution, which, although standardized through various guidelines for performing such tasks, can result in variation based on the subjective nature of human review and assessment of issues within nuclear and other regulatory facilities, which can often be quite complex. Although intended to improve compliance with regulatory standards and facility operations optimization, manual review and handling of the CAP reports can be a labor-intensive, resource-intensive, inconsistent, and potentially erroneous process. In contrast, the disclosed technology can improve CAP systems by more accurately, efficiently, consistently, and/or quickly screening, evaluating, remediating, and/or disposing of CAPs by using specific combinations of machine learning models and signals derived from CAP reports to provide better CAP systems.

For example, given the subjective nature of CAP reports based on workers manually submitting reports in unstructured fields (e.g., textual fields to submit narrative of issue) and the subjective nature of the traditional assessment of CAP reports (e.g., human reviewers interpreting CAP reports within complex systems), conventional CAP systems can result in significant variation in how CAP reports for the same issue are triaged and resolved across a broader base of workers within a facility. Such subjectivity and variation can have implications for the safe operation of nuclear and other regulated facilities—potentially resulting in the sub-optimal handling and remediation of issues within facilities that may not fully resolve the root cause of the issue, and which may result in subsequent issues due to the root issue persisting. The disclosed technology is designed to address and remedy the subjectivity and variation that can exist within conventional CAP systems, and to additionally be able to handle significant variation in CAP reports (e.g., variation in manually-entered unstructured data fields) through combinations of machine learning models that are designed to individually assess aspects of CAP reports, and then to be combined to determine appropriate handling and remediation of CAP reports.

The disclosed technology can use multiple machine learning models operating with heuristics that are able to more accurately and consistently mimic a regulatory-required process to correctly screen negative conditions, to identify solutions to such conditions identified in a CAP report, and to ensure regulatory compliance. The models can be used to identify and analyze various signals in the CAP report, such as the presence of particular keywords (e.g., stems, phrases, words), word count in a particular text/input field in the report (e.g., when fewer words are used to describe an issue, it can be inferred that the negative condition in the CAP report is less severe or less critical than if more words are used to describe the condition), trend codes, equipment type, and/or signals related to other CAP reports submitted within a facility, which can be used to determine priority, severity, corrective action, and/or assignment of such actions for the particular negative conditions in the CAP report. The models can generate output indicating recommendations and/or instructions for taking corrective action to address the negative conditions identified in the CAP report. The model output can also be used to continuously train the models to improve identification of negative conditions and corrective actions to be taken. By implementing the disclosed techniques, operations and management of facilities such as nuclear power plants can be efficient and optimized. Additionally, the disclosed technology can automate trend analysis over time, which can provide insights into whether a particular condition in the facility is part of an ongoing negative performance trend or a short-term negative performance spike for the facility. Such trending analysis can beneficially be used by relevant stakeholders for short-term and long-term strategic planning in the facility.

One or more embodiments described herein can include a computing system for assessing conditions in a regulated facility, the system having: one or more processors, and one or more storage devices storing instructions that, when executed by the one or more processors, cause the one or more processors to perform operations including: receiving a corrective action program ("CAP") report from a computing device, the CAP report including structured and unstructured user-inputted information documenting a user-identified condition in the regulated facility, extracting condition evaluation information from the CAP report based on the structured and unstructured user-inputted information included in the CAP report to identify details regarding the condition in the regulated facility, retrieving a group of models from a data store, each of the group of models being configured to use different portions of the conditions evaluation information to automatically assess different aspects of conditions in the regulated facility, applying different portions of the extracted condition evaluation information to each of the group of models to generate a group of assessments related to the condition in the regulated facility, each of the group of assessments includes a corresponding confidence value indicating a degree of certainty regarding an assessment's accuracy, determining at least one recommendation related to the condition in the regulated facility based on the group of assessments and the corresponding confidence values, generating output for the condition that includes the at least one recommendation, transmitting the output to at least the computing device, for presentation in a graphical user interface (GUI) display of the computing device, receiving, from the computing device in response to presentation of the output in the GUI display of the computing device, user input indicating an action to be taken with regard to the condition, and automatically executing the action based on the user input.

In some implementations, the embodiments described herein can optionally include one or more of the following features. For example, extracting condition evaluation information from the CAP report can include applying a model to the CAP report that was trained to identify keywords in one or more data input fields in the CAP report, in which identifying the keywords can include identifying text values in the data input fields that match keywords stored in a dictionary of keywords, the condition evaluation information including the identified keywords. Applying the group of models can include applying the models in series. Applying the group of models can include applying stacking heuristics to determine an order for applying the models to the condition evaluation information. Applying the group of models based on applying the stacking heuristics can include applying the group of models in the following order: applying a maintenance rules model, applying an aging management model, applying a priority model, applying a criticality model, applying a disposition model, and applying an actions model. The group of models can include at least one of a maintenance rules model, an aging management model, a priority model, a criticality model, an evaluation model, a management of change model, a close to actions taken model, a close to trend model, and a maintenance model.

Sometimes, applying different portions of the extracted condition evaluation information to each of the group of models to generate a group of assessments related to the condition in the regulated facility can include: providing a portion of the condition evaluation information as input to a priority model, the priority model having been trained to estimate and assign a priority level for the condition documented in the CAP report, the priority level being at least one of "C" indicating low priority, "uncertain," or "A/B," indicating high priority, the portion of the condition evaluation information including at least: a word count of an issue-notes-text data input field in the CAP report, an indication of item-functions-passive-equipment or item-functions-active-equipment in an item-function data input field in the CAP report, a word count of a condition-text data input field in the CAP report, and a word count of an issue-text data input field in the CAP report, and receiving, as output from the priority model, the assigned priority level as the corresponding confidence value. Applying different portions of the extracted condition evaluation information to each of the group of models to generate a group of assessments related to the condition in the regulated facility can include: providing a portion of the condition evaluation information as input to a condition-adverse-to-quality (CAQ) model, the CAQ model having been trained to estimate and assign a safety risk level for the condition documented in the CAP report, the safety risk level being at least one of "CAQ" indicating a high safety risk, "uncertain," or "NCAQ," indicating a low safety risk, the portion of the condition evaluation information including at least: an indication of item-functions-passive-equipment or item-functions-active-equipment in an item-function data input field in the CAP report, a word count of an operational-notes-text data input field in the CAP report, an indication of whether the condition was reviewed by a senior actor operator (SRO) in a reviewed-by-SRO data input field in the CAP report, and an equipment-type-description in an equipment-type-description data input field in the CAP report, and receiving, as output from the CAQ model, the assigned safety risk level as the corresponding confidence value.

As another example, applying different portions of the extracted condition evaluation information to each of the group of models to generate a group of assessments related to the condition in the regulated facility can include: providing a portion of the condition evaluation information as input to a maintenance (MN/MO) model, the MN/MO model having been trained to assign a maintenance notification recommendation for the condition documented in the CAP report, the maintenance notification recommendation being at least one of "Y" indicating that a notification should be recommended, "uncertain," or "N," indicating that the notification should not be recommended, the portion of the condition evaluation information including at least: a system description in a system-description data input field in the CAP report, an equipment-type-description in an equipment-type-description data input field in the CAP report, a word "ep" in a recommendation-text data input field, and a word count of the recommendation-text data input field, and receiving, as output from the MN/MO model, the assigned maintenance notification recommendation as the corresponding confidence value.

Applying different portions of the extracted condition evaluation information to each of the plurality of models to generate a plurality of assessments related to the condition in the regulated facility can include providing a portion of the condition evaluation information as input to one or more of a management-of-change (MOC) model, a close to trend (CTT) model, a close-to-actions-taken (CTAT) model, an evaluation model, a maintenance-rules-evaluation (MRE) model, an aging model, and/or other models, including all combinations and sub-combinations thereof. Applying different portions of the extracted condition evaluation information to each of the plurality of models to generate a plurality of assessments related to the condition in the regulated facility can additionally include receiving, as output from one or more of the MOC model, the CTT model, the CTAT model, the evaluation model, the MRE model, the aging model, and/or other models, including all combinations and sub-combinations thereof, the assigned change in process recommendation, a CTT recommendation, a CTAT recommendation, an additional evaluation recommendation, an MRE recommendation, an AMP action recommendation, and/or other recommendation, including all combinations and sub-combinations thereof, as the corresponding confidence value.

The MOC model can be trained to assign a change in process recommendation for the condition documented in the CAP report. The change in process recommendation level is at least one of "Y" indicating a recommendation to close to MOC (CTMOC), "uncertain," or "N," indicating a recommendation not to CTMOC. The portion of the condition evaluation information can include at least: a word count of a recommendation-text data input field in the CAP report, a word "repair" in the recommendation-text data input field in the CAP report, a system description in a system-description data input field in the CAP report, and an equipment-type-description in an equipment-type-description data input field in the CAP report.

The CTT model can be trained to assign a CTT recommendation for the condition documented in the CAP report. The condition is identified as a NCAQ condition. The CTT recommendation level can be at least one of "OTHA" indicating a recommendation to take action on the NCAQ condition, "uncertain," or "CTT," indicating a recommendation to not take action on the NCAQ condition. The portion of the condition evaluation information can include at least one of: a system description in a system-description data input field in the CAP report, a word count of a recommendation-text data input field in the CAP report, a word "mn" in an action-text data input field in the CAP report, and a word "g" in an operational-notes-text data input field in the CAP report.

The CTAT model can be trained to assign a CTAT recommendation based on predicting whether the condition documented in the CAP report has already been closed to actions. The CTAT recommendation can be at least one of "Y" indicating that the condition has already been closed to actions, "uncertain," or "N," indicating that the condition has not yet been closed to actions. The portion of the condition evaluation information can include at least one of: a system description in a system-description data input field in the CAP report, a word count of an action-text data input field in the CAP report, a word count of a recommendation-text data input field in the CAP report, and a determination of whether the condition is in-operable and non-functional.

The evaluation model can be trained to assign an additional evaluation recommendation for the condition documented in the CAP report based on determining whether the condition requires additional evaluation, wherein the condition is identified as a CAQ/SCAQ condition. The additional evaluation recommendation can be at least one of "Y" indicating that the additional evaluation is recommended for the CAQ/SCAQ condition, "uncertain," or "N," indicating that the additional evaluation is not recommended for the CAQ/SCAQ condition. The portion of the condition evaluation information can include at least one of: a word count of a recommendation-text data input field in the CAP report, a word count of a condition-text data input field in the CAP report, and a word count of an issue-notes-text data input field in the CAP report.

The MRE model can be trained to assign an MRE recommendation for the condition documented in the CAP report. The MRE recommendation can be at least one of "Y" indicating a recommendation to perform an MRE, "uncertain," or "N," indicating a recommendation to not perform the MRE. The portion of the condition evaluation information can include at least one of: a word count of an operational-notes-text data input field in the CAP report, an indication of whether the condition is occurring on safety-related equipment in a safety-related-equipment data input field in the CAP report, a count of maintenance notifications in a maintenance-notifications-count data input field in the CAP report, and a word count of a condition-text data input field in the CAP report.

The aging model can be trained to assign an Aging Management Program (AMP) action recommendation for the condition documented in the CAP report. The AMP action recommendation can be at least one of "Y" indicating a recommendation to perform an AMP action, "uncertain," or "N," indicating a recommendation to not perform the AMP action. The portion of the condition evaluation information can include at least one of: a word count of a condition-text data input field in the CAP report, a word count of an action-text data input field in the CAP report, an SRO operability determination of operable and functional in an operability-determination data input field in the CAP report, and an equipment-type-description in an equipment-type-description data input field in the CAP report.

Applying different portions of the extracted condition evaluation information to each of the plurality of models to generate a plurality of assessments related to the condition in the regulated facility can include one or more of: determining whether the condition involves at least one maintenance rule and generating the corresponding confidence value above a threshold value based on a determination that the condition involves the at least one maintenance rule; determining aging management data for the condition and generating the corresponding confidence value above a threshold value based on a determination that the aging management data about the condition satisfies aging management criteria; determining a severity value for the condition based on identifying the user-inputted information in a data input field in the CAP report that corresponds to a severity metric; and determining a criticality value for the condition based on at least one of (i) identifying keywords in the condition evaluation information that satisfy keyword criteria and (ii) determining a word count for the user-inputted information in at least one data input field in the CAP report that exceeds a threshold word count; determining one or more corrective actions to be taken in response to the condition in the CAP report, where the corrective actions are determined based on output from at least one of the plurality of models; and determining at least one user to assign the condition or at least one action associated with the condition, including all combinations and sub-combinations thereof. Applying different portions of the extracted condition evaluation information to each of the plurality of models to generate a plurality of assessments related to the condition in the regulated facility can additionally and/or alternatively include determining a severity level based at least in part on the determined criticality value. Determining at least one user to assign the condition or at least one action associated with the condition based on a process can include identifying a role associated with the condition or the at least one action; retrieving roles data from a human resources system for defined roles in the regulated facility; mapping the identified role associated with the condition or the at least one action with a role in the roles data; identifying, based on the roles data and the mapping, a user in the regulated facility to assign the condition or the at least one action associated with the condition; and transmitting a notification to a computing device of the identified user that, when presented in a GUI display of the computing device of the identified user, causes the computing device to display information about the condition, and the role assignment for the identified user.

Automatically executing the action based on the user input can include iteratively training at least one model in the plurality of models based on the user input. Automatically executing the action based on the user input can include assigning actions associated with the condition to one or more groups, teams, or users in the regulated facility and transmitting information representing the assigned actions to computing devices of the one or more groups, teams, or users. Transmitting the output to at least the computing device, for presentation in a graphical user interface (GUI) display of the computing device can cause the computing device to present, in the GUI display, the at least one recommendation for review by a user of the computing device. Transmitting the output to at least the computing device, for presentation in a graphical user interface (GUI) display of the computing device can cause the computing device to present, in the GUI display, instructions to guide a user of the computing device to perform one or more corrective actions in the at least one recommendation.

The devices, system, and techniques described herein may provide one or more of the following advantages. For example, the disclosed technology automates a process to screen for negative conditions in a particular facility, such as a nuclear facility or another regulated facility, and/or a company or other enterprise. The disclosed technology can process a variety of data, both structured and unstructured, that may be included in a CAP report to automatically determine a disposition, priority level, and regulatory impact of the negative condition associated with the CAP report. The disclosed technology can also provide for automatically determining what process(es) is required to correct the negative condition, what actions may be needed to correct the condition, and updating records associated with the disposition of the condition. The disclosed technology therefore may not require human input and/or feedback (or may require less human input and/or feedback) to accurately and efficiently assess and address negative conditions in the facility. Rather, the disclosed technology can reduce potential human error that may arise during a labor-intensive human review of CAP reports as they are generated and submitted.

Moreover, the disclosed technology improves performance of the particular facility for which CAP reports are submitted. Negative conditions can be identified and analyzed in a streamlined process to efficiently determine how to respond to the conditions. Quick and efficient response determination and implementation may also reduce or otherwise eliminate future occurrences of the negative conditions or similar conditions in the facility. The disclosed technology can also reduce operation and management costs to conduct manual reviews of conditions in the facility and manage issues in the facility (e.g., thereby requiring fewer workers to manually manage conditions in the facility), thereby improving and streamlining efficiency and operations of the facility.

As another example, the disclosed technology provides for automating trending and monitoring of negative conditions identified in a particular facility, which may include automatic and efficient flagging of information in CAP reports using trending criteria. The disclosed technology also may automatically evaluate whether the negative conditions are part of an ongoing negative trend of a short-term negative spike in performance, which can further be used to quickly generate response plans to cure the effects of the negative conditions on the facility.

Moreover, the disclosed technology provides a data pipeline that unique synchronizes data across systems, data stores, and services provided in the pipeline in order to maintain data parity throughout the pipeline. The pipeline may also leverage automated monitoring, notification, and diagnostic tools to ensure reliability of the services to detect, identify, and address negative conditions that are reported in CAP reports.

The disclosed technology can leverage various modeling approaches to efficiently and accurately identify negative conditions in facilities, address or mitigate the conditions, and/or determine trends of such conditions and likelihood of future occurrences. For example, predictive (e.g., classification) modeling can be used to determine likelihood that a particular negative condition may occur again in a predetermined amount of time. A machine learning model can be trained with historical data that classifies an activity or issue as an occurrence of a negative condition. Advantageously, predictive modeling can be interpretable and may provide insight into potential causality (e.g., what variables are most predictive of a certain negative condition). Predictive modeling can also provide insight about why certain negative conditions occur. Predictive modeling can further provide frameworks that can be at least partially reused in other classification models. As another example, statistical modeling can be used to predict expected number of occurrences of a particular negative condition over a predetermined amount of time. Statistical modeling can include applying a probability distribution to the historical data to identify likelihood of condition occurrence in the future. Advantageously, statistical modeling can be simple, univariate, and easy to implement, and probability distributions may already fit to screening various keywords provided in CAP reports. As yet another example, forecast modeling (e.g., time-series modeling) can be used to determine how many occurrences of a particular negative condition may occur over a predetermined period of time. Forecast modeling can predict values based on previously-observed values. Forecast modeling can include exponential smoothing and/or decomposition models. Advantageously, forecast modeling is straightforward, interpretable, and easy/lightweight to implement. The modeling can use simple univariate models but may also be adaptive to employ more complex multivariate models having improved predictive capabilities. Forecast modeling can also identify changing relationships over time for accurate trend analysis.

The disclosed technology can be used to identify negative conditions in facilities as well as different types of events or issues in which human performance may be a root cause of the events. Different types of models can be trained and established to assess the different types of events. The models may be used to predict likelihood of particular events occurring in the future (e.g., next week, month, quarter, year, etc.). The models can also be used to establish thresholds for returning to facilities having documented events and working with teams or other relevant users to address, mitigate, or prevent future occurrences of previously documented events. The disclosed technology can therefore be used to provide coaching and improved management of the relevant users to reduce occurrences of events over time.

The details of one or more implementations are set forth in the accompanying drawings and the description below. Other features and advantages will be apparent from the description and drawings, and from the claims.

BRIEF DESCRIPTION OF THE DRAWINGS

FIGS. 3A-C is a flowchart of a process for using machine-learning trained models to evaluate a CAP report and identify corrective action to be taken in response to the evaluation.

FIGS. 7A-J are example GUIs of dashboards for displaying information about a nuclear facility, such as identification and resolution of negative conditions in the facility and trend analysis of conditions over time in the facility.

Like reference symbols in the various drawings indicate like elements.

DETAILED DESCRIPTION OF ILLUSTRATIVE EMBODIMENTS

This document generally relates to techniques for automating and standardizing review and resolution of negative conditions that are identified in CAP reports for nuclear facilities. The disclosed technology can be used to evaluate the negative conditions and determine appropriate assignment or resources, including labor, to address and resolve the negative conditions. The disclosed technology can also provide trend analysis and monitoring of conditions at the facility over time to gauge and improve operations and management of the facility. Although this disclosure is described from the perspective of analyzing and addressing negative conditions and issues in nuclear facilities, the disclosed technology can also apply to other settings, environments, and/or industries, including but not limited to other power and/or energy generation facilities, entities, organizations, and/or companies. For example, the disclosed technology can apply to coal, gas, distribution, security, information technology (IT), and/or finance businesses and systems. The disclosed technology may apply to assessing issues in particular business groups or teams in an organization as well as assessing issues in the organization as a whole. Moreover, the disclosed technology applies to different types of issue-reporting structures in the different facilities, entities, organizations, and/or companies, not just structures that include CAP reports.

Figure 1:
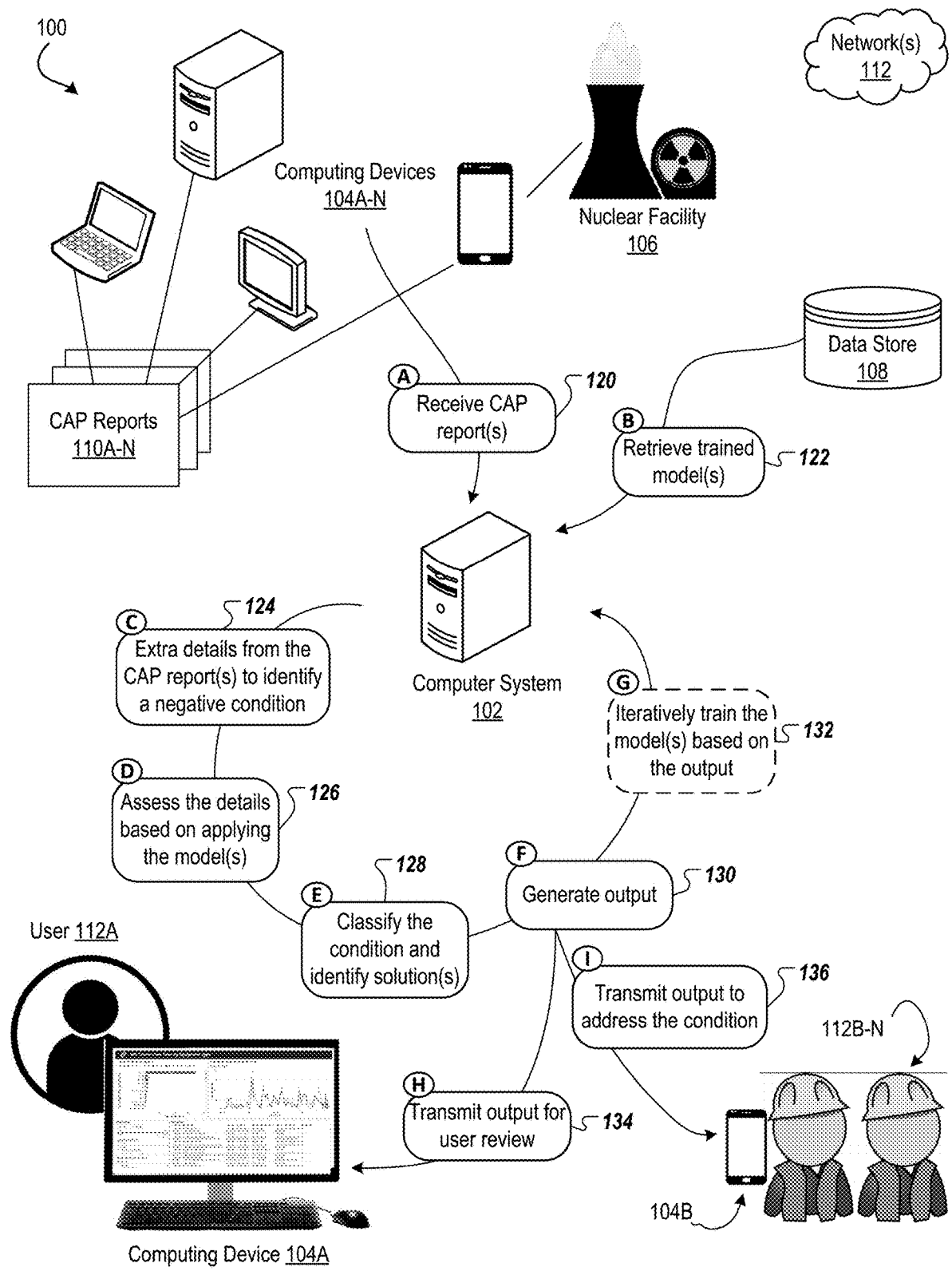
FIG. 1 is a conceptual diagram of a system for evaluating CAP reports for a nuclear facility.

Referring to the figures, FIG. 1 is a conceptual diagram of a system 100 for evaluating CAP reports 110A-N for a nuclear facility 106. A computer system 102, computing devices 104A-N, and a data store 108 can communicate (e.g., wired and/or wireless) via network(s) 112. One or more of the components 102, 104A-N, and 108 can be physically remote from each other, in a same location (e.g., inside or otherwise part of the nuclear facility 106), and/or part of the same computing device or system.

The computing devices 104A-N can be any type of mobile device including but not limited to mobile phones, smartphones, wearable devices, laptops, tablets, and/or computers. The computing devices 104A-N can be utilized by relevant stakeholders in the system 100, such as employees or other workers in the nuclear facility 106, organization and/or management leaders in the nuclear facility 106, or other humans who may be involved in running, managing, and/or auditing the nuclear facility 106 (e.g., auditing the facility for compliance with regulatory standards).

The computer system 102 can be any type of computing device, system, cloud-based system, or network of computing devices. The computer system 102 can be configured to process and analyze CAP reports 110A-N that are generated by users at the computing devices 104A-N to identify negative conditions (e.g., issues) in the nuclear facility 106 and corrective action(s) responsive to the identified conditions. The computer system 102 can also generate trends and monitoring reports of conditions in the nuclear facility 106 over various periods of time. The computer system 102 can analyze and process the CAP reports 110A-N in real-time as the CAP reports 110A-N are generated and transmitted to the computer system 102. The computer system 102 can also analyze and process the CAP reports 110A-N in near-real time (e.g., in batch) at predetermined time intervals (e.g., once a day, once a week, once every couple hours, or any other time interval established for the particular nuclear facility 106). Sometimes, the computer system 102 can be associated with one nuclear facility, such as the facility 106. Sometimes, the computer system 102 can be configured to analyze CAP reports for various different facilities, including but not limited to the nuclear facility 106.

The nuclear facility 106 can be any type of nuclear power plant. The facility 106 can also be another type of energy power plant or regulated facility in which conditions are monitored and reported for corrective action to be taken, as described herein. The facility 106 can be monitored or otherwise required to comply with some regulatory standards to ensure optimized and efficient operations and management, as well as safety of the facility, it's workers, and a surrounding community at large.

The data store 108 can be any type of database, data repository, and/or data lake that can be part of a data pipeline for assessing and identifying negative conditions in the nuclear facility 106 from the CAP reports 110A-N. Although one data store 108 is shown in the system 100, multiple data stores can be used in the data pipeline, where each can be configured to store different information, machine learning models, training data sets, etc. Although the data store 108 is shown as being separate from the computer system 102, in some implementations, the data store 108 can be part of the computer system 102.

Figure 5:
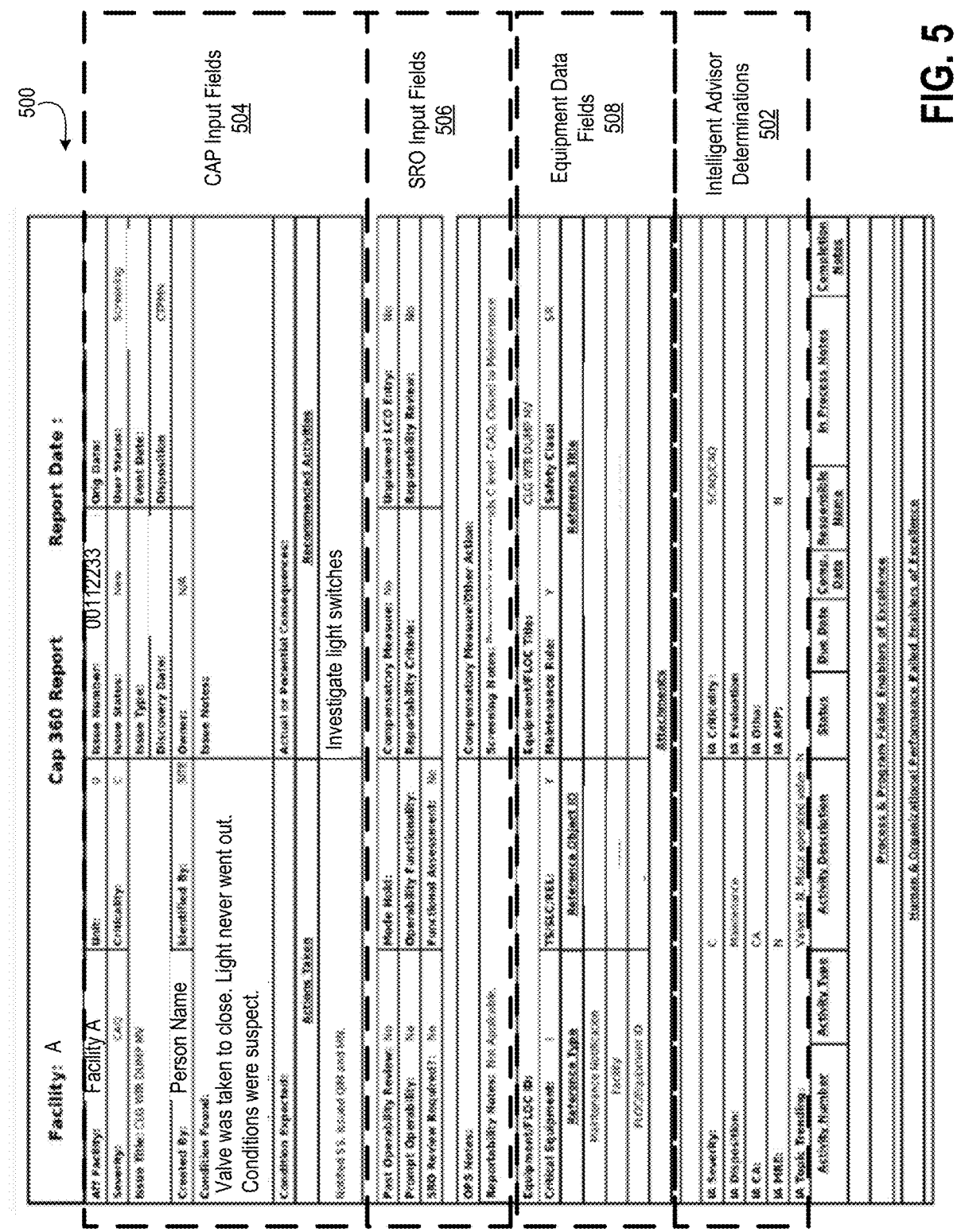
FIG. 5 is an example CAP report for documenting a condition in a nuclear facility.

The CAP reports 110A-N can be forms to be completed by relevant stakeholders in the system 100. More particularly, the CAP reports 110A-N are forms that are used to report and document potential or existing conditions (e.g., negative conditions, issues) in the nuclear facility 106 that require attention and/or corrective action. A relevant stakeholder can fill out input fields in a CAP report at their computing device to provide information about what they identified as a potential issue in the nuclear facility 106. The CAP reports 110A-N can be used to report minor issues, such as broken lightbulbs, but can also be used to report major issues, such as energy leaks. Traditionally, the reports would be reviewed by humans to diagnose conditions in the facility 106, which is a tedious and sometimes erroneous process. The disclosed technology, on the other hand, streamlines a process for reviewing the CAP reports 110A-N and diagnosing issues of different criticality and priority for faster and more accurate corrective action to be taken. Refer to FIG. 5 for an example CAP report.

Still referring to the system 100 in FIG. 1, the computer system 102 can receive the CAP reports 110A-N from one or more of the computing devices 104A-N in block A (120). As mentioned above, the CAP reports 110A-N can include text input fields where users at the computing devices 104A-N input or provide textual data describing conditions in the facility 106. Therefore, the CAP reports 110A-N include structured data (e.g., an input field can prompt the user to enter a date at which the user identified/noticed the condition that they are reporting). Although the reports 110A-N include structured data, the data may not be uniform, which is why the computer system 102 processes and analyzes the reports 110A-N using the disclosed techniques to extract relevant pieces of information for identifying and diagnosing the negative condition in the report.

Figure 2:
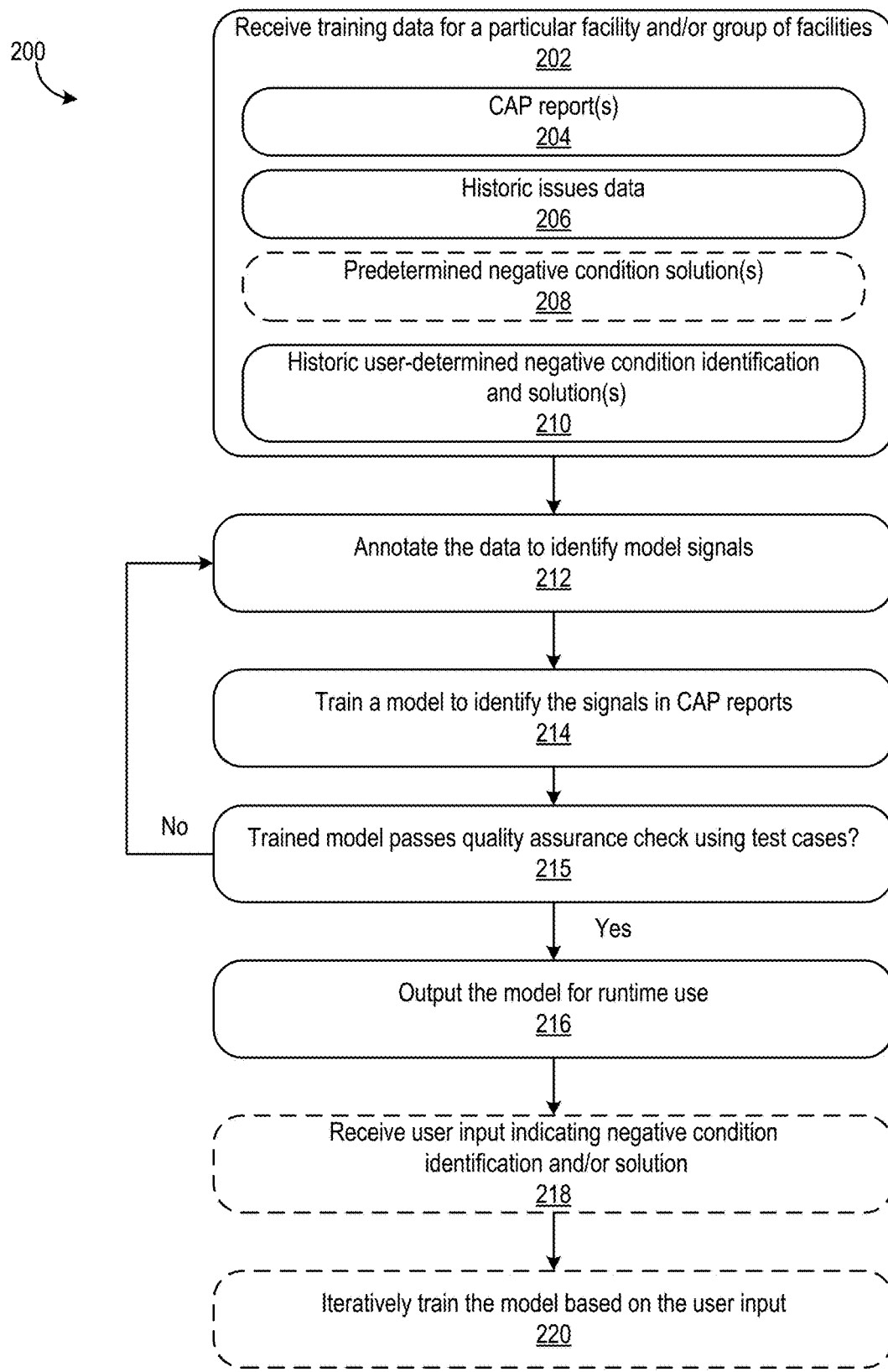
FIG. 2 is a flowchart of a process for training a model to evaluate a CAP report.

The computer system 102 can also retrieve one or more trained models from the data store 108 (block B, 122). Each model can be trained to determine different information about a reported condition that may be useful to identify and take corrective action. The retrieved models can be stacked and/or applied in one or more predetermined orders. Refer to FIG. 2 for further discussion about model training and FIGS. 3-4 for further discussion about runtime execution of the models.

In block C (124), the computer system 102 extracts details from the CAP reports 110A-N to identify a negative condition in the facility 106. The computer system 102 can perform a variety of techniques, such as optical character recognition (OCR) techniques and other data processing techniques, to identify and extract data that was inputted into the reports 110A-N by the users at the computing devices 110A-N. The computer system 102 can, for example, apply one or more rules indicating from which text input fields to extract inputted data. The computer system 102 can also apply one or more of the retrieved models to the CAP reports 110A-N to extract the relevant details.

The computer system 102 assesses the extracted details based on applying the retrieved models in block D (126). As described further in reference to FIGS. 3-4, the computer system 102 can stack the models and apply the models in a particular order. Output from one model can be used as at least one input into another model, for example. Output from one model may also be used to determine which model to apply next, in some implementations. Each model can be trained to process different signals in the extracted details in order to assess and classify the conditions documented in the CAP reports 110A-N. For example, one or more of the models can process information that includes cost of equipment involved in the reported condition, functional location of the reported condition, frequency of condition occurrences in the facility 106 (e.g., on a department or sub-department level), condition type, costs incurred as a result of the condition occurring, etc. Information such as the condition type can be used to determine frequency of the condition and/or predict whether the condition may occur again in the future. As another example, information such as costs incurred as a result of the condition occurring can be used to determine how to prioritize the condition above other conditions to reduce operational and management costs at the facility 106.

As described further in reference to FIGS. 3-4, at least one of the models can be trained to assess word count in the CAP reports 110A-N. The more words that fill one or more input fields in a CAP report, the more likely the reported condition is a serious issue and/or should be prioritized above other reported conditions. For example, a model can be trained to process a "description" input field in which users provide a textual description or summary of the condition in the facility 106. If the condition is minor or otherwise does not have a huge impact on operations and management of the facility 106 (such as a broken lightbulb), then the user may write 1-2 sentences or as shorthand phrase in the "description" input field. When the input in the "description" field is processed by the model, the model can generate output indicating that the word count is less than a threshold count and/or threshold count range, and thus is indicative of a less severe or serious issue in the facility 106. For example, the model can assign a severity, criticality, or priority score to the broken lightbulb that is less than some threshold score value.

As another example described further below, a model can be trained to identify keywords and/or phrases in the CAP reports 110A-N. The model can assess the input fields in the CAP reports 110A-N to identify known keywords/phrases that may be most indicative of a condition subject. The known keywords/phrases can be stored in a dictionary or identified in one or more rules applied by the model. The model can identify words and/or phrases used within text inputs in the CAP reports 110A-N that are specific to different types of conditions, topics, and/or equipment (e.g., the type of equipment associated with a condition can indicate how important or un-impactful the condition may be to safety in the facility 106). The model can identify words and/or phrases corresponding to system types, trend codes, and/or other inputted data that may be helpful in diagnosing the reported condition. The words and/or phrases identified by the model can then be provided as input to another model that is trained to classify the condition (e.g., assign a topic to the condition). Although such keyword processing and analysis can be performed in real-time as the CAP reports 110A-N are received at the computer system 102, the keyword processing can also be retroactively applied to previous CAP reports 110A-N to enable historical trending analysis and anomaly detection of conditions in the facility 106. Moreover, the retroactive application of the keyword processing can be used in conjunction with analysis and processing of "cause" fields in the CAP reports 110A-N to identify developing common causes of certain conditions in the facility 106.

In block E (128), the computer system 102 can classify the condition and identify one or more potential solutions or corrective actions. As mentioned above, the computer system 102 can stack the models to assess the CAP reports 110A-N and appropriately identify and address the reported condition (refer to FIGS. 4A-C). Output from the models can be combined using one or more rules and/or heuristics. Output from each of the models can cause classification of the condition to trend in one or more different directions. For example, a word count in a CAP report "description" field can be less than a threshold count, resulting in a low criticality score being assigned by one model. However, the "description" field can include particular keywords that indicate a severe condition (e.g., a gas leak), resulting in a high severity score being assigned by another model. When rules or heuristics are applied to these two outputs for the particular CAP report, the computer system 102 may determine that the reported condition (the gas leak) should be prioritized over at least some other reported conditions for the facility 106 (e.g., the severity score can be weighted more heavily than the criticality score or otherwise can cause the reported condition to trend towards a higher priority condition.

Figure 3A:
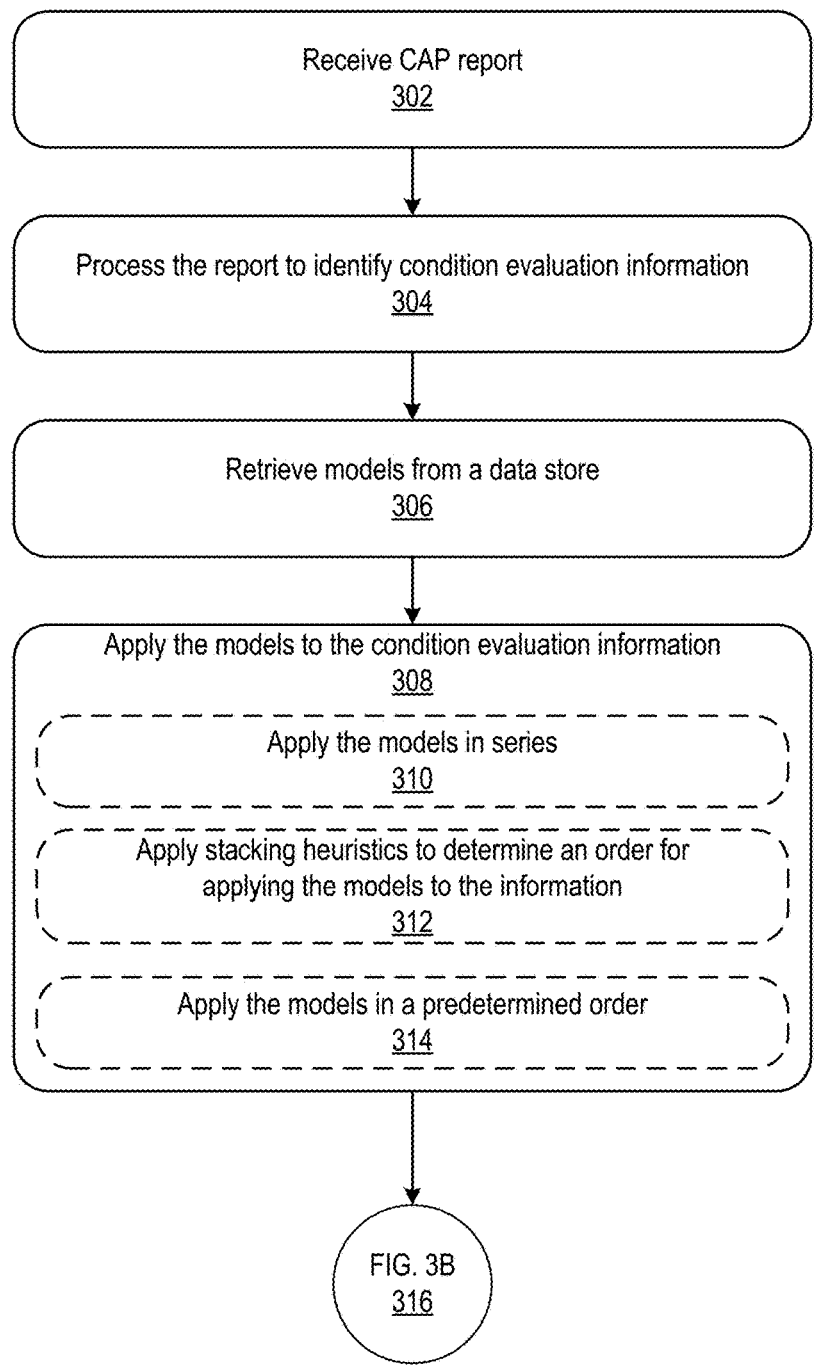
Figure 3B:
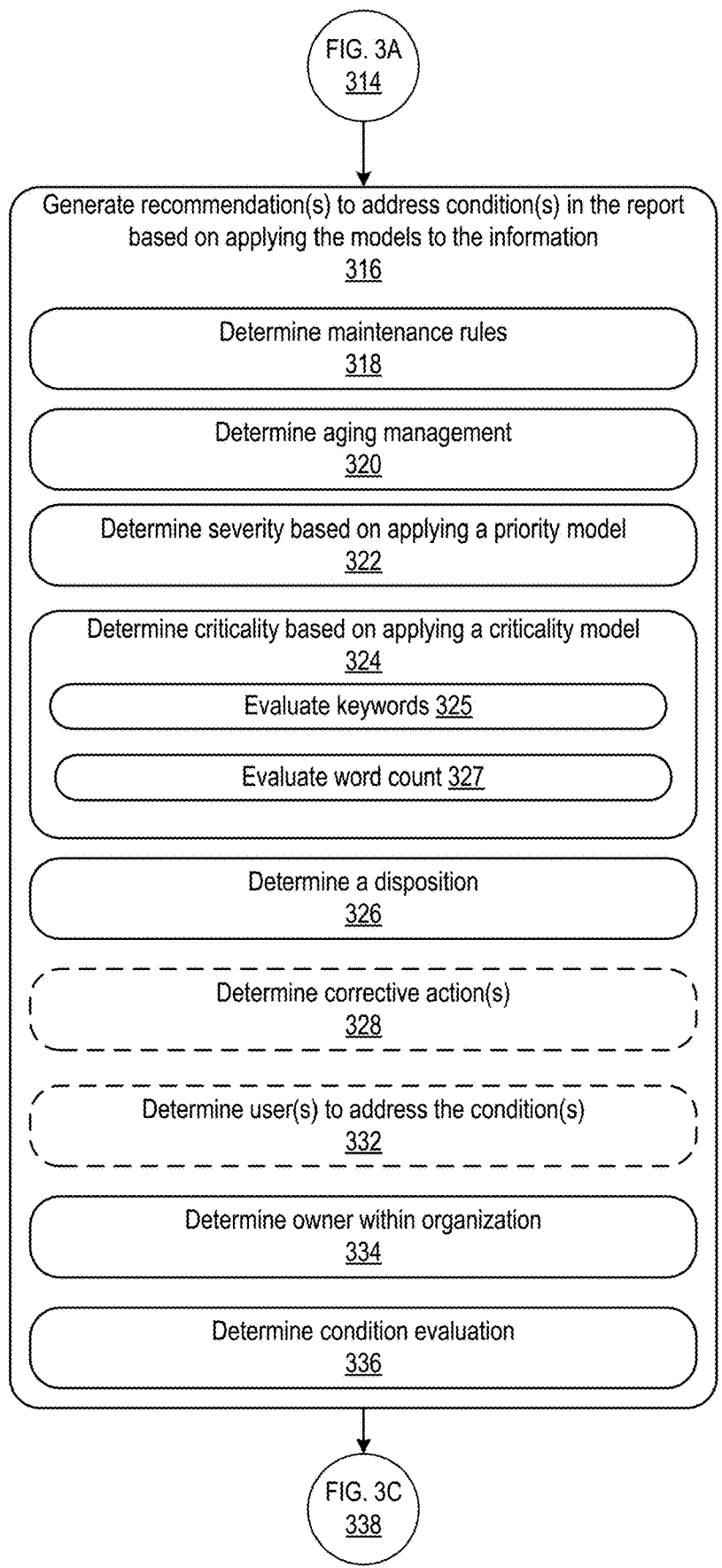

Still referring to block E (128), the computer system 102 can prioritize the condition relative to other identified conditions in the facility 106. The computer system 102 can generate one or more recommendations, solutions, or corrective actions responsive to the condition. The computer system 102 can identify one or more groups, departments, teams, and/or relevant stakeholders (e.g., users) in the facility 106 or associated with the facility 106 for which to assign the corrective actions. Refer to FIGS. 3A-C for further discussion about classifying the condition and identifying one or more solutions.

The computer system 102 can generate output in block F (130). The output can include information identifying and/or classifying the reported condition. The output can include one or more of the identified recommendations, solutions, or corrective actions. The output can include one or more trends and/or historical analyses for the facility 106 that are specific to particular types of conditions, equipment, costs, groups or departments, or other factors, or generic to the overall facility 106 over some threshold period of time.

Optionally, the computer system 102 can iteratively train one or more of the models based on the output (block G, 132). The computer system 102 can also iteratively train the model(s) based on user input that is responsive to any of the output.

Figure 6:
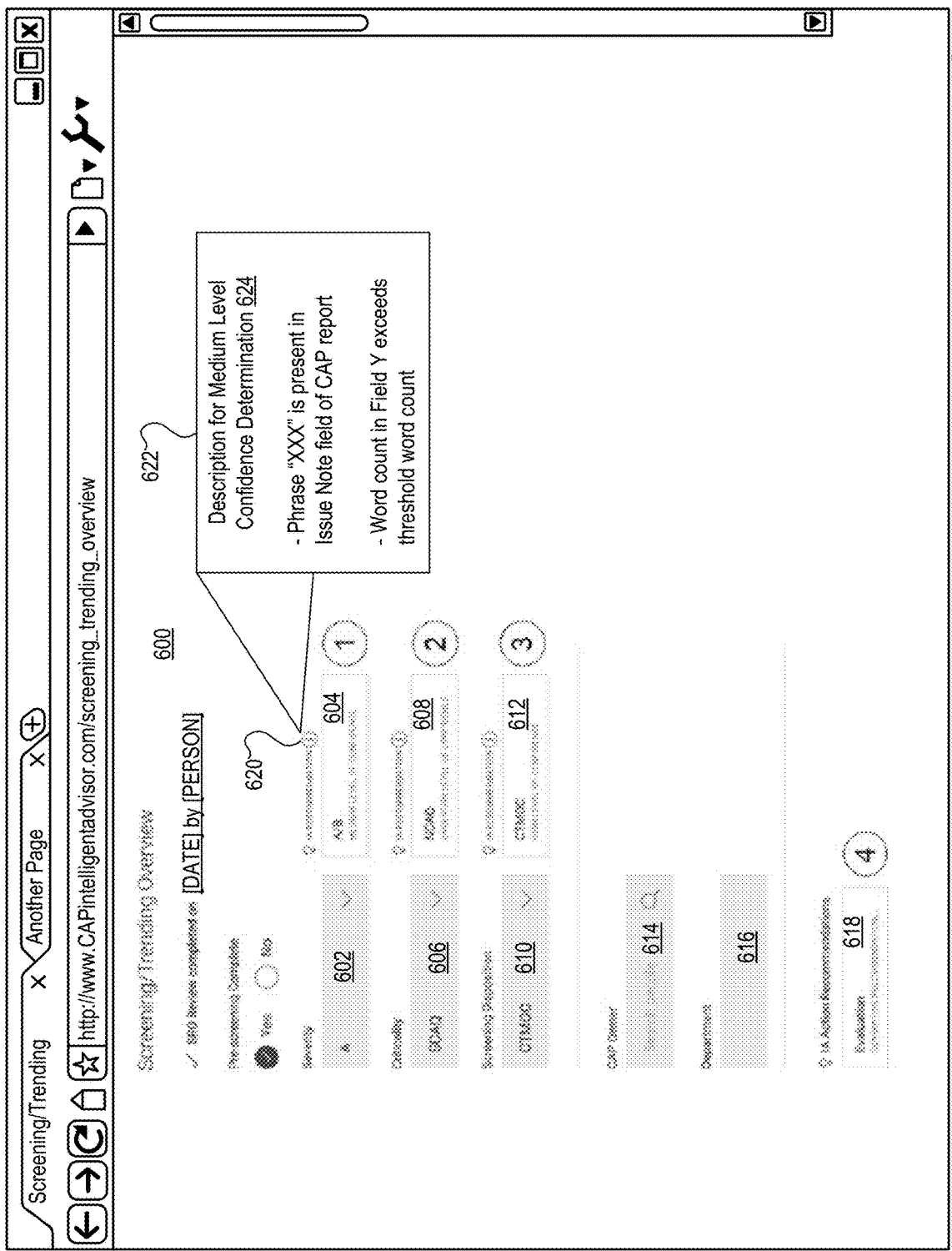
FIG. 6 is an example GUI for screening a condition documented in the example CAP report of FIG. 5.

The computer system 102 can transmit the output to a computing device, such as computing device 104A, for review by a user 112A (block H, 134). By default, for example, the output can be transmitted to the computing device 104A for human review. The user 112A can review the output, such as suggested corrective actions, that is presented in a graphical user interface (GUI) display at the computing device 104A and determine whether the corrective action(s) should be taken. The user 112A can provide user input at the computing device 104A representing approval of the corrective action so that the corrective action can be implemented. As another example, the user 112A can provide user input representing one or more modifications to the corrective action. The user input can be transmitted back to the computer system 102 and used, as described above, to iteratively train one or more of the models (block G, 132). As another example and as described herein, the output can also include trends and/or monitoring analyses of conditions in the facility 106 over time, which can be presented in tables, charts, and/or graphs in the GUI display of the computing device 104A. The user 112A can review this type of output in order to assess performance of the facility 106 and optionally determine one or more operational and/or management corrections to make to improve and optimize the facility 106. Refer to FIGS. 5-7 for further discussion about the output presented at the computing device 104A.

The computer system 102 can additionally or alternatively transmit the output to a computing device 104B of one or more other users 112B-N to address the condition (block I, 136). The users 112B-N can be workers, a department of users, or other types of users who may be tasked with addressing conditions in the facility 106. The output can be presented in a GUI display at the computing device 104B, for example, instructing the one or more users 112B-N on how to resolve or otherwise address the reported condition. The users 112B-N can then take corrective action in the facility 106 to resolve the condition according to the output.

FIG. 2 is a flowchart of a process 200 for training a model to evaluate a CAP report. Although the process 200 is described in reference to training one model, the process 200 can also be performed to train one or more other models, where each model can be trained using different signals and rules to generate different types of output. The process 200 can be performed by the computer system 102. The process 200 can also be performed by one or more other computing systems, devices, computers, networks, cloud-based systems, and/or cloud-based services. For illustrative purposes, the process 200 is described from the perspective of a computer system.

Referring to the process 200, the computer system can receive training data for a particular facility and/or group of facilities in block 202. The training data can be received from a data store (e.g., the data store 108 in FIG. 1). The training data can also be received from one or more other data repositories and/or computing systems that are part of a data pipeline. The training data may include, but is not limited to, CAP report(s) (block 204), historic issues data (block 206), predetermined negative condition solution(s) (block 208), and/or historic user-determined negative condition identification and solution(s) (block 210). The CAP report(s) (block 204) can be previously-completed reports associated with the particular nuclear facility or a group of facilities. The historic issues data (block 206) can include any type of information and/or data that has been generated with respect to issues that occurred in the past in the facility or the group of facilities. The issues can include a variety of negative conditions that were documented, reported, and/or addressed. The historic issues data may also include trend data overtime, which can be used to model negative conditions and determine whether such conditions are a one-time issue or part of a long-term performance issue for the particular facility or group of facilities.

The predetermined negative condition solution(s) (block 208) can include any type of corrective actions, interventions, recommendations, and/or suggestions that have been generated to respond to different types of negative conditions. Such solutions can be generated by relevant stakeholders/users, provided by regulatory agencies, organizations, and/or compliance standards, and/or generating by computing systems like the computer system described herein. Sometimes, the predetermined negative condition solution(s) is not part of the training data. The predetermined negative condition solution(s) can be optional.

The historic user-determined negative condition identification and solution(s) (block 210) can include user-generated review, analysis, and classification of negative conditions that are documented in CAP reports. The information in block 210 can also include corrective actions that are determined by the user and provided to relevant stakeholders to resolve the negative conditions documented in the CAP reports. The information in block 210 may also include assignment of various corrective actions to different entities, groups, stakeholders, and/or departments associated with the facility experiencing the negative condition. In other words, the information in block 210 can include information that has been traditionally generated by humans who manually reviewed CAP reports.

In block 212, the computer system can annotate the data to identify model signals. Sometimes, the data can already be annotated by the computer system, another computing system, and/or one or more relevant users. The model signals can include particular keywords, word counts, issue types, costs, equipment type, etc. The model signals may additionally or alternatively correspond to one or more particular input fields in the CAP reports (e.g., a "description" input field). Keywords indicative of particular types of negative conditions and/or levels of severity, criticality, and/or priority may also be annotated in the received data. Sometimes, different signals can be identified and/or annotated in the training data based on the type of facility (or group of facilities) and/or the intended output of the model to be trained with the training data (e.g., if the model is being trained to determine a severity level of a negative condition documented in a CAP report, certain input fields such as the "description" input field can be annotated in the CAP report, whereas if the model is being trained to identify a type of negative condition documented in the CAP report, certain keywords inputted in various fields in the CAP report can be annotated).

The computer system can train at least one model to identify the signals in the CAP reports in block 214. The model can be trained using the annotations (block 212) and/or the predetermined outcomes (blocks 208-210). For example, a model can be trained to identify particular keywords in the "description" input field in a CAP report. The CAP report(s) received in block 204 can include annotations or labels (e.g., manually inserted by a user and/or automatically generated by the computer system) indicating particular keywords in the CAP report(s) that are indicative of a negative condition, a type of negative condition, a severity of the negative condition, a criticality of the negative condition, and/or a priority of the negative condition. The computer system can then train the model to identify the annotated/labeled keywords in the CAP report. The computer system can also train the model to generate and output a confidence level value indicating a level of certainty that the CAP report includes the particular keywords and/or that the CAP report includes a negative condition having some level of criticality, severity, and/or prioritization. As another example, the computer system can train a model to generate one or more recommended solutions or corrective actions to take based on the annotated predetermined negative condition solution(s) (block 208) and/or the historic user-determined negative condition identification and solution(s) (block 210).

In block 215, the computer system can perform an evaluation on the trained model in which the computer system determines whether the trained model passes quality assurance check(s) using one or more test cases. The test cases can defined by a relevant user in the facility. The test cases can also be determined by the computer system. The test cases can be used to measure accuracy of the model in identifying signals in the CAP reports and/or identifying issues or conditions from the CAP reports. If the trained model does not pass a threshold quantity of the test cases (or all of the test cases, in some implementations), the computer system can return to block 212. The computer system can then iteratively perform blocks 212-214 in the model training process 200 until the model passes the test cases and is ready for runtime deployment. Thus, in block 215, if the model passes the test cases (e.g., a threshold amount of the test cases, all of the test cases), the computer system proceeds to block 216.

The computer system can output the model for runtime use once training is complete (block 216). Outputting the model can include storing the model, such as in the data store 108 described in FIG. 1. Outputting the model can additionally or alternatively include deploying the model at one or more computing systems (e.g., the computer system 102 in FIG. 1) for runtime execution.

Sometimes, the computer system can receive user input indicating negative condition identification and/or solution in block 218. Block 218 can optionally be performed. Block 218 can occur during or after runtime execution of the trained model. Using the user input, the computer system can iteratively train the model in block 220. Block 220 can optionally be performed. The model can be iteratively trained (e.g., improved) whenever the user input is received. The model can additionally or alternatively be iteratively trained at predetermined time periods (e.g., once a day, once a week, once a month, once every couple weeks, etc.). Iteratively training with user input can advantageously fine-tune the model to generate output and outcomes that are more likely to be practiced and/or accepted by the relevant stakeholders in the nuclear facility. Improving the model can also reduce likelihood that a relevant stakeholder would intervene and/or modify a recommendation generated by the computer system during runtime execution of the model. As a result, a process for reviewing and addressing negative conditions in the facility can be streamlined as well as more quickly and efficiently handled.

As an illustrative example of the process 200 in FIG. 2, the computer system can train a model that identifies keywords and another model that uses the identified keywords to map each negative condition or issue in a CAP report to a topic. The computer system can implement a topic modeling pipeline to identify keywords and/or topics that are most indicative of an issues subject in CAP reports. The pipeline can use a variety of inputs, such as issues tables, other issue-identification information, and/or topic mappings (e.g., issue to topic mapping data) to train and generate the models and/or determine what keywords are indicative of issue subjects.

A keyword model can identify key tokens used within text input in the CAP reports that indicate an issue's subject. Based on the keywords, another model can incorporate additional input data (such as equipment types and/or systems identified in or associated with the CAP reports) to identify topics that can be assigned to each issue or negative condition that is identified in the CAP reports. Such automated topic modeling and keyword analysis can be retroactively applied to enable historical trending analysis and anomaly detection, and can also be used in conjunction with analysis of other fields in the CAP reports to identify developing common causes of issues/negative conditions in a particular facility.

The keyword model can implement topic modeling techniques, which can include unsupervised classification of documents to find natural groups of items (e.g., topics). The keyword model can be, in some implementations, a latent dirichlet allocation (LDA) model. The LDA model is a three-level hierarchical Bayesian model in which each item of a collection is modeled as a finite mixture over an underlying set of topics. Each topic can then be modeled as an infinite mixture over an underlying set of topic probabilities. Any other type of topic modeling techniques can be implemented and used for the keyword model. In the example of FIG. 2, the LDA keyword model can be trained to identify keywords that are saved and/or annotated in the CAP reports (block 204). The model can be trained after a preprocessing function is performed in which (i) text fields of a negative condition (e.g., issue) in the CAP reports are lemmatized (e.g., sorting words by grouping variant forms of the same or similar words) and/or (ii) words that appear frequently or infrequently are filtered out. Therefore, the model can be trained to extract meaningful keywords across various different negative conditions that may be documented in the CAP reports. The model can be trained to generate output indicating an issue ID associated with one or more keywords that are extracted from the CAP reports.

As mentioned above, a second model can map the identified keywords from the keyword model to one or more topics for each negative condition. The second model can be a k-nearest neighbor (KNN) model or any other type of supervising machine learning algorithm that can be used for classification schemes. The KNN model can be trained using inputs including the identified keywords from the keyword model. The computer system can generate a matrix including all the keywords that were identified for each negative condition. Sometimes, other data, such as equipment type and/or system type data, can be incorporated into training and/or the matrix. For example, the other data can include a dictionary containing a list of prediction types ordered in priority, a number of predictions to consider, mappings of system locations to topics, and/or information indicating equipment descriptions that may override model topic predictions. The KNN model can use annotated topic labels for historical negative conditions as part of training to improve accuracy of the model in classifying each negative condition as a topic based on the identified keywords and other data incorporated into the training. The KNN model can therefore be trained to generate and output topic predictions for each negative condition documented in the CAPs reports. Sometimes heuristics can be applied and may override the KNN model predictions, such as in scenarios in which a system description or an equipment type may directly determine a topic associated with a particular negative condition.

FIGS. 3A-C is a flowchart of a process 300 for using machine-learning trained models to evaluate a CAP report and identify corrective action to be taken in response to the evaluation. The process 300 can be performed by the computer system 102. The process 300 can also be performed by one or more other computing systems, devices, computers, networks, cloud-based systems, and/or cloud-based services. For illustrative purposes, the process 300 is described from the perspective of a computer system.

Referring to the process 300 in FIGS. 3A-C, the computer system receives a CAP report in block 302. The CAP report can be received directly from a computing device of a user who is documenting and reporting a condition (e.g., negative condition, issue, event, activity) in a particular facility (e.g., nuclear power plant). The CAP report can also be generated at the computing device of the user, stored in a data store (e.g., the data store 108 in FIG. 1), and then retrieved by the computer system at a later time. Sometimes, the computer system can retrieve or receive multiple CAP reports at a time (e.g., a batch of CAP reports) and process each of the CAP reports using the process 300 described herein. Refer to block A in FIG. 1 for further discussion about receiving the CAP report.

In block 304, the computer system can process the report to identify condition evaluation information. The computer system can perform OCR and/or natural language processing (NLP) techniques to identify particular input fields of interest in the CAP report. For example, the computer system can identify "description" input fields, "title" input fields, or other input fields that may be used, by the user, to explain a particular condition in the facility. The computer system can extract text or other values that the relevant user inputted into the particular input fields of interest. The extracted text or other values can be the condition evaluation information. Refer to block C in FIG. 1 for further discussion.

The computer system retrieves models from a data store in block 306. Block 306 can also be performed before blocks 302 and/or 304. For example, the computer system can retrieve at least one model to be used for processing the CAP report, then the computer system can perform block 304 by applying the retrieved model to the CAP report. Refer to block B (122) in FIG. 1 for further discussion.

In block 308, the computer system can apply the models to the condition evaluation information of the CAP report. Various models (e.g., 9 machine learning and/or NLP algorithms/models) can be applied to seamlessly report recommendations for prioritizing and routing each identified condition in the facility to appropriate users or groups of users for remediation. The models can include, for example, a priority model, condition adverse to quality (CAQ) model, evaluation model, management of change (MOC) model, close to actions taken (CTAT) model, maintenance model, close to trend (CTT) model, maintenance rules evaluation (MRE) model, and/or aging management model. These models can be stacked and consolidated to make one or more different types of recommendations to the relevant user(s). Moreover, additional, alternative, or other models can also be generated, trained, and applied to assess conditions that are documented in the CAP report.

Figure 4A:
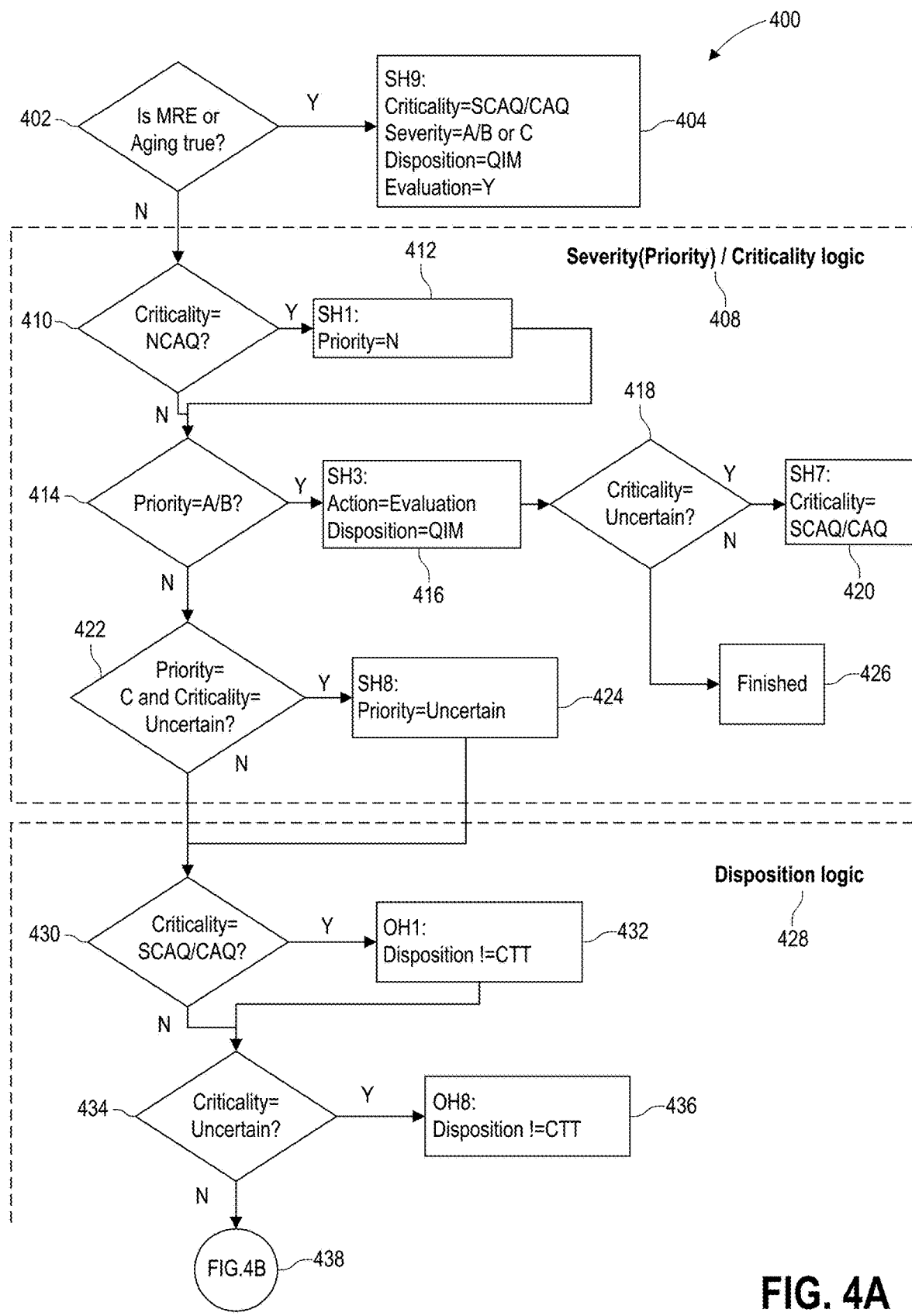
FIGS. 4A-C is a flowchart of a process for applying a plurality of models to a CAP report using stacking heuristics to evaluate the CAP report.
Figure 4B:
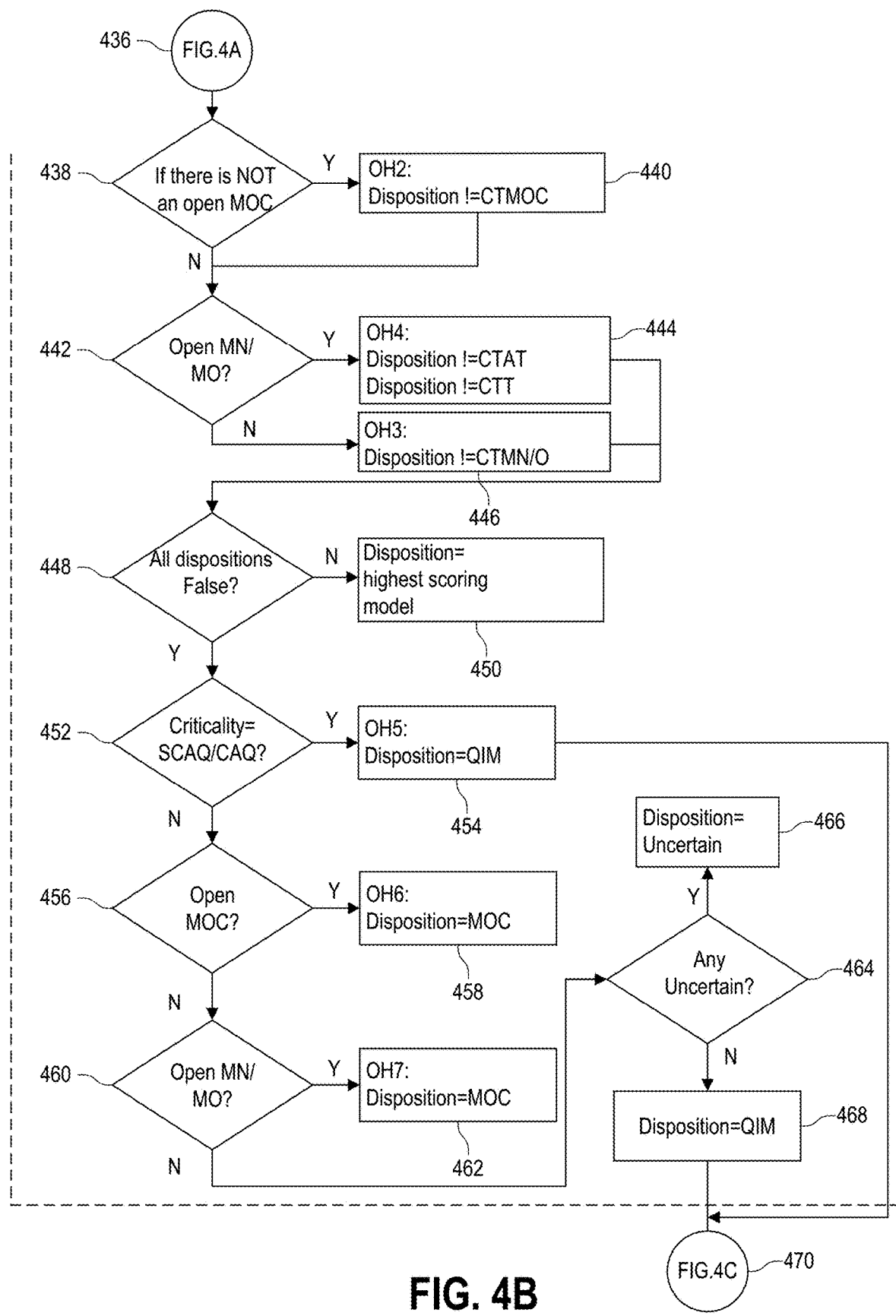
Figure 4C:
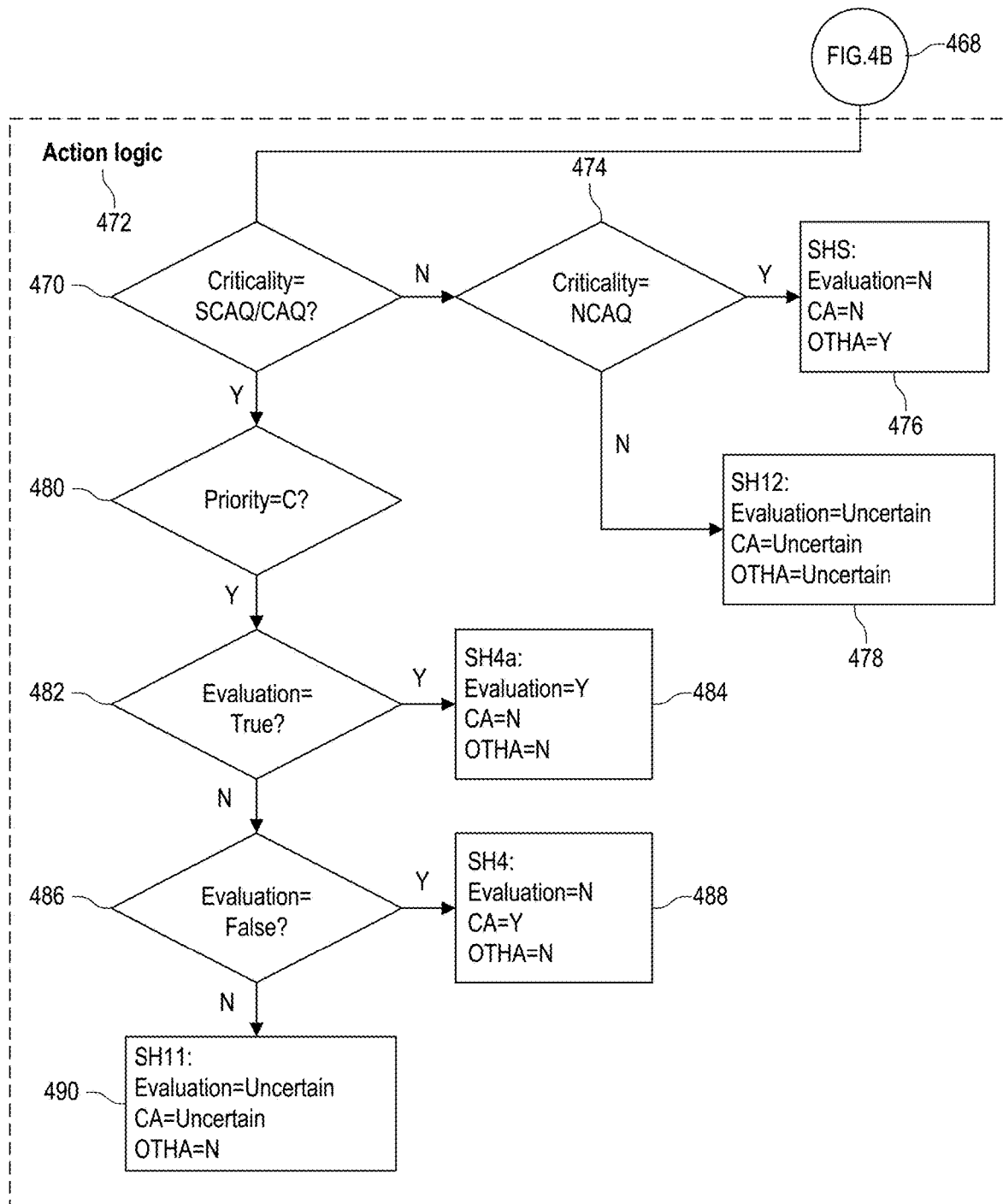

The computer system can optionally apply the models in series (block 310). As a result, output from one model can be provided as input into a next model. Output from one model can also be used to determine which model to apply next to the condition evaluation information (and/or to the output from the previous/preceding model). Additionally or alternatively, the computer system can optionally apply stacking heuristics to determine an order for applying the models to the information and/or which models to apply to the information (block 312). Additionally or alternatively, the computer system can optionally apply the models in some predetermined order (block 314). Refer to FIGS. 4A-C for further discussion about determining an order by which to apply the models to the condition evaluation information.

In block 316, the computer system can generate at least one recommendation to address at least one condition identified in the report based on applying the models to the information. The recommendation(s) can be generated as a combination of one or more outputs from the determinations described with respect to blocks 318-336. For example, the recommendation(s) can include step-by-step instructions to be performed for correcting the condition identified in the CAP report as well as an assignment of the instructions (or subsets of the instructions) to particular users or groups of users associated with the facility. Sometimes, the recommendation(s) can be output from one of the determinations described with respect to blocks 318-336. For example, the recommendation can include a list of corrective actions to be taken in order to resolve the condition identified in the CAP report. A user who receives this recommendation can then determine which users or groups of users associated with the facility should be assigned the list of corrective actions (or at least one of the corrective actions in the list).

The recommendations that can be generated by the computer system include, but are not limited to, severity, criticality, disposition, actions, maintenance rules, and/or aging management. In some implementations, criticality and severity models can be stacked such that criticality is first determined then used to determine severity. Sometimes, where output from a model returns a value of "uncertain," stacking heuristics can be applied to determine how to appropriately stack the models to generate recommendations for the condition identified in the CAP report. Refer to FIGS. 4A-C for further discussion about the stacking heuristics.

As illustrative examples of generating recommendations, the computer system can determine maintenance rules (block 318). The maintenance rules can indicate one or more rules that may be required to comply with per standards. Commitment to maintain equipment in good repair can be part of licensing obligations and other regulatory standards. Therefore, the maintenance model can generate output indicating one or more maintenance rules to be followed and/or one or more maintenance activities to be assigned to the condition. The maintenance model can be trained to identify and analyze data inputted into maintenance rule evaluation input fields in the CAP report. The model can also be trained to generate output indicating whether maintenance rules need to be addressed/followed in association with the particular negative condition and/or whether the maintenance rules have already been addressed.

The computer system can determine aging management (block 320). This means the computer system can determine whether an aging management condition is associated with the condition. Some equipment, for example, may have program requirements relating to aging degradation, which can require inspections and/or surveillance type requirements. The computer system can identify whether the equipment has such requirements and flag the condition accordingly. A model can be trained to identify and analyze data inputted into an aging management program field and/or information inputted into or automatically populated in an equipment field in the CAP reports. The model can generate output indicating yes, no, or uncertain.

The computer system can determine a severity of the condition based on applying a priority model (block 322). Severity can indicate an importance level for addressing the condition. The more important to address the condition (e.g., a gas leak, which can cause health issues amongst workers in the facility, may have a higher importance level than a broken lightbulb in a less-frequented hallway in the facility), the higher severity level. The priority model, for example, can determine the severity level, which can be outputted as, in some implementations, low (e.g., "C"), uncertain ("N"), or high (e.g., "A/B"). The severity level can be determined based on identifying and processing inputted data in a severity field in the CAP report. Criticality determinations may also impact model determinations of severity.

The computer system can determine a criticality of the condition based on applying a criticality model (block 324). Criticality can indicate whether the condition is adverse to quality (e.g., "CAQ"). CAQ, according to regulatory standards, is an all-inclusive term that can be used in reference to any one or more of failures, malfunctions, deficiencies, deviations, defective items, and nonconformance. The CAQ model can therefore determine a criticality level, which, in some implementations, can be "SCAQ/CAQ," uncertain, or "NCAQ." The criticality level can be determined based on identifying and processing inputted data in a criticality field in the CAP reports. Severity determinations may also impact model determinations on criticality.

As described herein, the criticality model can be trained to identify keywords in various input fields in the CAP report (e.g., the condition evaluation information) and determine a criticality/severity of the documented condition based on the identified keywords (block 325). The identified keywords can be mapped to criticality levels in mapping data and/or one or more rules. For example, "gas leak" can be a keyword that is mapped to a high criticality level. As another example, "water leak" can be a keyword that is mapped to a medium or uncertain criticality level. As yet another example, "leak" can be a keyword that is mapped to an uncertain or low criticality level. Various other rules and/or mappings can be used to determine criticality based on identified keywords.

As described herein, the criticality model can be trained to determine the criticality level based on word count (block 327). The model can be trained to determine a word count for particular input fields in the CAP report, such as a "description" input field. The model can then compare the word count to one or more threshold word counts to determine the criticality of the condition identified in the CAP report. For example, a smaller word count (as an illustrative example, less than 10 words) can be indicative of a less severe issue. Accordingly, the computer system can assign a low criticality level. As another example, a large word count (as an illustrative example, more than 100 words) can indicate a more severe issue, so the computer system can assign a high criticality level. The computer system can also combine the word count with one or more other signals (e.g., keyword identification, maintenance rules determination, severity determinations, etc.) to more accurately determine the criticality level.

Although keyword identification (block 325) and word count (block 327) are described in reference to determining the criticality of the identified condition in the CAP report, these techniques and assessments can also be performed to make one or more other determinations described in the blocks 316-336.

The computer system can determine a disposition (block 326). Disposition can indicate what category the particular condition can be closed out to. A model can be trained to analyze and process inputted data in a disposition field in the CAPs report. A disposition determination can also vary based on output from one or more other models, including but not limited to the MOC, maintenance, CTAT, CTT, evaluation, MRE, and/or aging management models. The model can generate output indicating close to management of change (CTMOC), close to maintenance notification or work order (Maintenance), CTAT, CTT, or close to QIM process (QIM, which can be used for any negative condition that requires follow-up actions).

The computer system can optionally determine corrective action(s) (block 328). These actions can indicate what follow up actions may be required to address the condition. The actions may depend on output from one or more models, such as the evaluation, CTT, CTAT, MOC, CAQ, and/or criticality models. In some implementations, a model can be trained to identify and analyze data inputted into various action recommendation fields in the CAP report. The model can also be trained to identify keywords or input in other fields in the CAP report that may be indicative of types of actions that can be taken to address the condition documented in the CAP report. The model can generate output indicating other actions to take, condition evaluations, none (e.g., no actions are needed), uncertain whether actions are needed, and/or corrective actions to take (CAs). Sometimes, block 328 may not be performed if, for example, the condition is closed to actions taken with no corrective actions.

The computer system can optionally determine one or more users to address the condition(s) (block 332). The computer system can apply one or more rules or heuristics to determine what information in the CAP report can be used to direct the corrective action(s) to the best user to address the condition. Using the rules, the computer system can identify a specific role that would be needed to perform the corrective action(s) and then determine which user or users associated with the facility has the specific role (or a similar role). The rules and/or heuristics can be updated automatically and/or manually to reflect changes in roles and responsibilities of users associated with the facility. Advantageously, the disclosed techniques can be used to reduce the need of human intervention in assigning actions to relevant users in the facility. The assignment of actions can therefore be streamlined and performed more efficiently, thereby leading to quicker resolution of the conditions in the facility and optimized operations within the facility. Advantageously, the disclosed techniques can also provide for automatically learning whom to assign corrective actions, which improves operations and efficiency in the facility over time. For example, if the computer system correctly identified a role or responsibility for a given issue and assigned the corrective action to a particular user having that role or responsibility, the computer system can quickly and accurately make the same identification and assignment for future similar corrective actions in the facility. The future identifications and assignments, however, may change based on whether the rules are updated with changes in roles and responsibilities of the users associated with the facility. Sometimes, block 332 may not be performed if, for example, the condition is closed to action and no corrective actions are needed.

To assign the condition to appropriate users (or particular actions associated with the condition to appropriate users), the computer system can establish a connection with a human resources (HR) computing system and retrieve information from the system about the users associated with the facility. The computer system can create/generate roles and/or responsibilities that correspond to each action that may be taken to address the condition(s). The computer system can map those roles and/or responsibilities to existing roles and responsibilities of users that was retrieved from the HR computing system in order to identify to whom to assign the condition and/or particular action(s) associated with the condition.

As an illustrative example, a facility can have 10 strategic engineers, and each engineer can be responsible for a different set of systems in the facility (and thus having different responsibilities than another engineer in the facility). The computer system can identify primary responsibilities that each engineer has based on analyzing the data retrieved from the HR system. Once the computer system identifies each engineer's primary responsibilities, the computer system can automatically determine which engineer's responsibilities are most similar to a role or responsibility that was created for the particular corrective action(s) and assign the corrective action(s) to that engineer.

Sometimes, the computer system can consider additional factors to determine which engineer should be assigned the corrective action(s). As an illustrative example, the identified condition can relate to broken or damaged equipment in the facility. The computer system can apply one or more of the models described herein to determine whether the broken equipment is critical or non-critical (e.g., refer to block 324). If critical, the computer system can determine that the corrective action(s) should be assigned to an engineer having detailed knowledge, responsibility, and/or roles associated with the broken equipment. If non-critical, the computer system can determine that the corrective action(s) can instead be assigned to a component specialist in maintenance (e.g., electrical specialists, mechanical specialists, etc.).

As another illustrative example, the identified condition can be a damaged fire extinguisher. The computer system can determine that a corrective action for this condition is to instruct a relevant user to navigate to the damaged fire extinguisher and check it out. The computer system can also identify that such a corrective action should be performed by a fire marshal associated with the facility. Accordingly, the computer system can pull data from the HR system and identify which users have roles or responsibilities that correspond to a fire marshal role. The computer system can automatically assign the corrective action to a user having that role or responsibilities.

The computer system can determine an owner recommendation (block 334). The computer system can identify a user in the organization for which to assign one or more corrective actions, other types of actions, or the condition documented in the CAP report. For example, the computer system can identify a name of the user for assigning the action(s) and/or condition to automatically tie that action(s)/condition back to the user in the organization.

The computer system can determine a condition evaluation (block 336). The condition evaluation can be used to provide a formal documented cause evaluation for the condition, such as an apparent cause evaluation or a root cause evaluation.

In some implementations, the determinations in blocks 318-336 can be performed in the order presented and described in the process 300. Sometimes, one or more of the blocks 318-336 may not be performed or may be performed in a different order, which can be based on stacking heuristics that are applied to the condition evaluation information. Refer to FIGS. 4A-C for further discussion about ordering the application of the models.

Once the recommendations are generated, the computer system can assign a confidence value to each recommendation (block 338). The confidence value can indicate an accuracy of the recommendation(s) based on certainty, by the computer system, of the dispositions/determinations that are made when evaluating the condition using the disclosed techniques. Sometimes, each recommendation can be one of the determinations in blocks 318-336. The confidence value can be assigned as each determination in blocks 318-336 is made. One or more of the models that are applied to the condition evaluation information may also generate the confidence value as part of generating output in the determinations of blocks 318-336. In some implementations, the recommendation generated in block 316 can be based on a combination of any one or more of the determinations made in blocks 318-336. Accordingly, the confidence values for the determinations can be aggregated to determine an overall confidence value for the recommendation. In some implementations, the computer system can determine the overall confidence value for the recommendation once the determinations in blocks 318-336 are made. The computer system can apply one or more rules, heuristics, weights, and/or models to generate the confidence value in block 338. Example confidence values can include, but are not limited to, "uncertain," "low," "medium," and "high." Numeric, integer, or Boolean values can also be determined for the confidence values. The confidence value can be any other enumerated category, percentage, score, numeric value, and/or string value. The confidence values described throughout this disclosure are merely illustrative examples. Various thresholds can also be set and used to determine the confidence value. The thresholds can vary depending on the type of condition identified in the CAP report and/or any one or more of the determinations made in blocks 318-336.

Sometimes, the computer system can provide the recommendation(s) and/or assigned confidence value(s) as input back to the model(s) to identify most informative features (block 339). As described further in reference to FIGS. 6 and 8B-J, the computer system can identify what features (e.g., word count, presence of one or more keywords and/or trend codes, safety equipment determinations/indications, SRO reports/inputted information) held the most weight in causing the computer system to assign the confidence value(s). Information about the most informative features can be outputted at user devices, as described in reference to FIG. 6.

The computer system can generate and return output indicating the recommendation(s) and/or associated confidence value(s) (block 340). The output may also include explanations for each recommendation and/or each determination described in reference to blocks 316-336. Any of the determinations described in blocks 318-336 can also be returned as part of the output in block 340. Refer to blocks F, H, and I in FIG. 1 and FIGS. 7A-J for additional discussion about generating and returning the output.

The computer system can transmit the output to a computing device for user review (block 342). The user can review the recommendation(s). The user can take one or more actions responsive to the recommendation(s), such as notifying a particular team or group of users to take specific corrective action. The user can also edit the recommendation(s) and/or make an intervention. Any such user inputs can be provided/transmitted back to the computer system and used by the computer system to iteratively train one or more of the models described above (refer to block 350 for further discussion).

Additionally or alternatively, the computer system can transmit the output to computing devices of relevant users to take corrective action based on the output (block 344). The output can include step-by-step instructions for guiding the relevant users to actively address the condition(s) identified in the CAP report. Sometimes, block 344 may not be performed.

Additionally or alternatively, the computer system can transmit the output to one or more computing devices for automated resolution of the condition(s) (block 346). The computing devices can execute instructions, according to the input, that cause the computing devices to perform step-by-step instructions that address the condition(s) identified in the CAP report. Sometimes, block 346 may not be performed.

Additionally or alternatively, the computer system can store the output in the data store (block 348). The output can later be retrieved and transmitted to one or more of the computing devices described herein. The output can later be retrieved and used for iteratively training one or more of the models described above.

Any of the output that is transmitted to the computing devices can be presented in GUI displays at the computing devices. The output can include the recommendation(s) made by the computer system. Sometimes, the relevant user can hover over or click on the outputted recommendation(s) to view additional information about the recommendation(s). The additional information can include, for example, determined confidence values, and/or factors that caused the computer system to generate the recommendation(s) and/or assign the confidence level to the recommendation(s) (e.g., word counts, identification of keywords in the CAP report).

The computer system can also iteratively train the model(s) based on the output and/or user input responsive to the output (block 350). The user input can be provided by the relevant user(s) at one or more of the computing devices described in reference to blocks 340-348 (block 350). Comparing the user input with the model output can advantageously enhance accuracy of the model determinations during future runtime execution. As a result, the models can generate output that is more aligned with expected actions or reactions of the relevant users associated with the facility. Iteratively improving the models can streamline the process for efficiently assessing CAP reports, identifying conditions documented in the CAP reports, and addressing those conditions.

FIGS. 4A-C is a flowchart of a process 400 for applying a plurality of models to a CAP report using stacking heuristics to evaluate the CAP report. As described above, the process 400 can be performed to determine an order by which to apply the models to information in the CAP report in order to identify, diagnose, and address negative conditions (e.g., issues) documented in the report. The process 400 can be performed by the computer system 102. The process 400 can also be performed by one or more other computing systems, devices, computers, networks, cloud-based systems, and/or cloud-based services. For illustrative purposes, the process 400 is described from the perspective of a computer system.

Referring to the process 400 in FIGS. 4A-C, when a model outputs a value, such as a certainty value, of "uncertain," stacking heuristics may be used to determine an order to apply the models to the CAP reports. The heuristics can be retrieved, by the computer system, from a data store and can be represented by a set of rules, as shown in the process 400. The heuristics can be applied in the following order of importance: maintenance rules and aging management, then severity (priority) and criticality, then disposition, and then actions (e.g., corrective actions, other actions, no actions). One or more other orders of importance may be defined for a particular facility or group of facilities.

In the example of the process 400 in FIGS. 4A-C, the heuristics are first applied for maintenance and aging management determinations. The computer system can determine whether, after applying maintenance rules and aging management models to condition evaluation information in the CAP report, the models outputted a value of "true" (block 402). Refer to blocks 318 and 320 in the process 300 of FIGS. 3A-C for further discussion. If the outputted value is true, then the computer system generates and return output values in block 404. For example, in block 404, the computer system can determine that criticality for the condition documented in the CAP report is SCAQ/CAQ, severity is AB or C, evaluation is yes, and disposition is QIM. Refer to the process 300 in FIGS. 3A-C for further discussion about determining criticality, severity, evaluation, and disposition.

If the output in block 402 is not true, then the computer system executed severity (priority) and/or criticality logic (block 408) by applying a priority model and/or a criticality model to the information in the CAP report. Refer to blocks 322, 324, 325, and 327 in the process 300 of FIGS. 3A-C for further discussion. The computer system can determine whether the criticality model returns a value of NCAQ in block 410. If NCAQ is returned, the computer system can assign a priority value of No (meaning no priority) (block 412). The computer system then proceeds to block 414.

If NCAQ is not returned in block 410, the computer system proceeds to block 414 in which a determination is made whether the priority model returns a value of A/B. If the priority value is A/B, then the computer system determines that the action is "evaluation" and the disposition is QIM (block 416). The computer system can then determine whether the criticality model returned a value of "uncertain" in block 418. If "uncertain" was returned and the priority is A/B, the computer system assigns the criticality a default value of CAQ/SCAQ with a confidence value from the priority model (block 420). If the criticality is not "uncertain" in block 418, then the computer system can stop the process 400 (block 426) and return the criticality value, priority value, action value, and disposition value described above (see blocks 410, 414, and 416).

Referring back to block 414, if the computer system determines that the priority value is not A/B but the priority value is C and the criticality value is "uncertain," (block 422), the computer system can assign the priority value of "uncertain" in block 424 (since the computer system cannot determine whether the priority is in fact C or no priority), then proceed to block 430, discussed below.

If the priority value is not C and the criticality value is not uncertain in block 422, the computer system proceeds to disposition logic (block 428) by applying at least one model (e.g., a disposition model) to the condition evaluation information identified in the CAP report. Refer to block 326 in the process 300 of FIGS. 3A-C for further discussion. In the disposition logic (block 428), the computer system uses heuristics specific to disposition classifications.

For example, the computer system determines whether the criticality value is SCAQ/CAQ in block 430. If yes, then the computer system assigns the disposition value as not being CTT (block 432). The computer system then proceeds to block 434. If, on the other hand, the criticality value is not SCAQ/CAQ in block 430, the computer system determines whether the criticality value is uncertain. If yes, the computer system assigns the disposition value as not being CTT (block 436), then proceeds to block 438 described below. If no, then the computer system proceeds to block 438 without assigning the disposition value.

In block 438, the computer system determines if there is no open MOC referenced on the CAP report. If there is not an open MOC, then the computer system assigns the disposition value as not being CTMOC (block 440), then proceeds to block 442. If there is an open MOC, then the computer system proceeds directly to block 442.

In block 442, the computer system determines whether there is an open maintenance notification (MN) and/or maintenance order (MO) (MN/MO) referenced on the CAP report. If there is an open MN/MO, the computer system assigns the disposition value as not CTAT and not CTT (block 44), then proceeds to block 448. If there is no open MN/MO, then the computer system assigns the disposition value as not CTMN/CTMO (block 446), then proceeds to block 448.

In block 448, the computer system determines whether all determined dispositions for the CAP report are false. If no, then the computer assigns and returns the disposition value as the highest scoring model output (block 450).

If all the disposition values are false in block 448, the computer system can determine whether the criticality value is SCAQ/CAQ (block 452). If the criticality value is SCAQ/CAQ and the disposition value is "uncertain," then the computer system can automatically update the disposition value to QIM (block 454). Sometimes, the computer system may also automatically update the value for at least one of evaluation, corrective action, or other actions to a value of "yes." The computer system then proceeds to block 470.

If, in block 452, the criticality is not SCAQ/CAQ, the computer system determines whether there is an open MOC referenced in the CAP report (block 456). If yes (and/or any of the following values are also identified: C and/or No for priority, "uncertain," or QIM), then the computer system updates and returns the disposition value as MOC (block 458). If there is no open MOC, then the computer system proceeds to block 460.

In block 460, the computer system determines whether there is an open MN/MO in the CAP report. If yes, then the computer system updates and returns the disposition value as MOC (block 462). If there is no open MN/MO, the computer system determines whether there is a value of "uncertain" in block 464. If there is a value of "uncertain," the computer system updates and returns the disposition value as "uncertain" (block 466). If there is no "uncertain" value for disposition in block 464, then the computer system assigns the disposition value of QIM (block 468) and proceeds to block 470.

Beginning with block 470, the computer system performs action logic (block 472) by applying one or more action models to the condition evaluation information identified in the CAP report. In some implementations, the action logic (block 472) may only be run if the disposition value is QIM. A rule can be defined indicating that actions may not overwrite dispositions. Therefore, in the action logic 472, only one action can be defined with a value of "yes." If the disposition value is QIM, then the action can be defined as one of evaluation, corrective action, or other action. If the disposition value is not QIM, then all actions (e.g., evaluation, corrective action, other actions) may be assigned a value of "no" (indicating that no actions are needed).

Referring to the action logic (block 472), in block 470, the computer system can determine whether the criticality value is SCAQ/CAQ. If the criticality is not SCAQ/CAQ but is NCAQ (block 474), the computer system assigns and returns the evaluation value as "no," the corrective action value as "no," but the other action value as "yes," meaning other action may be required (block 476). If the criticality is not NCAQ (block 474), then the criticality is uncertain and the computer system assigns and returns "uncertain" for all the actions (evaluation, corrective action, and other action) (block 478).

If the criticality value is SCAQ/CAQ in block 470, the computer system determines in block 480 whether the priority value is C. If the priority value is C, the computer system determines whether the evaluations value is identified as "true" (e.g., an applicable evaluation type action is assigned to the condition) in block 482. If the evaluations value is "true" (priority is A/B), the computer system assigns and returns the evaluation value as "yes," the corrective action value as "no," and the other action value as "no" (block 484). If the evaluations value is false (criticality is SCAQ/CAQ and priority is not "no") (block 486), the computer system assigns and returns the evaluation value as "no," the corrective action value as "yes," and the other action value as "no" (block 488). If, on the other hand, the evaluation value is not false in block 486 (the evaluation is neither true nor false so it is uncertain), then the computer system assigns and returns the evaluation value as "uncertain," the corrective action value as "uncertain," and the other action value as "no" (block 490). If, for example, the criticality value is SCAQ/CAQ and the priority value is C, then the evaluation model may be executed in order to determine one or more actions to take.

FIG. 5 is an example CAP report 500 for documenting a condition in a nuclear facility. Although the CAP report 500 is described in reference to a nuclear facility, similar reports can also be used for documenting conditions in a variety of different types of energy facilities and regulated facilities. The CAP report 500 can be presented in a GUI display of a computing device of a relevant user. Refer to FIG. 1 for further discussion about presenting the CAP report. Some CAP reports can include additional or fewer data fields where the relevant user in the nuclear facility can input text, string, Boolean, integer, or numeric values. The CAP report 500 includes various different data fields, including data fields that can be completed by a relevant user filing the CAP report 500, data fields that can be completed by a senior actor operator, SRO, (who may or may not be the same as the user filing the CAP report 500), data fields that are auto-populated by a computer system described herein based on information, such as an equipment ID, that is provided by the user filing the CAP report 500, and/or data fields that are auto-populated by condition determinations made using the disclosed techniques.

The example CAP report 500 in FIG. 5 includes CAP input fields 504 (which can be completed by the user filing the CAP report 500), SRO input fields 506, equipment data fields 508, and intelligent advisor determinations 502. The CAP input fields 504 can include but are not limited to facility name/title, report date, unit, severity, criticality, issue title, report created by, issue identified by, description of condition(s) found, condition expected, actions taken, recommended activities, and/or issue notes. Any one or more of information inputted into the CAP input fields 504 can be used by the computer system 102 described herein to evaluate a condition or conditions in the facility.

The SRO input fields 506 can include but are not limited to OPS notes, reportability notes, compensatory measure/other action, and/or screening notes. Any of the information inputted into the input fields 506 can be used by the computer system 102 to evaluate the condition or conditions in the facility.

The equipment data fields 508 can include input fields for equipment or functional location (FLOC) ID and/or equipment or FLOC title. The user filing the CAP report 500 (and/or the SRO) can input such information. Once this information is inputted, the computer system 102 described herein can retrieve other information about the equipment or FLOC from a data store. The other information that is retrieved can then automatically be populated in the CAP report 500 and used by the computer system to evaluate the condition or conditions in the facility. The other information that is retrieved can include, but are not limited to, whether the equipment is critical, whether maintenance rules are associated with the equipment, a safety class, and other reference information associated with the equipment and/or the FLOC.

The user can provide input into any combination of the abovementioned data fields 504-508. Sometimes, the user may be required to, or prompted by a notification presented in the GUI display with the CAP report 500, complete or fill in one or more particular data fields listed above, such as an equipment ID in the equipment data fields 508. The computer system 102 described throughout this disclosure can process the data inputted by the user into the CAP report 500 in order to identify and diagnose a negative condition in the facility and provide recommendations for addressing the negative condition.

Accordingly, the CAP report 500 can include the intelligent advisor determination section 502, which may include any one or more of the determinations made by the computer system 102 based on processing the data provided in the CAP report 500 (refer to FIGS. 3-4). For example, the section 502 can include, but is not limited to data fields for the following: severity, criticality, disposition, evaluation, corrective action, other action, maintenance rules, aging management, and/or topic trending. Additional or fewer data fields can be presented in the section 502. In some implementations, the information described in reference to the section 502 can be presented in another GUI interface at the computing device of the relevant user, instead of being presented in the CAP report 500 shown in FIG. 5.

FIG. 6 is an example GUI 600 for screening a condition documented in the example CAP report 500 of FIG. 5. The GUI 600 can be presented in a web interface, web application, or mobile application at a computing device of a relevant user (refer to FIG. 1). The user can provide input at the GUI 600 in order to view one or more recommendations or determinations that were made by the computer system 102 using the techniques described herein (refer to FIGS. 3-4). For example, the user can provide input in at least one of data fields 602, 606, 610, 614, and 616, which, when transmitted to the computer system 102, causes the computer system 102 to generate output for presentation by the computing device in data fields 604, 608, 612, and/or 618. Generating the output to present in the data fields 604, 608, 612, and/or 618 can include retrieving any of the determinations that are made by the computer system 102 when processing the CAP report 500 (refer to FIGS. 3-4).

In the example GUI 600 of FIG. 6, the user selects, from a drop down menu of the data field 602, a severity value of A (e.g., confidence value, confidence level), indicating that the user believes the condition documented in the CAP report 500 in FIG. 5 has a severity value of A. The computer system 102 returns, for presentation by the computing device in the data field 604, the computer-determined severity value based on processing the CAP report 500. The data field 604 indicates a severity value of A/B. The data field 604 also indicates that the computer system 102 has "medium" level of confidence in making the A/B determination for severity. The user can hover over graphical element 620 (e.g., a circle with an "i") in order to view additional information about why the computer determined the severity level, or confidence level, shown in the data field 604. As shown in FIG. 6, by hovering over the graphical element 620, a pop-out window 622 can be presented in the GUI 600 including a description 624 for the computer-determined severity value (the confidence level). The description 624 can indicate which features or factors were most predictive in determining and generating, by the computer system 102, the severity value for the CAP report. Moreover, as described in reference to the process 300 in FIGS. 3A-C, the severity value determined by the computer system 102 can be fed back into a model that was applied by the computer system 102 to determine the severity value so that the computer system 102 can identify which feature(s) is most indicative of the determined severity value. The identified feature(s) can then be presented, by the computer system 102, in the description 624 in the pop-out window 622. For illustrative purposes, the description 624 indicates that the medium level confidence determination was made because (1) a phrase "XXX" appeared in an issue note field in the CAP report and (2) a word count in a field Y in the CAP report exceeds some threshold word count. Refer to FIGS. 8A-J for further discussion about determining confidence levels/values using models and determining or identifying features most indicative of the determined confidence levels/values. Additionally, although the description 624 in the pop-out window 622 is described in reference to the data field 604, descriptions about determining confidence levels/values are also presented in pop-out windows for the data fields 608 and 612 when the user hovers over graphical elements like the graphical element 620 for each of the data fields 608 and 612.

As another example, the user selects, from a drop down menu of the data field 606, a criticality value of SCAQ. The computer system 102 returns, for presentation by the computing device in the data field 608, the computer-determined criticality value based on processing the CAP report 500. The data field 608 indicates a criticality value of NCAQ and an "uncertain" level of confidence in making the NCAQ determination for criticality. Although the user believes that, based on their manual review of the condition, the criticality is SCAQ, the computer system's determination is uncertain. Sometimes, the user-determined criticality value of SCAQ can be used by the computer system 102 to iteratively train and update a model that determines the criticality value. As a result, the model can be improved such that it determines a criticality value that aligns with the user-determined criticality value for similar or same conditions, rather than a criticality value that the computer system 102 is uncertain about. As mentioned above, additional information about how the criticality value was determined and/or what features were most indicative of the determined criticality value can be presented in a pop-out window in the GUI 600.

As yet another example, the user selects, from a drop down menu of the data field 610, a disposition value of CTMOC. The computer system 102 returns, for presentation in the data field 612, the computer-determined disposition value of CTMOC and a "high" level of confidence in this determination. Thus, the computer-determined disposition value confirms the user's manual assessment of the disposition value. As mentioned above, additional information about how the disposition value was determined and/or what features were most indicative of the determined disposition value can be presented in a pop-out window in the GUI 600.

Moreover, the user can begin typing into the data field 614 in order to search CAP reports that are assigned to, owned, or generated by one or more relevant stakeholders associated with the facility. As another example, the user can type into or select from the data field 616 a department name.

As shown in the GUI 600, the data field 618 can also be presented to the user with one or more action recommendations that have been determined by the computer system 102 using the disclosed techniques. In the example of FIG. 6, the data field 618 indicates that an evaluation is recommended as an action to be taken for the condition documented in the CAP report 500. The user can select or hover over the data field 618 to view additional information about the recommended evaluation action. Various different action recommendations can be determined. For example, an apparent cause evaluation can be determined. A corrective action can be determined, which can be used for tracking or completion and documentation of an action that accomplishes at least one of: correcting a condition adverse to quality, addressing an apparent or equipment cause, and/or addressing an extent of condition or cause as applicable. A corrective action to prevent recurrence can also be determined, which can be actions taken to correct the cause of a significant condition adverse to quality (SCAR). A condition evaluation can be determined to further understand the condition and identify appropriate corrective actions. The different action recommendations can also include equipment cause evaluations, CAP effectiveness reviews, human performance event investigations (an evaluation performed subsequent to human performance error to document lessons learned and to trend performance errors), and/or INPO consolidated event system (ICES) reporting activity (which can be used to track creation of operating experience and equipment failure reporting into ICES).

FIGS. 7A-J are example GUIs of dashboards for displaying information about a nuclear facility, such as identification and resolution of negative conditions in the facility and trend analysis of conditions over time in the facility. As described herein, the nuclear facility is merely an illustrative example the dashboards described herein can also be used for displaying information about other types of regulated facilities. The GUIs depicted and described in FIGS. 7A-J can be presented in a web interface, web application, or mobile application at a computing device of a relevant user (refer to FIG. 1). Moreover, all data represented in the GUIs of FIGS. 7A-J are example data and used for illustrative purposes. The data in the GUIs does not represent conditions in actual operating facilities.

Figure 7A:
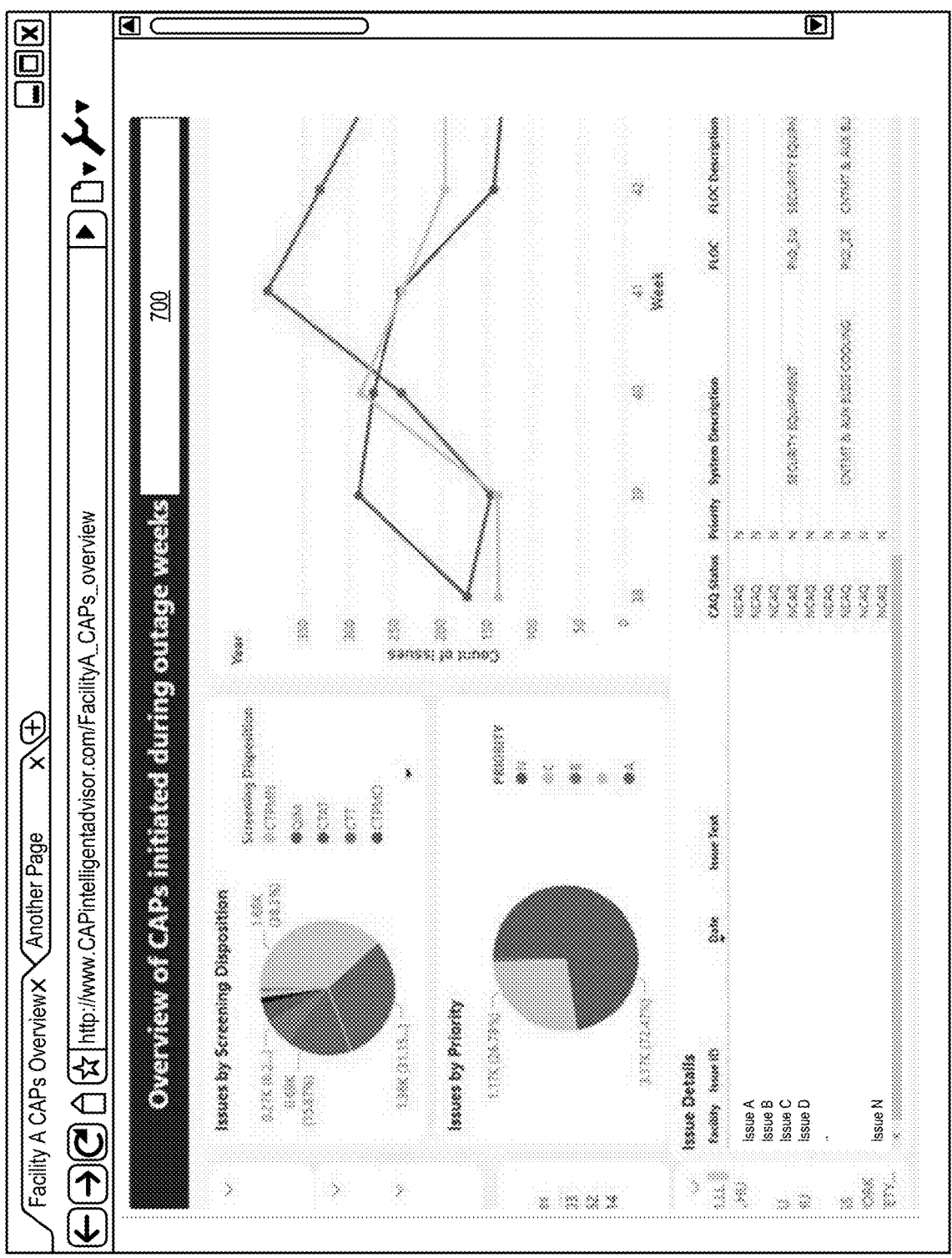

Referring to FIG. 7A, a GUI 700 can present a dashboard showing an overview of CAPs initiated during one or more outage weeks for a particular facility (e.g., Facility A) over a particular period of time. The relevant user can define the particular period of time. The particular period of time can span over days, weeks, months, and/or years. Information about the CAPs initiated over the particular period of time can be presented in a variety of graphical elements in the GUI 700. For example, CAP issues (or negative conditions as described throughout this disclosure) initiated per year can be displayed and outputted in a line graph. CAP issues filtered by screening disposition can be displayed in a pie graph. CAP issues filtered by priority value can be displayed in a pie graph. One or more of the initiated CAP issues can also be presented in a table, the table including additional details about each of the initiated CAP issues.

The GUI 700 can also display CAP issues in various graphical elements as those issues relate to departments, text, equipment, etc. during the particular period of time. The GUI 600 provides a detailed overview of criteria used in processing and analyzing CAP reports, including but not limited to year, keywords, and identified issues. Sometimes, the GUI 700 can show overviews of all CAPs as created by CAP issue owner department. The GUI 700 may also indicate increases in issues initiated by various teams or departments associated with the facility. The GUI 700 can present the CAPs as aligned with system descriptions for which an issue was created. The GUI 700 can also depict CAPs aligned with equipment descriptions for which an issue was created. Sometimes, one or more of the graphical elements depicted in the GUI 700 can be updated to show a detailed and aggregated overview of all the CAPs created during the outage weeks over the particular period of time that align with particular keywords of interest. The particular keywords identified in the CAPs can also be included in a table or other summary presented in the GUI 700 that includes details about each identified issue.

Figure 7B:
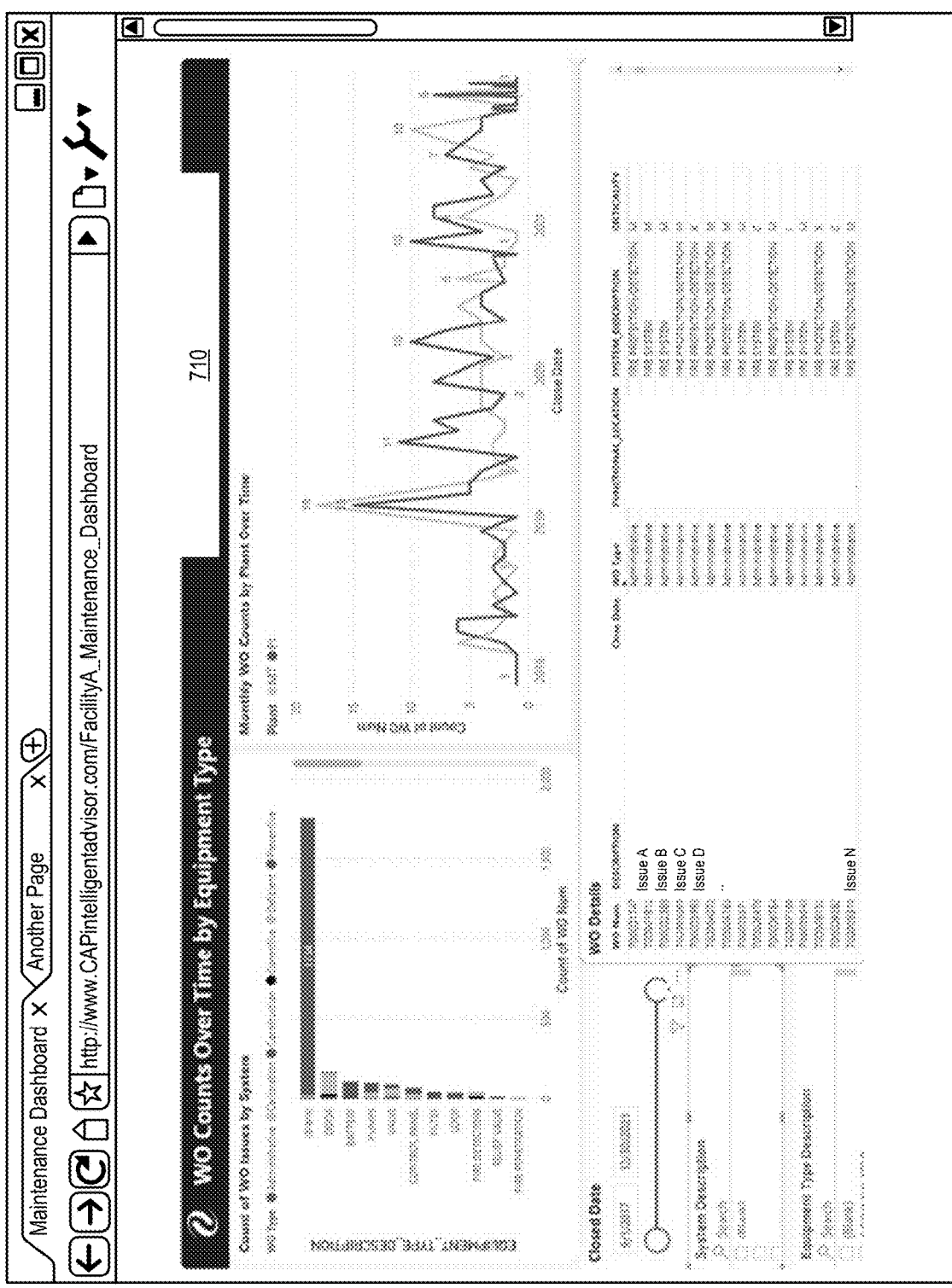

FIG. 7B depicts a GUI 710 for a maintenance dashboard displaying work order counts per equipment type. The GUI 710 can present work order counts per equipment type for a particular facility, such as Facility A. The GUI 710 can also present work order counts per equipment type for a group of facilities. The GUI 710 provides an overview of issue and activity performance, as well as maintenance costs and hours of each facility. Accordingly, the GUI 710 can be used by a relevant user to evaluate the maintenance costs associated with CAP activities, as broken down by various filters including but not limited to equipment type, owned department, system, department, sub-department, trend code, and/or FLOCs. In some implementations, the GUI 710 can also present an aggregated overview of all work orders, work order hours by equipment type aggregated by total cost in dollars, work order hours by functional location aggregated by total cost in dollars, and/or work order costs as split by aggregated corrective versus preventative work orders. The GUI 710 can additionally or alternatively present issue count by equipment type over a period of time, activity frequency by sub-department over the period of time, change in work order count and work order spend by equipment type over the period of time, and/or change in work order count and work order spend by department over the period of time.

Figure 7C:
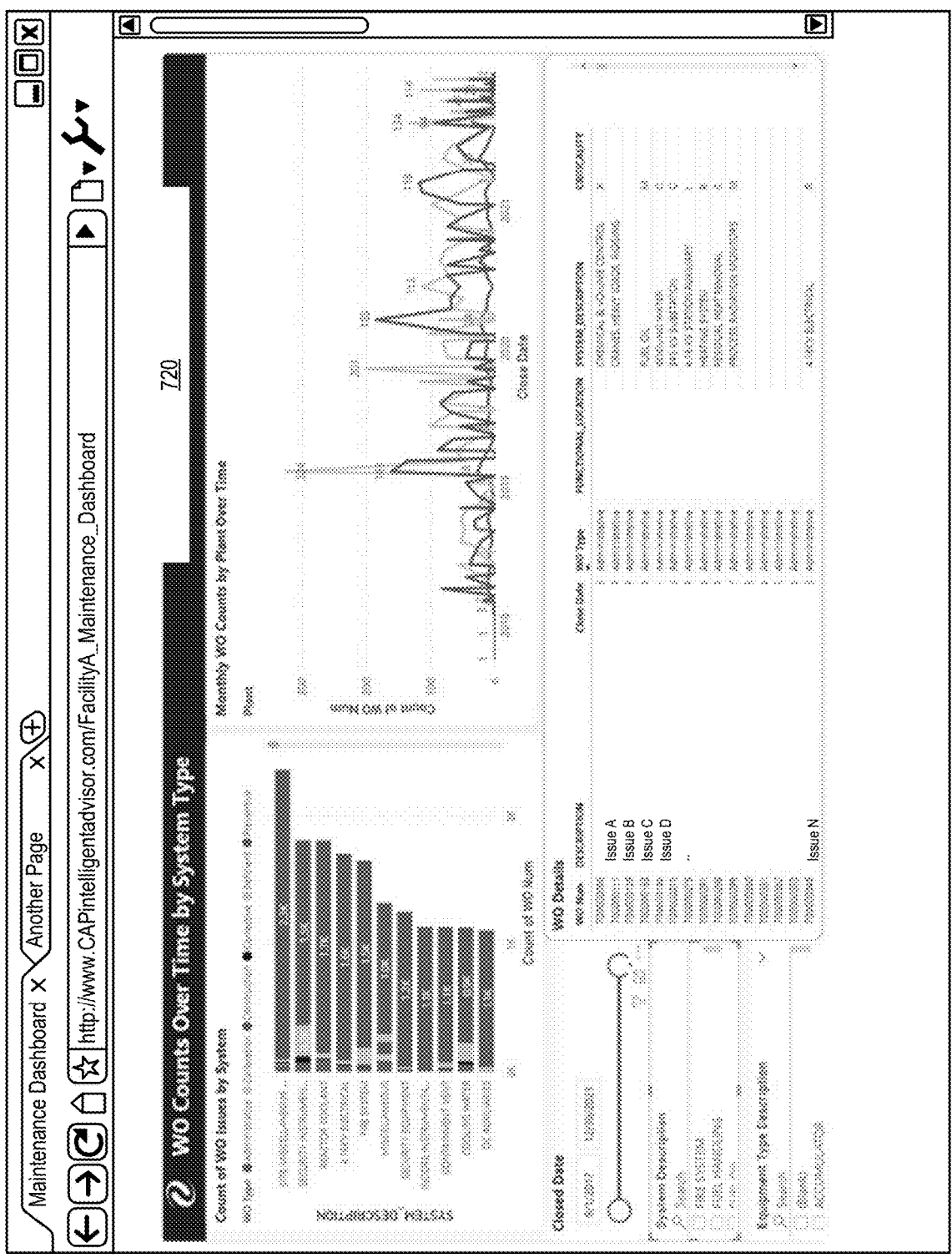

FIG. 7C depicts an updated GUI 720 for the maintenance dashboard of FIG. 7B depicting CAP work order counts by system type. In a line graph, the GUI 720 can present work order counts by plant or other facility over a predetermined period of time. The GUI 720 can also present work order issues by system type/description in a bar graph. Moreover, the GUI 720 can present, in a table, additional details about each of the work orders identified and depicted in the GUI 720.

Figure 7D:
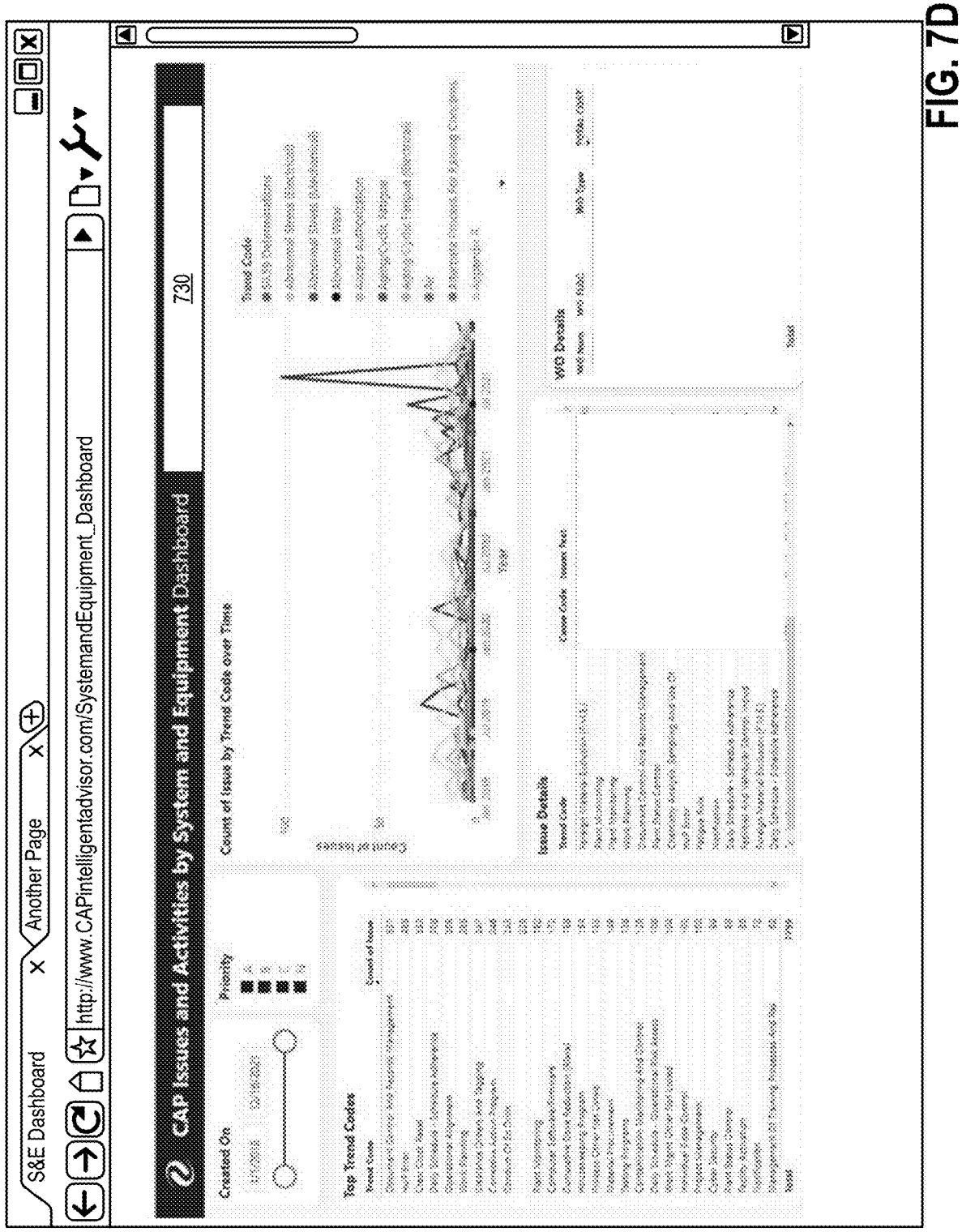

FIG. 7D depicts a GUI 730 for a system and equipment dashboard in which CAP issues and activities are sorted and displayed by trend code over a predetermined period of time. The count of CAP issues by trend code can be depicted and displayed in a line graph. A table can be presented indicating additional details about each of the CAP issues that are sorted and displayed based on trend code. Additionally or alternatively, another table can be presented indicating additional details about each work order that is sorted and displayed based on trend code. The GUI 730 can also present a listing of trend codes associated with a particular facility or a group of facilities. The trend codes in the list can be sorted based on a count of CAP issues associated with each code. Thus, a trend code having the most identified CAP issues (and/or work orders) can be presented at the top of the list. Each facility can have different trend codes, which may also be reflected in the list of trend codes outputted in the GUI 730.

Figure 7E:
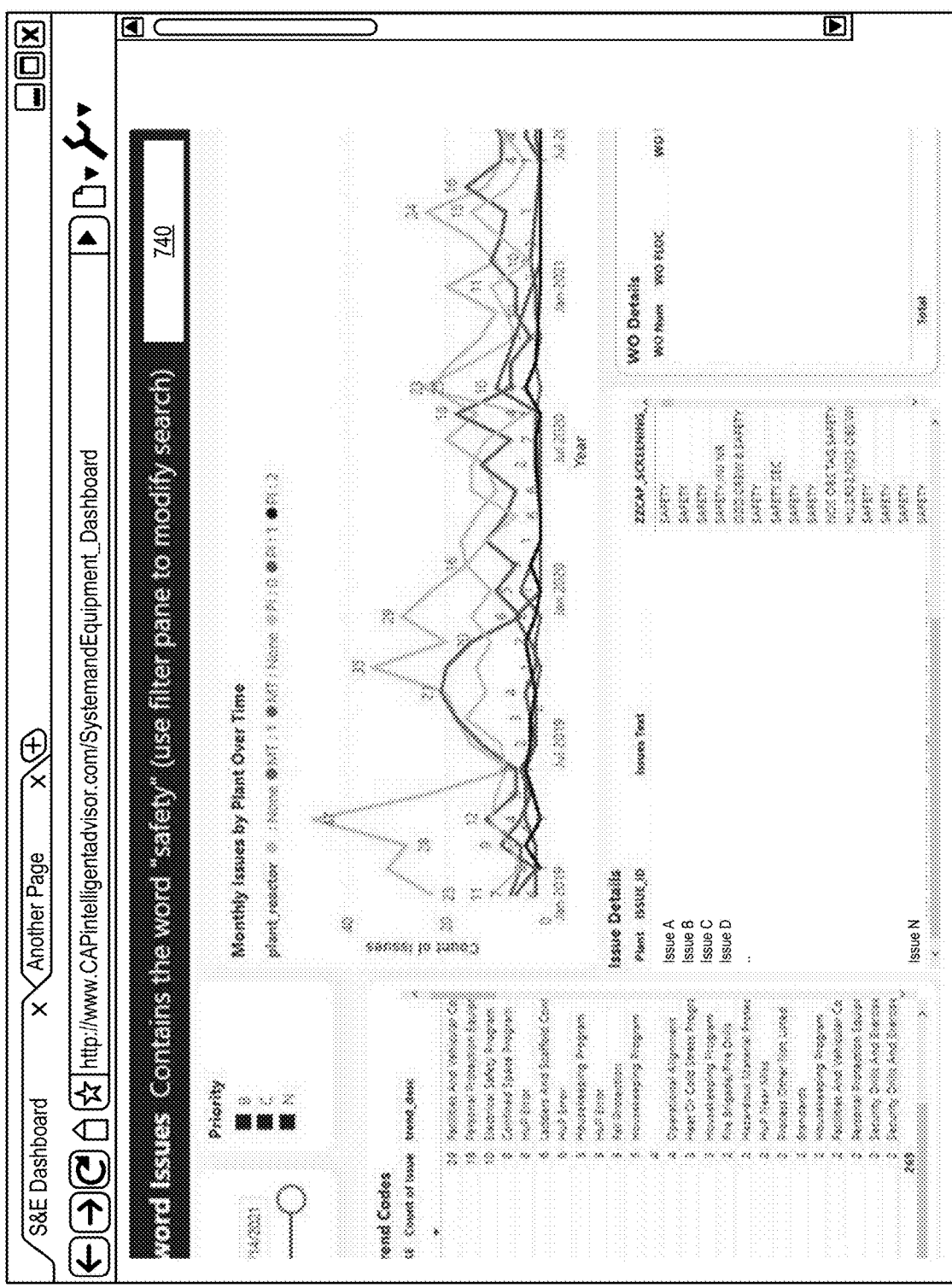

FIG. 7E depicts an updated GUI 740 for the system and equipment dashboard of FIG. 7D presenting CAP issues per plant/facility that contain one or more particular keywords. In the example GUI 740, the CAP issues per plant that are presented include the keyword "safety." The user can define, select, or otherwise input one or more additional or other keywords for which to sort and present the CAP issues in the GUI 740.

Figure 7F:
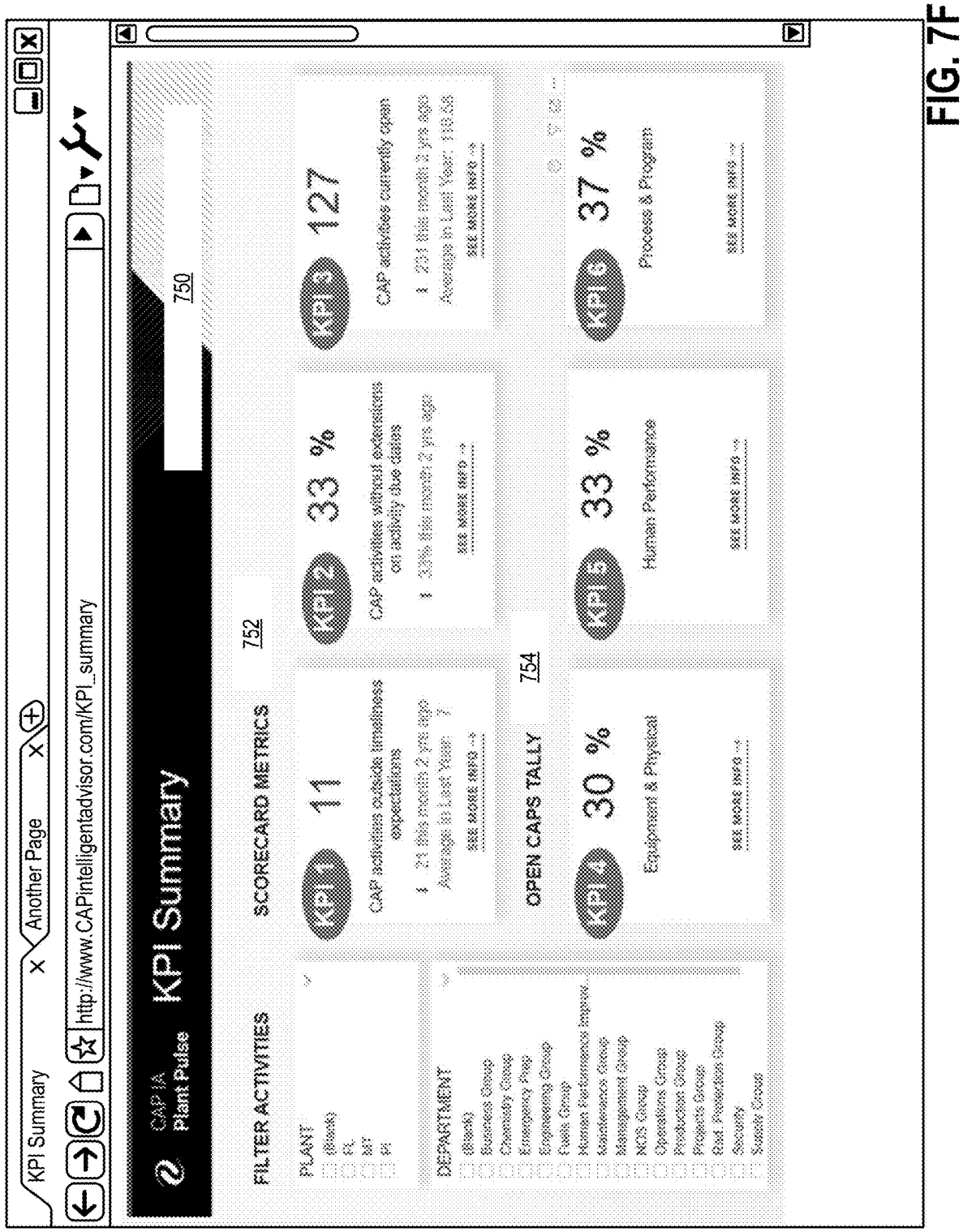

FIG. 7F depicts a GUI 750 for a dashboard that presents a summary of key performance indicators (KPIs) for a particular facility. The GUI 750 can be viewed by the relevant user to track the facility's performance in completing activities over time. For example, the GUI 750 can reflect completion of activities on time and without extensions. The GUI 750 can also be viewed by the relevant user to monitor percentages of CAP issues identified under different categories, departments, and/or KPI metrics. The GUI 750 can also display a history of average age of activities (from start to completion) by type during a previous, predetermined period of time. Any of the activities and/or information presented in the GUI 750 can also be sorted and/or filtered by owner, plant, and/or department to allow for quick actions and/or follow-ups to be made with respect to a particular activity, such as an activity that has been open for longer than 12 months.

In the example of FIG. 7F, the GUI 750 displays a state of the facility's activities with 6 KPIs. The relevant user can select or click on any of the 6 KPIs in order to view additional information and data about the selected KPI and the facility's performance in relation to the selected KPI. This additional information and data can be presented in a pop out window overlaying a portion of the GUI 750. The additional information and data can additionally or alternatively be presented in another GUI.

The GUI 750 displays KPIs 1-3 as scorecard metrics 752 and KPIs 4-6 as open CAPs tally 754. The KPIs 1-3 in the scorecard metrics 752 can indicate 3 different activity KPIs: activities outside of timeliness (KPI 1), activities without extensions (KPI 2), and currently open activities (KPI 3). As mentioned above, the user can select any of the scorecard metrics 752 to view additional information about the corresponding KPIs. The scorecard metrics 752 can indicate a current status of open activities sorted by age (e.g., in descending order).

The KPIs 4-6 in the open CAPs tally 754 can indicate 3 issue category KPIs: % of Equipment & Physical CAPs (KPI 4), % of Human Performance CAPs (KPI 5), and % of Program & Process CAPs (KPI 6). The KPI 4 metric can show a percentage of open CAPs that have been categorized as Equipment & Physical Condition issues. The computer system described herein can capture these CAPs and group them by month and year, and calculate a total percentage of CAPs that were created during a predetermined period of time using the issue category. Then, an average number of open CAPs per month can be calculated for a period of time, such as a last 12 months. The KPI 5 metric can show a percentage of open CAPs that have been categorized as Human & Operational Performance issues. The computer system captures these CAPs and groups them by month and year, calculating a total percentage of CAPs created at the time using the issue category. Then, an average number of open CAPs per month can be calculated for a period of time, such as a last 12 months. The KPI 6 metric can show a percentage of open CAPs that have been categorized as Process & Program issues. The computer system described herein captures these CAPs and groups them by month and year, calculating a total percentage of CAPs created at a particular time using the issue category. Then, an average number of open CAPs per month can be calculated for a predetermined period of time, such as a last 12 months.

As shown in the GUI 750, each of the KPI metrics can include a numeric value represented in a different indicia. The indicia can be a color, such as red, yellow, or green. The color can be assigned to the KPI metric based on determining whether threshold criteria are satisfied for the particular KPI metric. As an illustrative example of KPI 2 metric, if 55% of activities across all facilities are completed on schedule, the numeric value depicted for the KPI 2 metric can be assigned a color of green. If greater than 45% of activities are completed on schedule across all the facilities, the numeric value can be assigned yellow, and if less than 45% of activities are completed on schedule across all the facility, a red color can be assigned to the numeric value. Different threshold criteria can be used on a facility level such that the KPI metrics displayed in the GUI 750 indicate KPI metrics associated with a particular facility rather than a group of facilities.

One or more other threshold may be used. As an illustrative example, for all facilities, if more than 70% of activities associated with CAPs having a criticality level of CAQ/SCAQ are completed on schedule, they can be assigned green, if more than 60% of these activities are completed on schedule, they can be assigned yellow, and if less than 60% of these activities are completed on schedule, they can be assigned red. For all facilities, if more than 50% of activities associated with CAPs have a criticality level of NCAQ and are completed on schedule, they can be assigned green, if greater than 40% of these activities are completed on schedule, then the activities can be assigned yellow, and if less than 50% of these activities are completed on schedule, then these activities can be assigned red. If more than 55% of activities associated with CAPs having a criticality level of NCAQ/CAQ/SCAQ are completed on schedule, they can be assigned green, if more than 45% of these activities are completed on schedule, the activities can be assigned yellow, and if less than 45% of these activities are completed on schedule, they can be assigned red.

The GUI 750 is intended to be a non-limiting example of KPI metrics that can be associated with a particular facility or group of facilities. One or more other KPI metrics can also be defined and presented in the GUI 750. As mentioned above, the user can select any of the open CAPs tallies 754 to view additional information about the corresponding KPIs. The open CAPs tallies 754 record a current status of valid CAPs (e.g., negative conditions, issues) over some threshold period of time (e.g., a last 30 days).

When the user selects any of the scorecard metrics 752 or the open CAPs tallies 754, a GUI corresponding to the user selection can be presented with a list of activities, issues, and/or a historical chart of issue counts. The user can utilize one or more filters to then filter the activities/issues by plant and/or department.

Figure 7G:
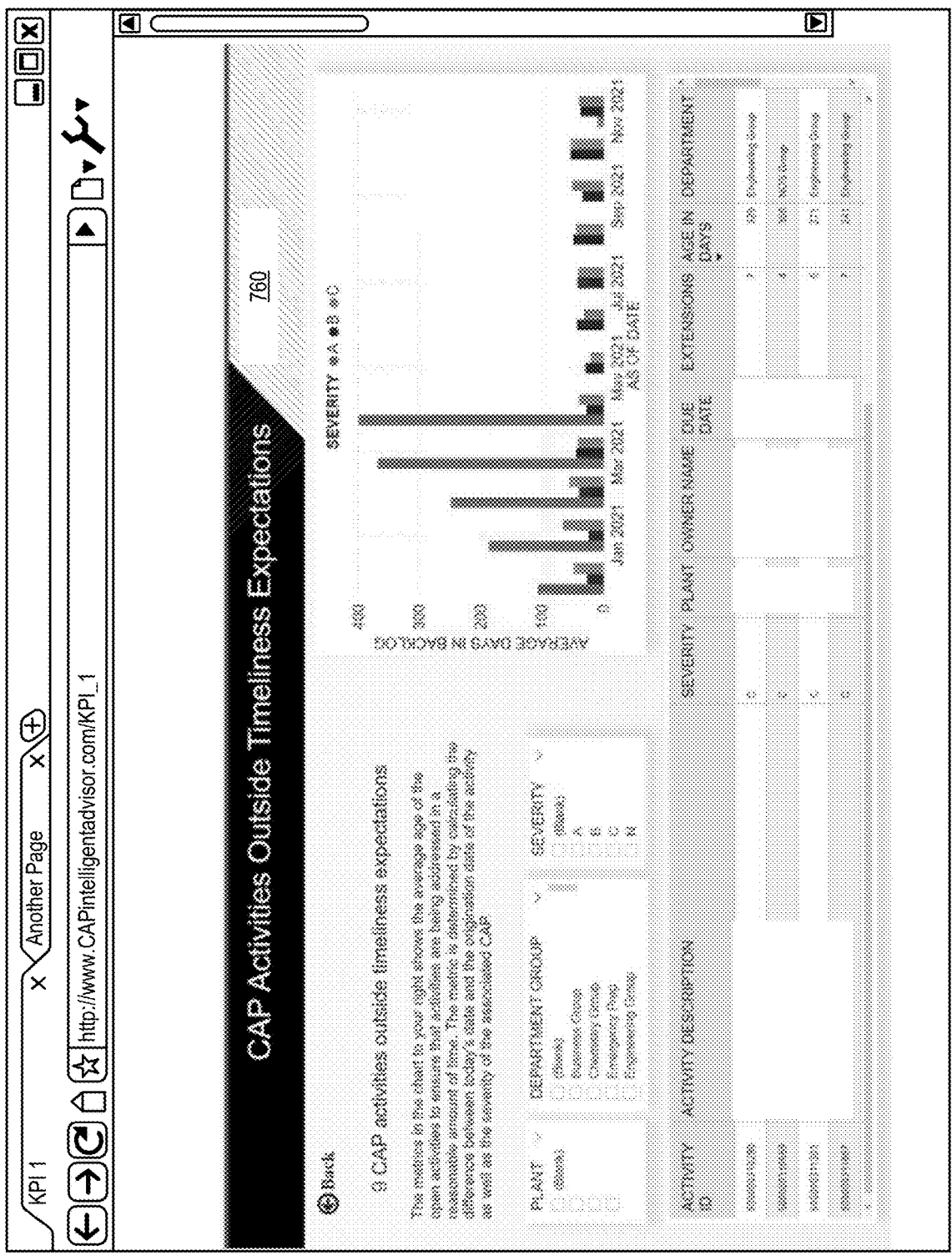

FIG. 7G depicts a GUI 760 for displaying the KPI 1 metric depicted in the GUI 750 of FIG. 7F. The GUI 760 depicts CAP activities outside of timeliness expectations. The GUI 750 can include graphical elements indicating a total count of open CAP activities having an age that is outside of what is considered an appropriate amount of time to be open. The age can be determined, by the computer system described herein, as a difference between a current or real-time date and an origination date of the activity. The GUI 750 can present a list of activities that are outside of timeliness expectations in a table, column chart, or other graphical depiction. The chart, for example, can be a clustered column chart of average monthly open activity counts for a particular facility over a predetermined period of time and sorted based on corresponding severity values. In the example of FIG. 7G, the open activity counts are shown over a last 12 months. The information in the table and/or the column chart can further be sorted based on user-selection of one or more filters, such as plant/facility name, department group, and/or severity value filters.

One or more indicia may also be assigned to each activity based on age and/or severity value that is determined for the associated CAP. The indicia can include colors, patterns, shades of colors, and/or other graphical elements or graphical features. As an illustrative example, activities associated with CAPs that are assigned a severity value of level A can be assigned green if the activities have been open for less than 81 days, yellow if open between 82 and 90 days, and red if open for more than 90 days. Activities associated with CAPs that are assigned a severity value of level B can be assigned green if the activities have been open for less than 108 days, yellow if open between 109 and 120 days, and red if open for more than 120 days. Activities associated with CAPs that are assigned a severity value of level C can be assigned green if open for less than 162 days, yellow if open between 163 and 180 days, and red if open for more than 180 days. Any one or more other ranges can also be defined and used to determine what colors or other indicia to assign to each activity.

Although the GUI 760 is described in reference to the KPI 1 metric, a same or similar GUI can also be presented to display the KPI 2 metric for CAP activities without extensions. The GUI for the KPI 2 metric can indicate a percent of activities that have been completed in a threshold period of time, such as a last 30 days, without requiring any time extensions. The relevant user can view a list of activities with extensions and a clustered column chart of monthly percentages of activities without extensions over a period of time and based on severity value, as described above in reference to CAP activities that are outside timeliness expectations.

In some implementations, CAP activities with a due date in the last 30 days, or another predetermined period of time, can be assigned a flag if completed on schedule. The flagged activities can then be grouped by plant and criticality code, and a percentage of activities completed on schedule can be calculated. A green color can be assigned to the KPI 2 metric if the percentage of activities completed on schedule is higher than an average of the same completion rate during a previous period of time (e.g., during the same month 2 years ago).

Figure 7H:
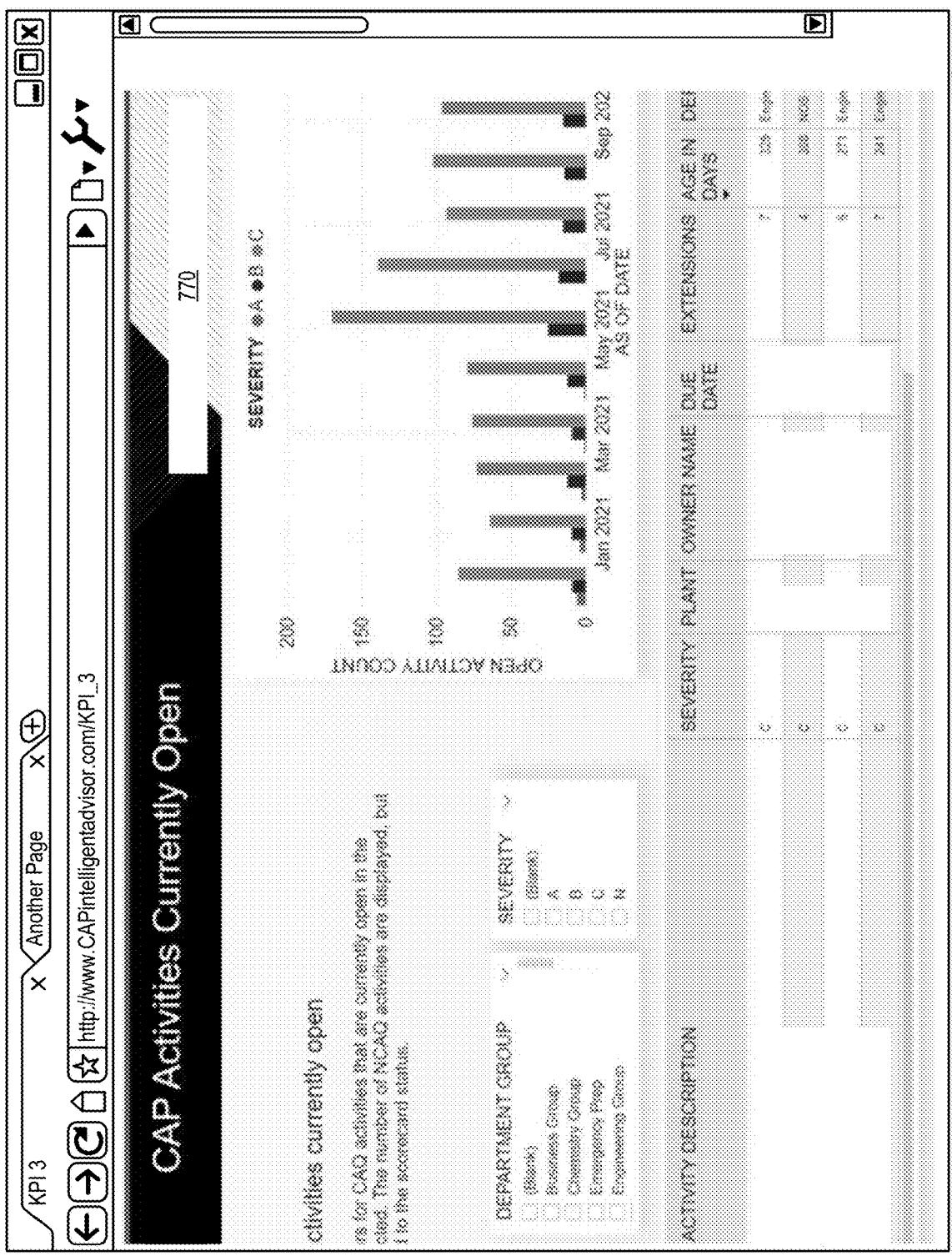
Figure 71:
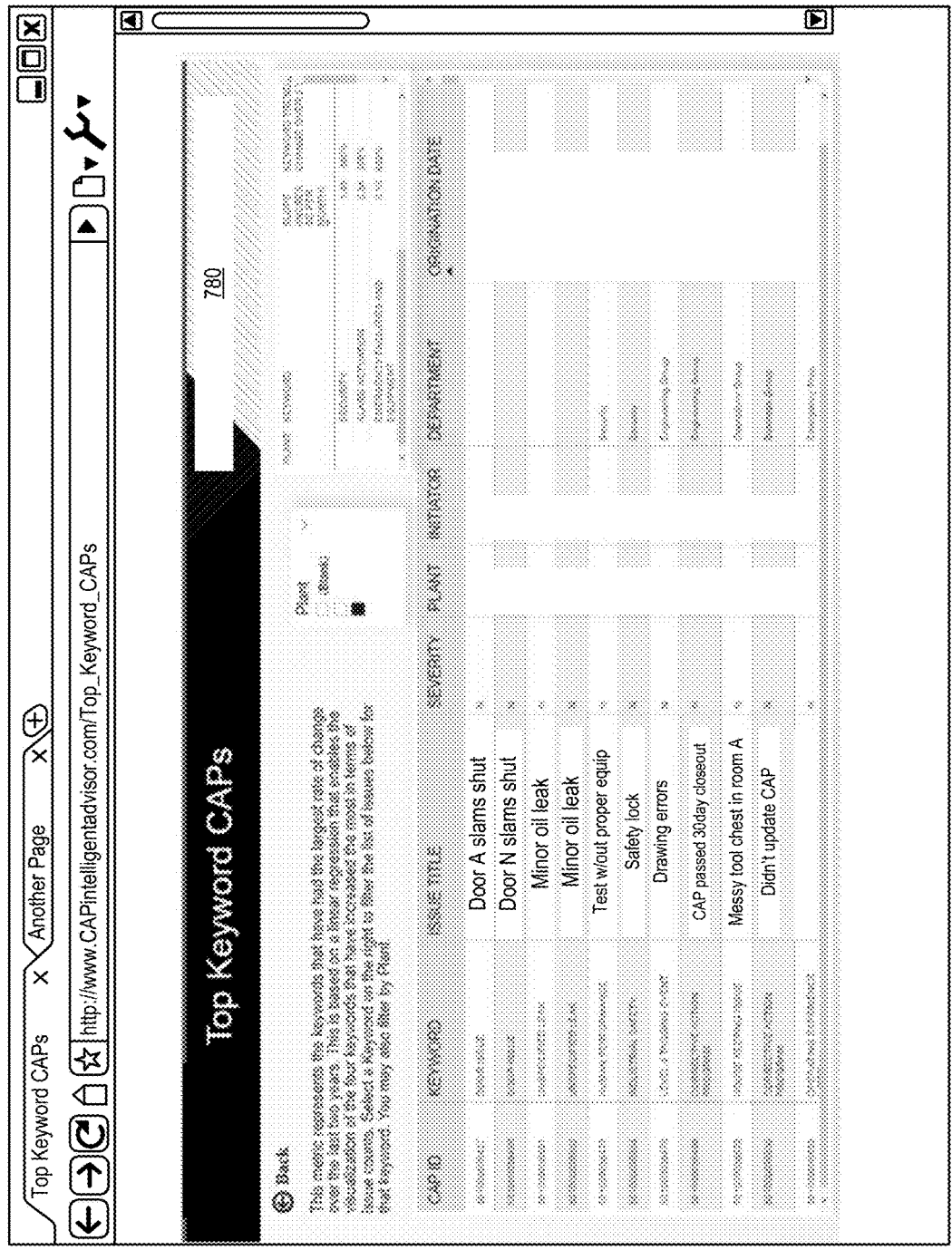

FIG. 7H depicts a GUI 770 for displaying the KPI 3 metric depicted in the GUI 750 of FIG. 7F. The GUI 770 displays graphical elements for viewing information about a count of open CAP activities associated with a particular facility and/or a group of facilities. The open CAP activities can be displayed in a list or table and/or a clustered column chart, as described further in reference to FIG. 7G. The chart can depict monthly open activity counts over a period of time, such as a last 12 months, sorted by associated severity value. As described above in reference to FIGS. 7F and 7G, the KPI 3 metric can be assigned a color for the count of open activities based on threshold criteria being satisfied. For example, a color red can be assigned if a percentage of opened CAPs in a particular category is greater than an average monthly percent of open CAPs over a prior period of time, such as a last year. A color green can be assigned is the percentage of opened CAPS is less than the average monthly percent of open CAPs over the prior period of time. The criteria can be unique to each facility. As an illustrative example, facility A can be assigned a color green if 150 activities are open, yellow if 150-200 activities are open, and red if over 200 activities are open while facility B can be assigned a color green if under 275 activities are open, yellow if 273-375 activities are open, and red if over 375 activities are open. One or more other threshold criteria can be defined and used to colorize the KPI 3 metric value.

FIG. 7I depicts a GUI 780 for displaying keywords that have a largest rate of change over some threshold period of time. Thus, the GUI 780 can present in a table, list, and/or chart keywords that have been used more frequently in CAP reports over a threshold period of time. The keywords can be filtered based on issue and/or based on facility. The GUI 780 can be used to monitor and identify trends in facility performance over time. The top keywords and/or trend codes per facility can be determined and calculated each month, or calculated at one or more other predetermined periods of time. A relevant user can select any of the keywords presented in the GUI 780 to view additional information about the keyword. The additional information can be displayed in a graph in the GUI 780 or in another GUI (not depicted). Sometimes, the user can also select a particular CAP from a filtering option and/or the table shown in the GUI 780 to view top keywords (and optionally top trend codes) that are associated with the particular user-selected CAP.

A relevant user can filter the keywords shown in the GUI 780 in order to view, such as in a table, a list of top 4 keywords from a period of time, such as a last 2 years. The user can select or click on any of the listed keywords in order to filter CAPs presented in that table based on the keyword (e.g., CAPs having that keyword can be presented and listed at a top of the table). If the user does not perform any filtering techniques, the table can show all CAPs that have used any keywords over the period of time, such as the last 2 years. Similar filtering and presentation techniques can be used to display top trend codes in the table or other graphical presentation in the GUI 780.

Figure 7J:
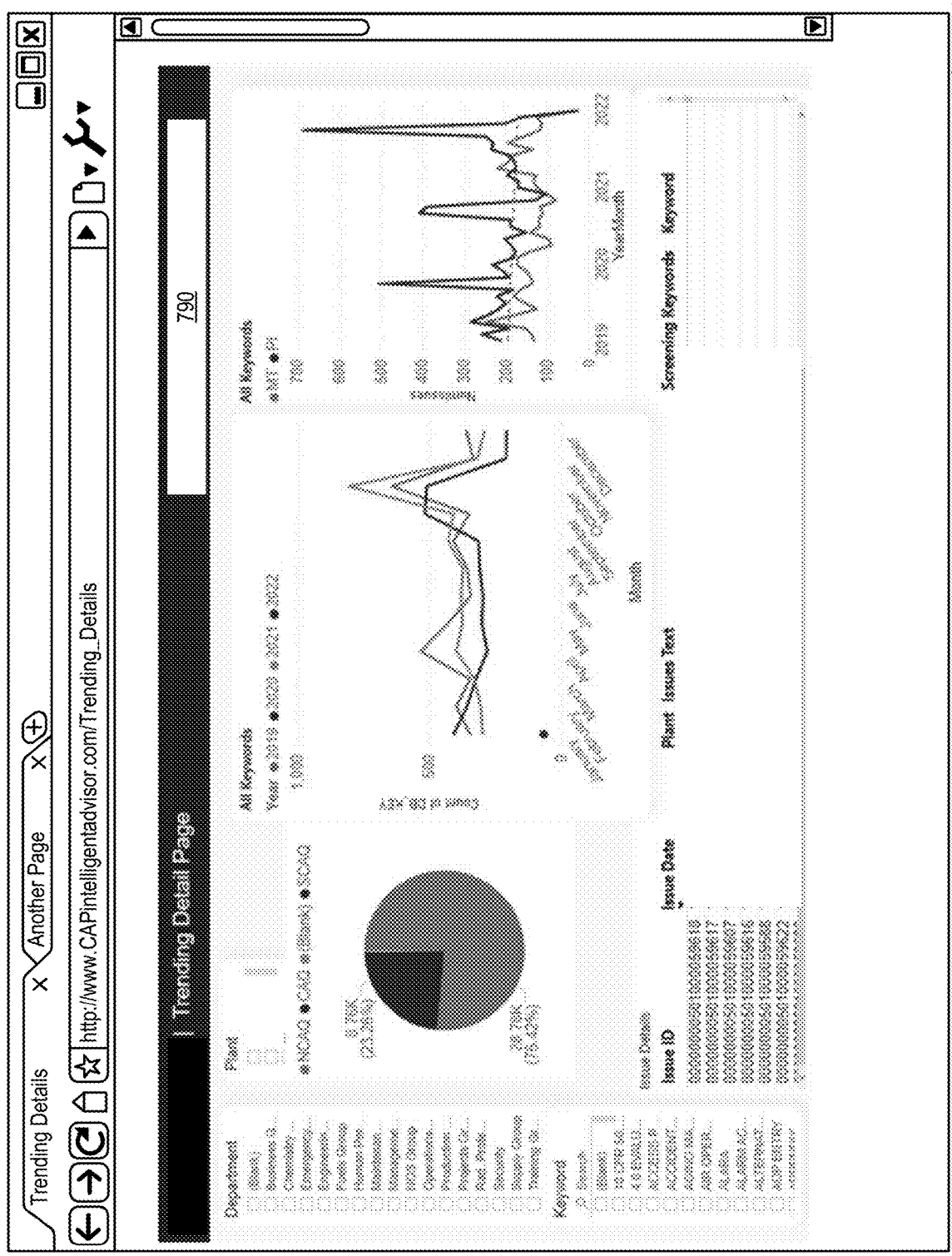

FIG. 7J depicts a GUI 790 of a dashboard for displaying overall trending details for a particular facility or a group of facilities. The GUI 790 shows aggregations and counts of issues over time that can be filtered by screening keyword, department, and/or CAQ status. Trends in keywords and/or trend codes can be displayed in a variety of graphical elements, including but not limited to pie charts, line graphs, and/or tables or lists, as shown in the GUI 790.

The computer system described herein can also base identification of top keywords and/or trend codes on change of a trendline associated with each keyword and/or trend code to improve accuracy of the identification process. Sometimes, monthly spikes can be presented in the GUI 790 or another GUI to show counts of issues that are spiking in a current month compared to expected counts of the issues from a prior period of time, such as a last 24 months. Sometimes, the top keywords and/or trend codes from a last 6 months (or other period of time) having a high probability of spiking in the short-term can be displayed in the GUI 790 or another GUI. The computer system described herein can determine the high probability using one or more thresholds and/or machine learning techniques for predicting or projecting whether the identified keywords and/or trend codes will spike in the short term. Such trends can help relevant users plan how to optimize their operations and management in the short-term.

To determine the probability that a keyword or trend code will spike in the short-term, the computer system can fit a probability distribution using a past 24 months of data and calculate a quantile (% of values below a current value). This can be reported as an anomaly probability. For example, if the anomaly probability is 99%, then 99% of values would be expected to be less than a current count. A 50% anomaly probability therefore represents a median value. The computer system can also fit a negative binomial distribution and if the fit is poor, the computer system can revert to a regular quantile.

Sometimes, cyclical spikes can be presented in the GUI 790 or another GUI to show spikes in the counts of issues as local spike detection. A spike can occur, for example, when the count of issues in the current month is more than 1 standard deviation above a mean count during the prior 6 months, or another predetermined period of past time. As described above, the cyclically spiking keywords and/or trends can be presented in a list, table, and/or one or more other graphical elements. The GUI 790 can also display a list of top keywords and/or trend codes over a threshold period of time (e.g., a last 2 years) that have a high probability of spiking in the long-term. Such long-term trending provides facilities with tools to perform and determine long-term strategic planning that optimizes operations and management in the facilities.

FIGS. 8A-J are conceptual diagrams for identifying signals in a CAP report 800 and providing those signals as inputs to models 812A-N that generate recommendations (see output 814A-N in FIGS. 8A-J) for addressing a condition documented in the CAP report 800.

Figure 8A:
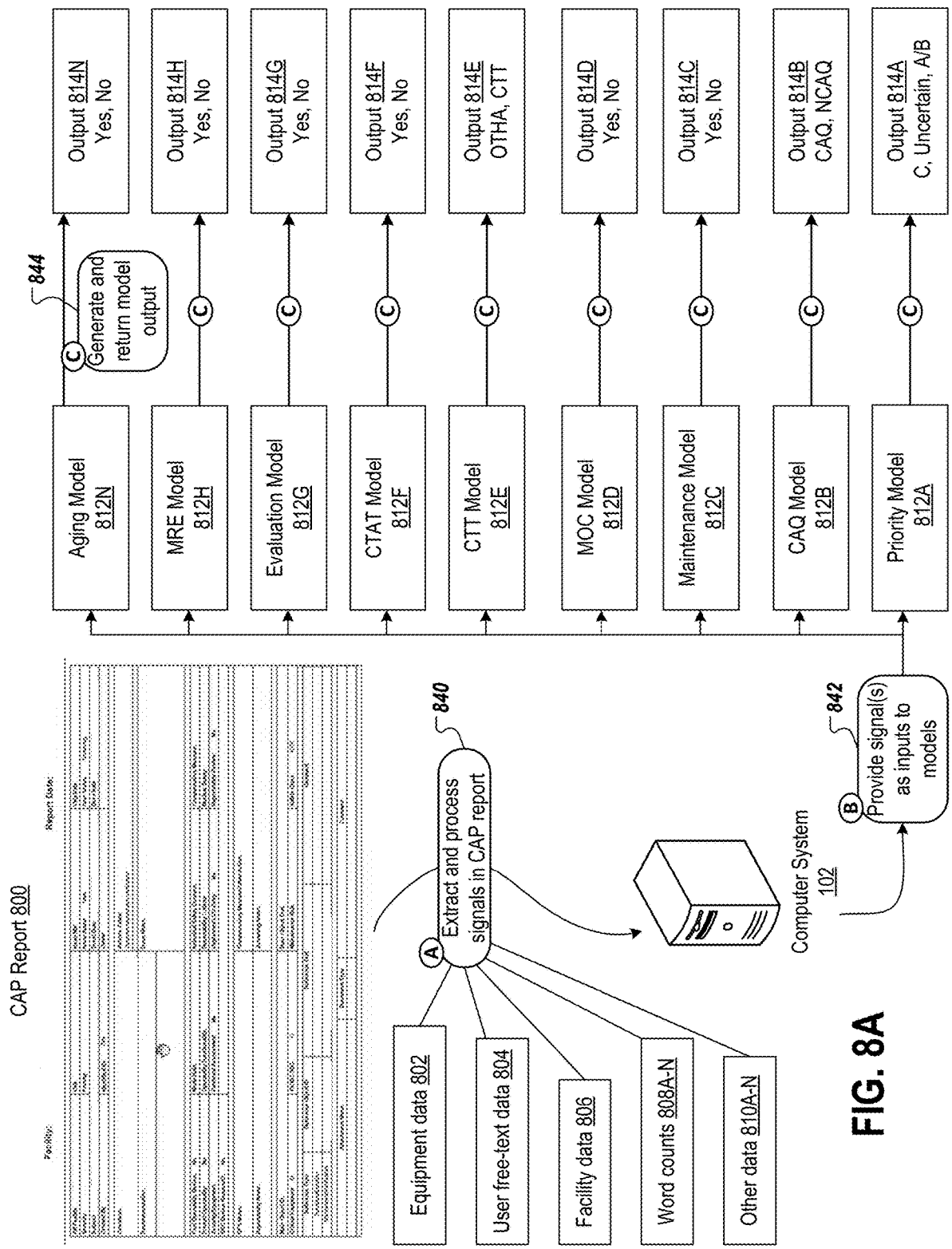
FIGS. 8A-J are conceptual diagrams for identifying signals in a CAP report and providing those signals as inputs to models that generate recommendations for addressing a condition documented in the CAP report.

Referring to FIG. 8A, the computer system 102 described herein can extract and process signals in the CAP report 800 in block A (840). As described in reference to FIG. 1, the computer system 102 can receive the CAP report 800 from a device, such as one or more of the computing devices 104A-N. The CAP report 800 can be completed by a relevant user associated with a nuclear facility, power plant, or other energy plant. Refer to FIG. 5 for further discussion about data input fields in the CAP report 800. In block A, the computer system 102 can identify the data input fields in the CAP report 800 and extract text values, enumerated values, string values, numeric values, and/or Boolean values that the user entered into those fields at their computing device. The extracted values can be signals that can be provided as inputs to one or more of the models 812A-N described herein.

The extracted values can include but are not limited to the following signals: equipment data 802, user-free text data 804, facility data 806, word counts 808A-N, and other data 810A-N. Although the signals 802-820 are shown and described in reference to FIG. 8A, one or more additional, other, or fewer signals may also be extracted and/or identified from the CAP report 800 (or other sources, such as data stores or other computing systems) and used as inputs to the models 812A-N. Some of the signals 802-810 can be extracted directed from the CAP report 800. Some of the signals 802-810 can be retrieved by the computer system 102 from one or more other computing systems and/or data stores.

For example, the user-free text data 804 can include any values that the user inputted into the data input fields in the CAP report 800. The equipment data 802, on the other hand, can include specific information about equipment associated with the CAP report 800, where the equipment data 802 is retrieved by the computer system 102 from a data store using an equipment ID value that is inputted by the user into a data input field in the CAP report 800. Similarly, the facility data 806 can be retrieved from the data store by the computer system 102, based on a facility ID that is associated with the CAP report 800. The computer system 102 can also retrieve the other data 810A-N from one or more other data stores and/or computing systems or devices.

The word counts 808A-N can be determined by the computer system 102 based on processing the values inputted by the user into the data input fields in the CAP report 800. For example, for each data input field that prompts the user to write a description or notes about a condition documented in the CAP report 800, the computer system 102 can determine a word count. The computer system 102 can perform one or more OCR and/or text recognition techniques to count a quantity of words in each data input field. The computer system 102 can also apply one or more machine learning models to the CAP report 800 that have been trained to identify words in each data input field and count the quantity of words per field.

The computer system 102 can then provide one or more of the signals 802-810 as input to one or more of the models 812A-N in block B (842). Each model 812A-N can receive different signals and/or combinations of signals, as described further in reference to FIGS. 8B-J. The computer system 102 can apply one or more rules to identify which signals are provided as inputs to which models 812A-N. As described further in reference to FIGS. 8B-J, the computer system 102 can also iteratively identify top signals for each of the models 812A-N based on runtime execution of the models 812A-N to adjust or change what signals are provided to the models 812A-N during future runtime execution. The computer system 102 can also modify the rules that are used to identify which signals are provided to which models 1812A-N based on the runtime execution of the models 812A-N.

The computer system 102 can execute one or more models that include, but are not limited to, a priority model 812A, CAQ model 812B, maintenance model 812C, MOC model 812D, CTT model 812E, CTAT model 812F, evaluation model 812G, MRE model 812H, and aging model 812N. These models 812A-N are described further in reference to FIGS. 3-4 and 8B-J. Each of the models 812A-N can receive, as inputs, a set of the signals 802-810 that are associated with the model, and generate and return output 814A-N (block C, 844). The output 814A-N can be provided back to the computer system 102 and/or one or more computing devices, as described further in reference to FIG. 1 and the process 300 in FIGS. 3A-C.

Moreover, as described herein, each of the models 812A-N can be iteratively trained to continuously improve model accuracy, which can exceed the accuracy with which humans actors are able to correctly and consistently assess CAP reports. For example, due to variability in the information provided as part of CAP reports based on a population of different human users providing the CAP reports, any single CAP report may be missing one or more portions of information that are needed to provide a complete and accurate picture of the condition within a facility. The models 812A-N can be trained across a broad corpus of CAP reports, some of which can be complete and some of which may be incomplete. As a result, the trained models 812A-N can be configured to infer missing details and other information that may be inaccurate/incorrect, which can lead to more accurate CAP report assessments. Based on sample testing and training data, the models 812A-N have been found to achieve improved accuracy and consistency above human actors, particularly when trained and tuned to take overly-conservative approaches to assessing conditions within a regulated facility. For example, the models have been found to have a predictive values (e.g., negative predictive values, positive predictive values) for assessed conditions in the high-90% range (e.g., 99.4% negative predictive value for priority/sensitivity model). Additionally, using example training data sets where sample human actors had accuracy at or below 80%, the determinations from the models 812A-N have been found to have accuracy in the mid-to-high 90% range, including as high as 96.8% accuracy. As mentioned above, these numbers are merely illustrative examples of how some of the models 812A-N can perform and/or achieve accuracy. Various other parameters and numbers may also be realized in other implementations of the models 812A-N described herein.

In brief, the priority model 812A can be a priority and/or severity model as described herein that is a predictive model for estimating priority associated with the CAP report 800. The priority model 812A generates the output 814A, which can include a value of "C," if priority is predicted to be low, "uncertain," if priority is uncertain, and "A/B" if priority is high. The output 814A can advantageously provide for rapid and transparent identification of high consequence issues or conditions in the facility. As described further in reference to FIG. 8B, the priority model 812A can receive, as inputs, issue-level data (e.g., pre-screening user SRO, or senior actor operator, inputs, user free-text input), equipment data (criticality data, safety rating, system data), historical work order cost data, and/or equipment redundancy and design basis reports. The priority model 812A can also receive one or more other inputs. Filters may also be applied to identify what signals to provide as inputs to the model 812A. Example filters can include, but are not limited to, only issue data with priority values of A, B, or C. The priority model 812A can, in some implementations, be a gradient boosted random forest model, although other modeling frameworks are also possible.

The CAQ model 812B can be a predictive model for estimating safety risk associated with the CAP report 800. The model 812B generates the output 814B, which can include a value of "CAQ," if safety risk is high for a condition adverse to quality, "uncertain," if safety risk is unknown, and "NCAQ" if safety risk is low for a condition that is not adverse to quality. The output 814B can advantageously provide for rapid and transparent identification of issues in the facility requiring corrective action. As described further in reference to FIG. 8C, the model 812B can receive, as inputs, issue-level data (e.g., pre-screening user SRO inputs, user free-text input) and/or equipment data (criticality data, safety rating, system data). The CAQ model 812B can also receive one or more other inputs. The model 812B can, in some implementations, be a gradient boosted random forest model, although other modeling frameworks are also possible.

The maintenance model 812C can be a predictive model for suggesting if a maintenance notification should be recommendation in association with the CAP report 800. The model 812C generates the output 814C, which can include a value of "Y," if the notification should be recommended and "N" if the notification is not recommended. The output 814C can advantageously provide for rapid and transparent recommendations of maintenance work orders and notifications to be made. As described further in reference to FIG. 8D, the model 812C can receive, as inputs, issue-level data (e.g., pre-screening user SRO inputs, user free-text input) and equipment data (criticality data, safety rating, system data). The model 812C can also receive one or more other inputs. Filters may also be applied to identify what signals to provide as inputs to the model 812C. Example filters can include, but are not limited to, excluding issue data with priority values of A or B. The model 812C can, in some implementations, be a gradient boosted random forest model, although other modeling frameworks are also possible.

The MOC model 812D can be a predictive model for evaluating if an issue or condition requires a change in process or procedure. The model 812D generates the output 814D, which can include a value of "Y," if the issue requires a change, "uncertain," if it is unknown whether a change is required, and "N" if a change is not required. The output 814D can advantageously provide for rapid and transparent recommendation of need for maintenance process and/or procedure changes. As described further in reference to FIG. 8E, the model 812D can receive, as inputs, issue-level data (e.g., pre-screening user SRO inputs, user free-text input) and equipment data (criticality data, safety rating, system data). The model 812D can also receive one or more other inputs. The model 812D can, in some implementations, be a gradient boosted random forest model, although other modeling frameworks are also possible.

The CTT model 812E can be a predictive model for determining if NCAQ issues are worth taking action on or not. The model 812E generates the output 814E, which can include a value of "OTHA," if action should be taken on the issue, "uncertain," if it is unknown whether action is required, and "CTT," or close to trend, if action is not required. The output 814E can advantageously provide for rapid and transparent action recommendations of NCAQ issues. As described further in reference to FIG. 8F, the model 812E can receive, as inputs, issue-level data (e.g., pre-screening user SRO inputs, user free-text input), equipment data (criticality data, safety rating, system data), and actions-level data (e.g., disposition, user free-text input). The model 812E can also receive one or more other inputs. The model 812E can, in some implementations, be a gradient boosted random forest model, although other modeling frameworks are also possible.

The CTAT model 812F can be a predictive model for predicting whether an issue has been closed to actions already. The model 812F generates the output 814F, which can include a value of "Y," if the issue has been closed, "uncertain," if it is unknown whether the issue is closed, and "N," if issue has not been closed yet. The output 814F can advantageously provide for rapid and transparent recommendations of whether an issue has been resolved already by existing issues. As described further in reference to FIG. 8G, the model 812F can receive, as inputs, issue-level data (e.g., pre-screening user SRO inputs, user free-text input), equipment data (criticality data, safety rating, system data), and actions-level data (e.g., disposition, user free-text input). The model 812F can also receive one or more other inputs. The model 812F can, in some implementations, be a gradient boosted random forest model, although other modeling frameworks are also possible.

The evaluation model 812G can be a predictive model for determining if a CAQ/SCAQ issue requires additional evaluation. The model 812G generates the output 814G, which can include a value of "Y," if the issue requires additional evaluation, "uncertain," if it is unknown whether more evaluation is needed, and "N," if no additional evaluation is needed. The output 814G can advantageously provide for rapid and transparent recommendations of actions on CAQ/SCAQ issues. As described further in reference to FIG. 8H, the model 812G can receive, as inputs, issue-level data (e.g., pre-screening user SRO inputs, user free-text input), equipment data (criticality data, safety rating, system data), and actions-level data (e.g., disposition, user free-text input). The model 812G can also receive one or more other inputs. The model 812G can, in some implementations, be a gradient boosted random forest model, although other modeling frameworks are also possible.

The MRE model 812H can be a predictive model for suggesting if a maintenance rule evaluation is required. The model 812H generates the output 814H, which can include a value of "Y," if the evaluation is required, "uncertain," if it is unknown whether the evaluation is needed, and "N," if the evaluation is not required or suggested. The output 814H can advantageously provide for rapid and transparent recommendations to be made for maintenance rule evaluations. As described further in reference to FIG. 8I, the model 812H can receive, as inputs, issue-level data (e.g., pre-screening user SRO inputs, user free-text input), equipment data (criticality data, safety rating, system data), and actions-level data (e.g., disposition, user free-text input). The model 812H can also receive one or more other inputs. The model 812H can, in some implementations, be a gradient boosted random forest model, although other modeling frameworks are also possible.

The aging model 812N can be a predictive model for suggesting if an issue requiring an aging management program (AMP) action. The model 812N generates the output 814N, which can include a value of "Y," if AMP action is required or suggested, "uncertain," if it is unknown whether the AMP action is required, and "N," if the AMP action is not required or suggested. The output 814N can advantageously provide for rapid and transparent recommendations of actions on various issues. As described further in reference to FIG. 8J, the model 812N can receive, as inputs, issue-level data (e.g., pre-screening user SRO inputs, user free-text input) and equipment data (criticality data, safety rating, system data). The model 812N can also receive one or more other inputs. The model 812N can, in some implementations, be a gradient boosted random forest model, although other modeling frameworks are also possible.

Referring to all the FIGS. 8A-J, the computer system 102 can extract and process signals in the CAP report 800 in block A (840). In block B (842), the computer system 102 provides one or more of the signals to each of the models 812A-N. As described above, each model 812A-N can receive different signals based on rules that define what signals are processed by each model.

Figure 8B:
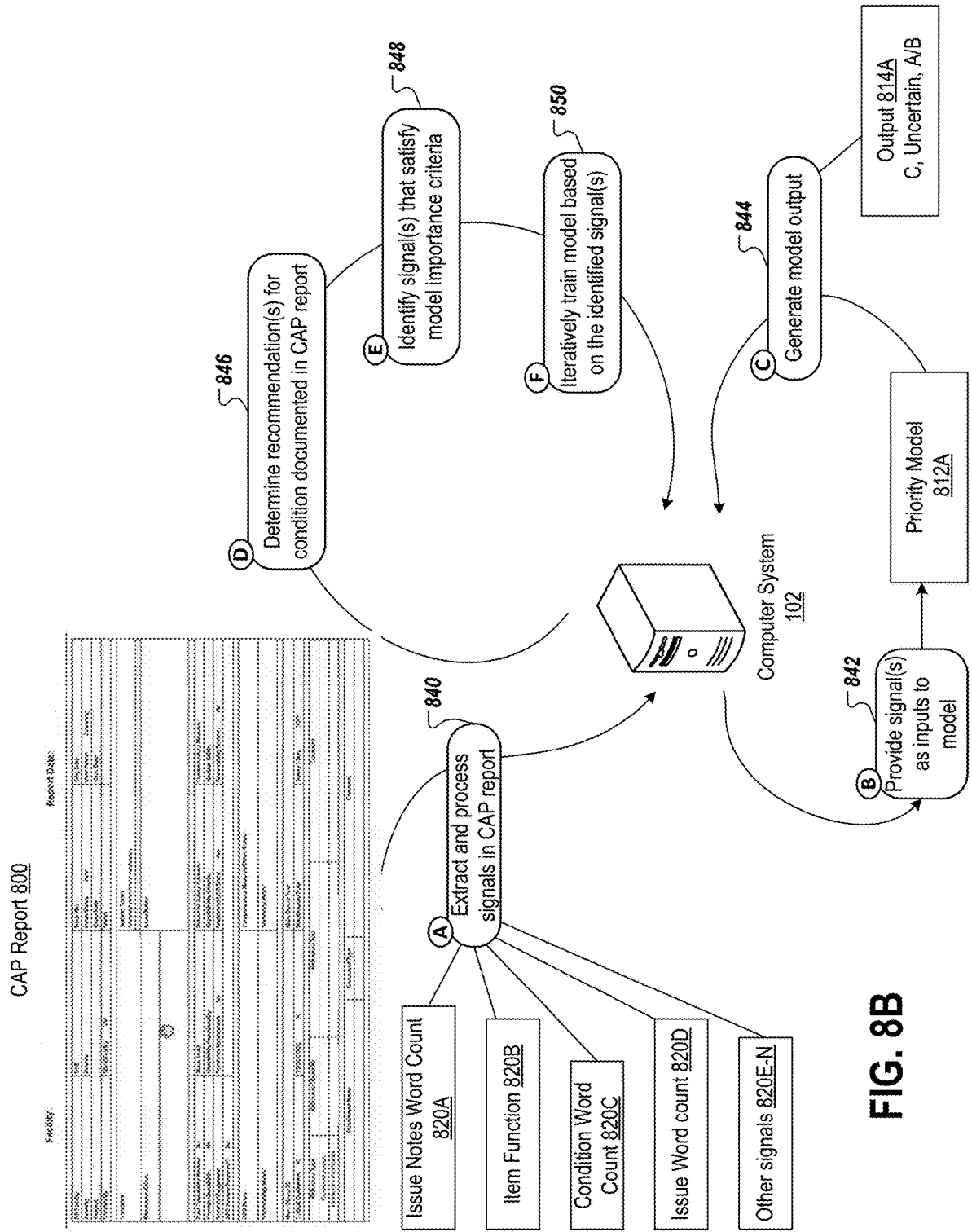

For example, as shown in FIG. 8B, the priority model 812A can receive, as inputs, the following signals, in order of highest importance to lowest importance: issue notes word count 820A, item function 820B, condition word count 820C, issue word count 820D, and other signals 820E-N. The signals 820A-D can indicate a top 4 signals having highest importance for use by the priority model 812A. After all, a high number or quantity of words in issue notes text, for example (signal 820A), and passive and active item functions (item function 820B) can be most predictive features for "A/B" classification or output 814A. The other signals 820E-N can include, but are not limited to, in the following order of most important to least important: counts of previous priority/FLOCs filtered by C priority, issue reviewed by SROs, action text word count, operational notes text word count, operational notes text flagged for having the word "rule" flag, operational notes text flagged for having the word "SA," operational notes text flagged for having the word "k," recommendation text flagged for having the word "closed," equipment type description, recommendation text word count, condition text flagged for having the word "kpi," safety related flag, count of previous priority/FLOCs filtered by A/B priority, condition text flagged for having the word "dri," condition text flagged for having the word "now," and/or the issue being flagged for SRO nuclear safety.

Figure 8C:
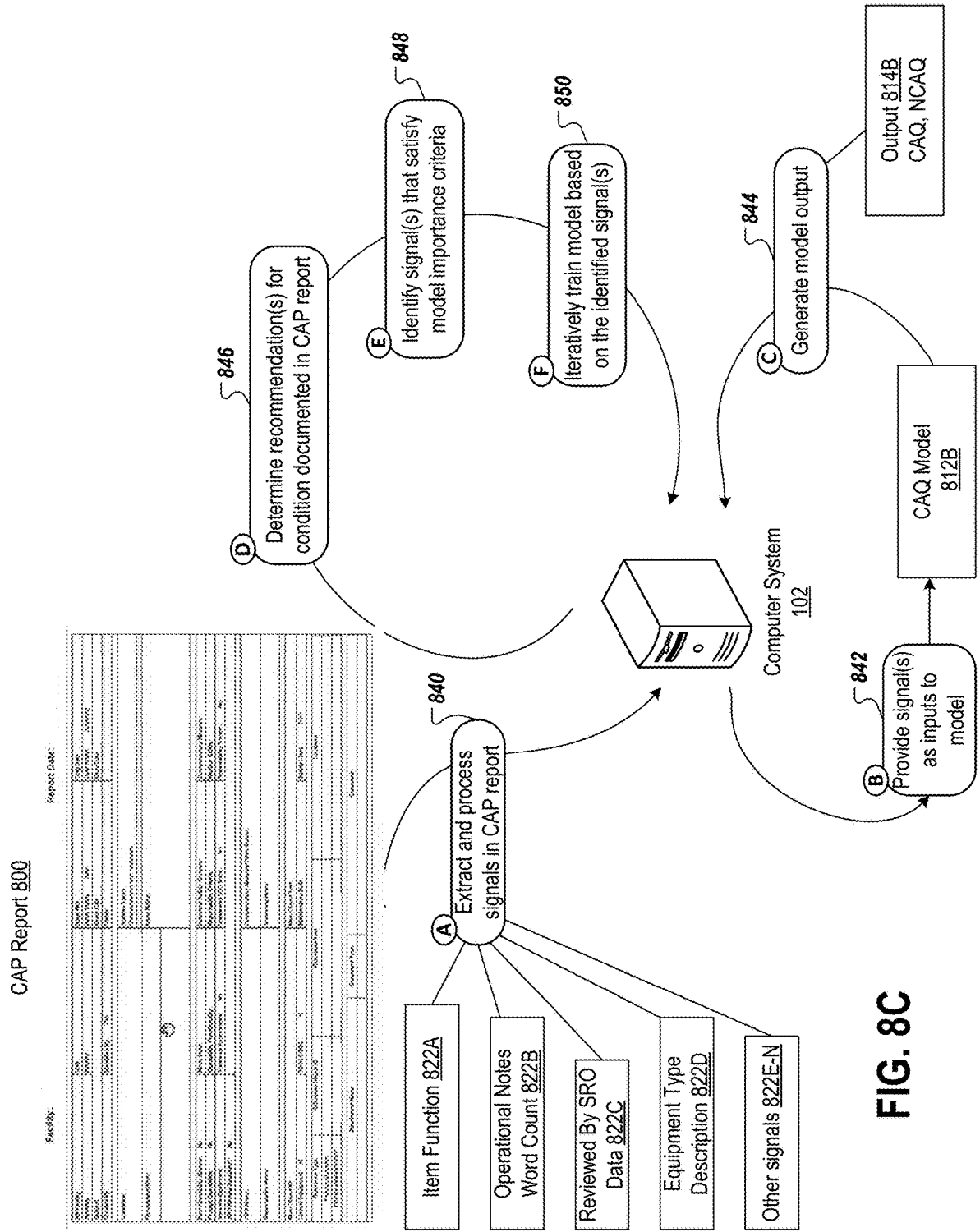

As shown in FIG. 8C, the CAQ model 812B can receive, as inputs, the following signals in order of highest importance to lowest importance: item function 822A, operational notes word count 822B, reviewed by SRO data 822C, equipment type description 822D, and other signals 822E-N. The signals 822A-D can indicate a top 4 signals having highest importance for use by the CAQ model 812B. After all, item function (signal 822A) can be a most predictive feature, as well as operational word counts (signal 822B) and system information (signal 822C). The other signals 822E-N can include, but are not limited to, in the following order of most important to least important: safety related flag, condition text word count, issue notes text word count, other item functions, recommendation text word count, whether the issue causes an unplanned LCO, action text word count, count of previous priority/FLOCs filtered by C priority, operational notes text flagged for having the word "fu," tech spec equipment flag, flag for SRO nuclear safety, issues text word count, other item functions, condition text flagged for having the word "ill," issue SRO review data, and action text flagged for having the word "ww."

Figure 8D:
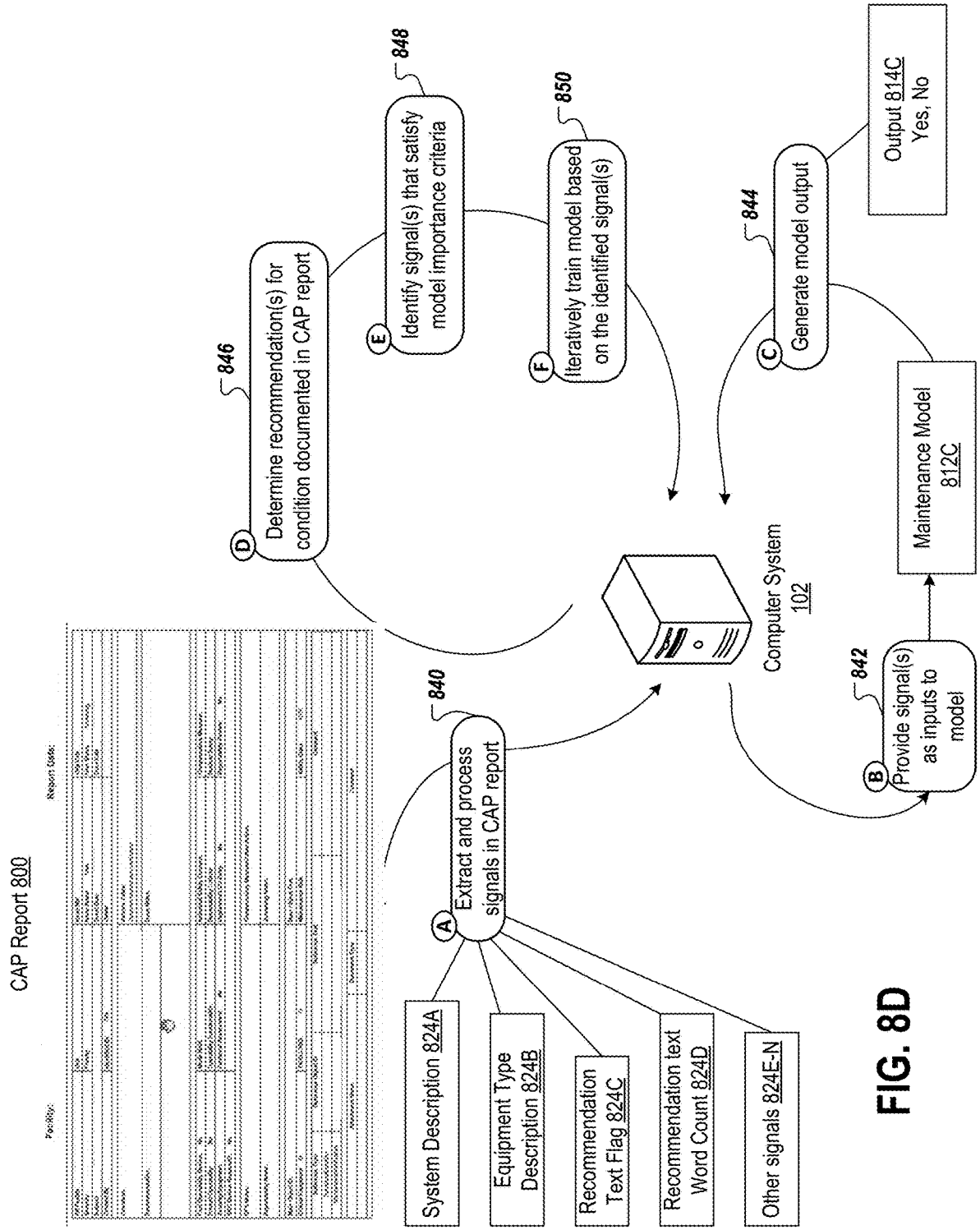

As shown in FIG. 8D, the maintenance model 812C can receive, as inputs, the following signals in order of highest importance to lowest importance: system description 824A, equipment type description 824B, recommendation text flagged for having the word "ep" 824C, recommendation text word count 824D, and other signals 824E-N. The signals 824A-D can indicate a top 4 signals having highest importance for use by the maintenance model 812C. After all, system (signal 824A) and equipment (signal 824B) descriptions can be most predictive features of whether an issue will be CTPMN. The other signals 824E-N can include, but are not limited to, in the following order of most important to least important: operational notes text flagged for having the word "et," recommendation text flagged for having the word "ce," condition text flagged for having the word "fleet," operational notes text flagged for having the word "il," operational notes text flagged for having the word "pl," recommendation text flagged for having the word "learn," a safety related flag, condition text having the word "qualif," recommendation text having the word "mov," recommendation text flagged for having the word "fleet," operational notes text flagged for having the word "il," condition text flagged for having the word "cfr," condition text having the word "medic," a tech spec equipment flag, recommendation text having "otha," and condition text flagged for having the word "commit."

Figure 8E:
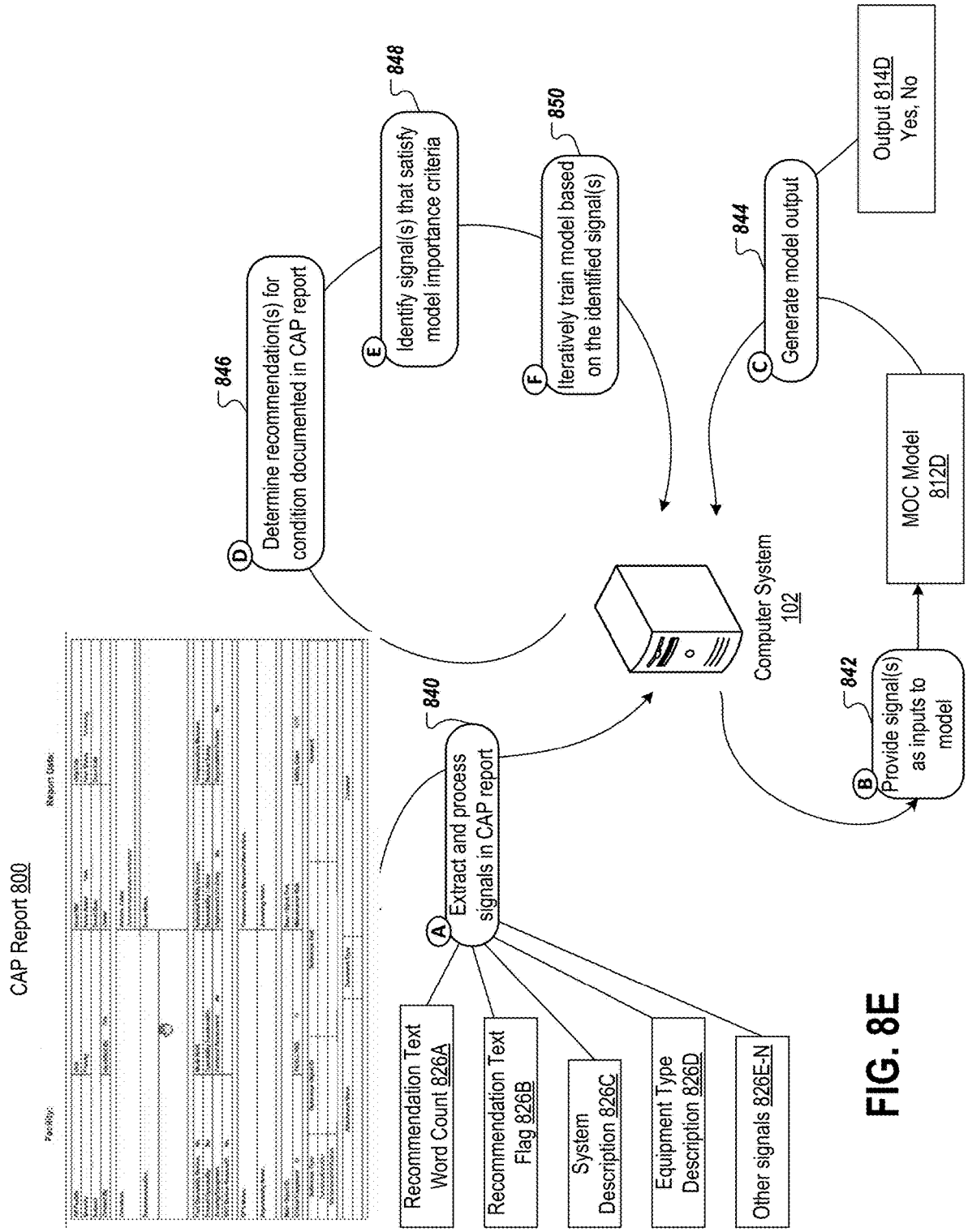

As shown in FIG. 8E, the MOC model 812D can receive, as inputs, the following signals in order of highest importance to lowest importance: recommendation text word count 826A, recommendation text flagged with the word "repair" 826B, system description 826C, equipment type description 826D, and other signals 826E-N. The signals 826A-D can indicate a top 4 signals having highest importance for use by the MOC model 812D. After all, words in the recommendation text (signal 826A) and appearance of "repair" in the recommendation text (signal 826B) can be most predictive features of whether an issue closes to MOC (CTMOC). The other signals 826E-N can include, but are not limited to, in the following order of most important to least important: action text flagged for having the word "mn," references to 12-digit MOCs in the issue notes, recommendation text having the word "clean," references to 12-digit MOCs in the action text, references to 12-digit MOCs in the recommendation text, a safety related equipment flag, action text flagged for having the word "dispatch," action text flagged for having the word "cord," action text flagged for having the word "dispos," action text flagged for having the word "unabl," action text flagged for having the word "capwr," recommendation text flagged for having the word "ctt," issue notes text flagged for having the word "fdt," action text flagged for having the word "employee," issue notes text flagged for having the word "nli," and issue notes text flagged for having the word "fpwmnlmp."

Figure 8F:
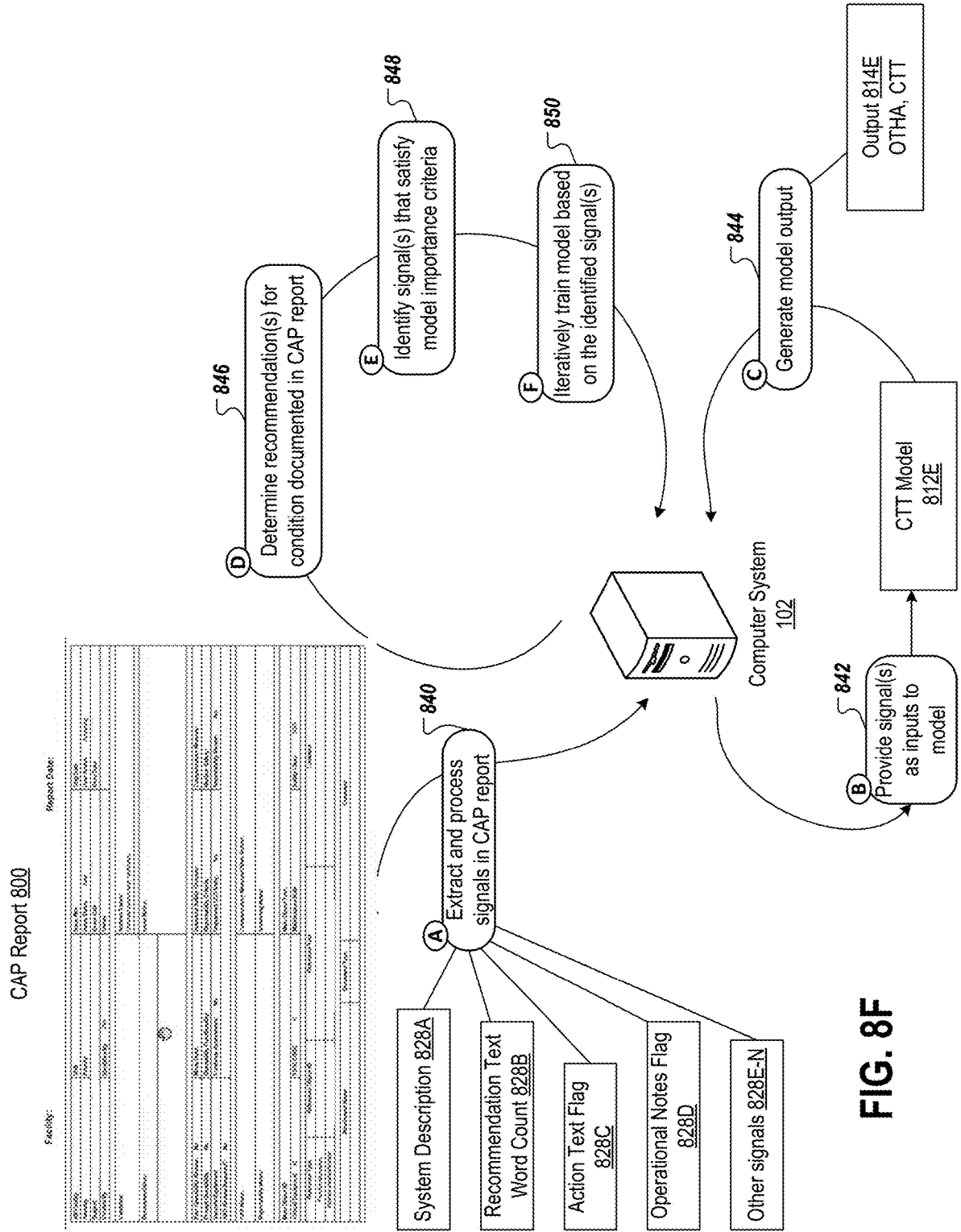

As shown in FIG. 8F, the CTT model 812E can receive, as inputs, the following signals in order of highest importance to lowest importance: system description 828A, recommendation text word count 828B, action text flagged for having the word "mn" 828C, operational notes flagged for having the word "g" 828D, and other signals 828E-N. The signals 828A-D can indicate a top 4 signals having highest importance for use by the CTT model 812E. After all, system (signal 828A) and number of words in the recommendation text (signal 828B) can be most predictive features of issues being closed to trend (CTT). The other signals 828E-N can include, but are not limited to, in the following order of most important to least important: condition text word count, action text word count, recommendation text flagged for having the word "ce," action text flagged for having the word "ff," a safety related equipment flag, action text flagged for having the word "wr," recommendation text flagged for having the word "shoot," recommendation text flagged for having the word "cord," action text flagged for having the word "measur," operational notes text flagged for having the word "repair," operational notes text flagged for having the word "enter," recommendation text flagged for having the word "enter," recommendation text flagged for having the word "pack," recommendation text flagged for having the word "fit," a tech spec equipment flag, operational notes text flagged for having the word "mu," and recommendation text flagged for having the word "bulb."

Figure 8G:
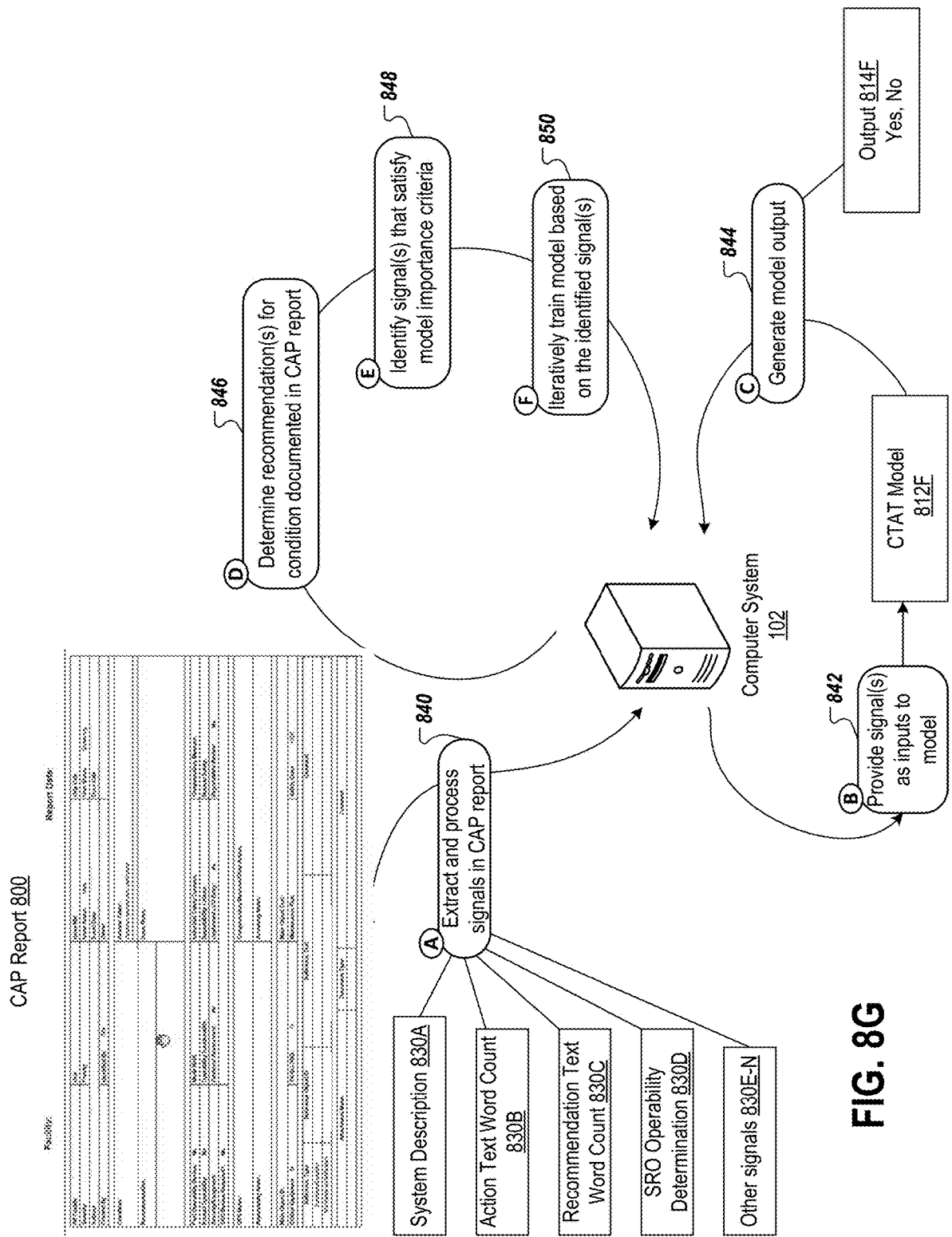

As shown in FIG. 8G, the CTAT model 812F can receive, as inputs, the following signals in order of highest importance to lowest importance: system description 830A, action text word count 830B, recommendation text word count 830C, SRO operability determination 830D, and other signals 830E-N. The signals 830A-D can indicate a top 4 signals having highest importance for use by the CTAT model 812F. After all, system descriptions (signal 830A) and number of words in the action text (signal 830B) can be most predictive features for CTAT issues. The other signals 830E-N can include, but are not limited to, in the following order of most important to least important: action text flagged for having the word "mn," condition text word count, operational notes text word count, recommendation text flagged for having the word "ti," action text flagged for having the word "wr," recommendation text flagged for having the word "ctat," recommendation text flagged for having the word "sa," action text flagged for having the word "nc," a safety related equipment flag, recommendation text flagged for having the word "eng," recommendation text flagged for having the word "ba," a tech spec equipment flag, operational notes text flagged for having the word "boric," action text flagged for having the word "fdt," recommendation text flagged for having the word "vulner," and recommendation text flagged for having the word "reg."

Figure 8H:
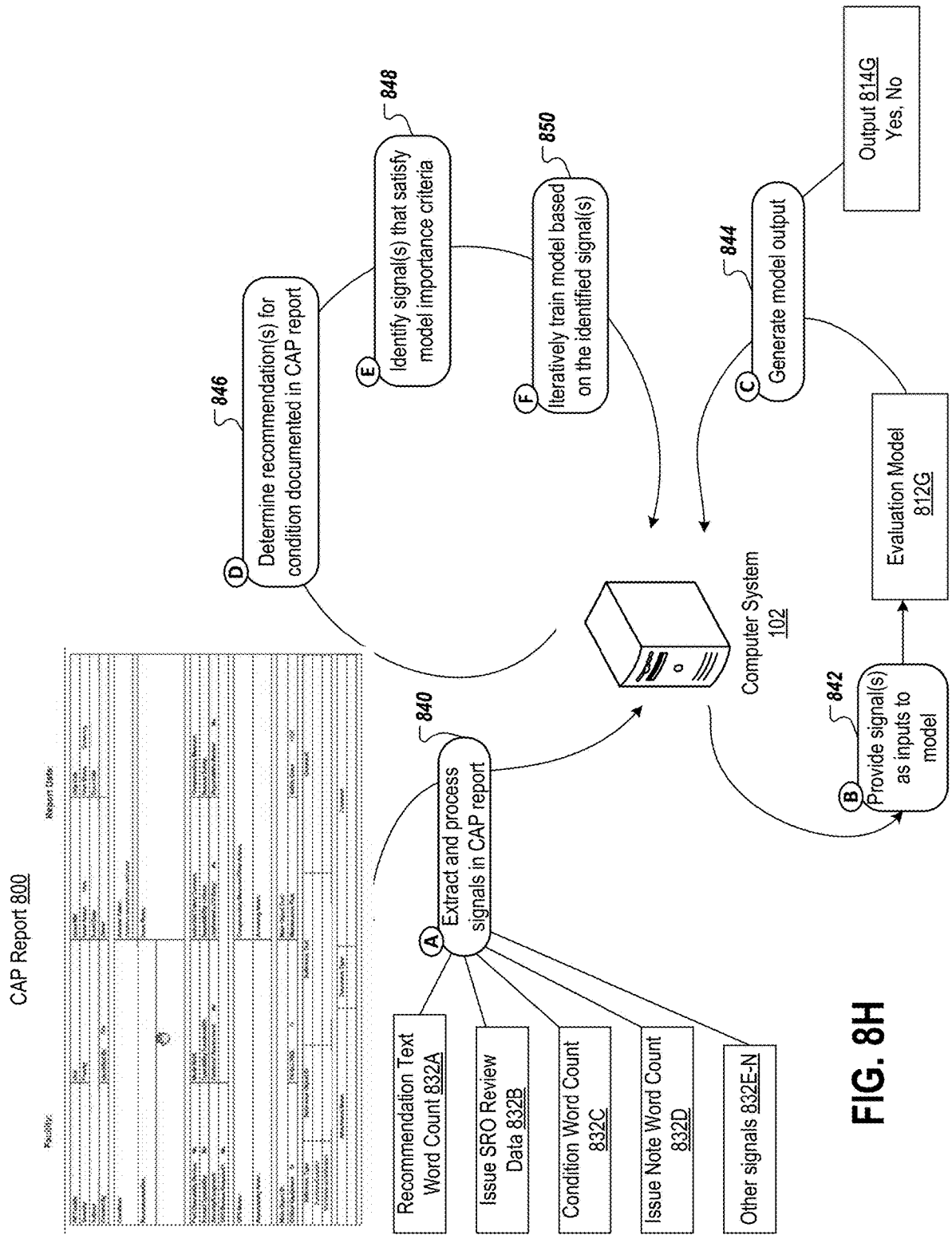

As shown in FIG. 8H the evaluation model 812G can receive, as inputs, the following signals in order of highest importance to lowest importance: recommendation text word count 832A, issue SRO review data 832B, condition word count 832C, issue note word count 832D, and other signals 832E-N. The signals 832A-D can indicate a top 4 signals having highest importance for use by the evaluation model 812G. After all, number of words contained in the recommendation notes (signal 832A) can be a most predictive feature of requiring an evaluation. The other signals 832E-N can include, but are not limited to, in the following order of most important to least important: equipment type description, SRO operability determination, recommendation text flagged for having the word "ce," safety related equipment flag, recommendation text flagged for having the word "ctat," operational notes text flagged for having the word "ste," recommendation text flagged for having the word "ast," operational notes text flagged for having the word "boric," tech spec equipment flag, recommendation text flagged for having the word "wm," operational notes text flagged for having the word "inact," recommendation text flagged for having the word "gate," recommendation text flagged for having the word "bulb," and operational notes text flagged for having the word "door."

Figure 8I:
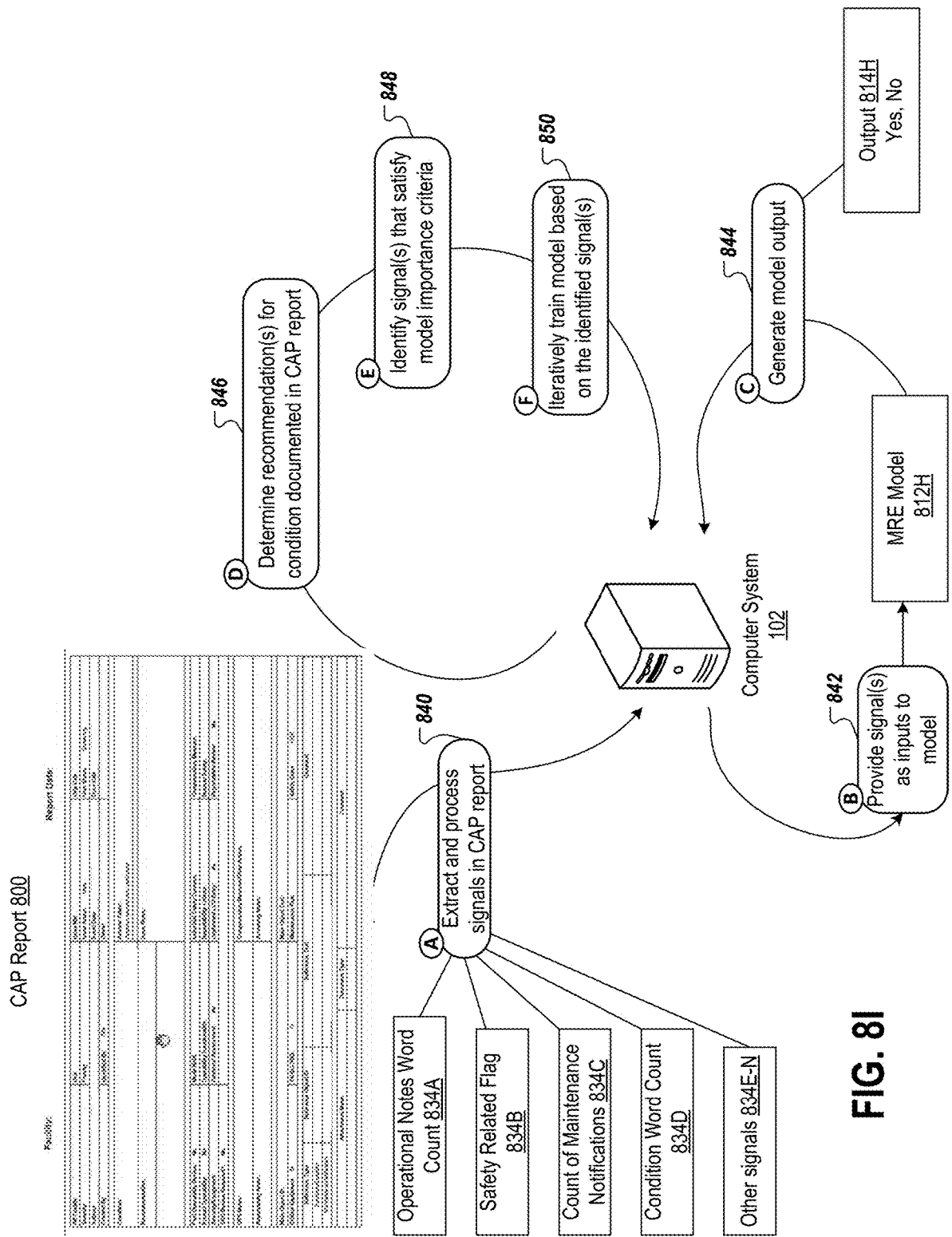

As shown in FIG. 8I the MRE model 812H can receive, as inputs, the following signals in order of highest importance to lowest importance: operational notes word count 834A, safety related equipment flag 834B, count of maintenance notifications 834C, condition word count 834D, and other signals 834E-N. The signals 834A-D can indicate a top 4 signals having highest importance for use by the MRE model 812H. After all, number of words in the operational notes (signal 834A) can be a most predictive feature for requiring a maintenance rules evaluation. The other signals 834E-N can include, but are not limited to, in the following order of most important to least important: recommendation text flagged for having the word "evaluate," issue notes text word count, recommendation text word count, recommendation text flagged for having the word "ce," recommendation text flagged for having the word "determine," operational notes text flagged for having the word "inact," operational notes text flagged for having the word "latch," operational notes text flagged for having the word "wastag," a tech spec equipment flag, recommendation text flagged for having the word "investigate," recommendation text flagged for having the word "boric," recommendation text flagged for having the word "cause," issue notes text flagged for having the word "ce," operational notes text flagged for having the word "door," recommendation text flagged for having the word "extent of condition," and action text flagged for having the word "wo."

Figure 8J:
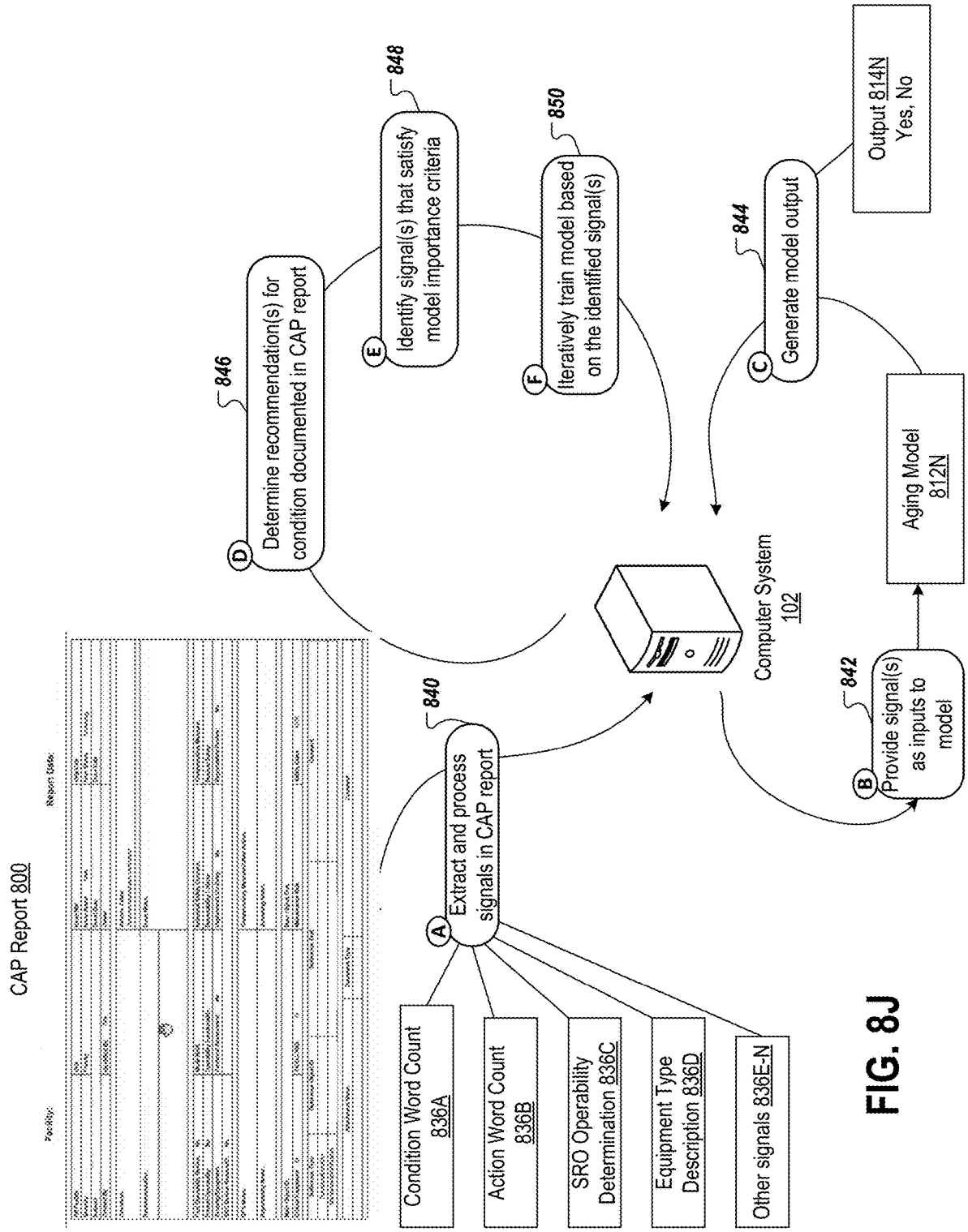

As shown in FIG. 8J the aging model 812N can receive, as inputs, the following signals in order of highest importance to lowest importance: condition word count 836A, action word count 836B, SRO operability determination 836C, equipment type description 836D, and other signals 836E-N. The signals 836A-D can indicate a top 4 signals having highest importance for use by the aging model 812N. After all, a number of words in the condition text (signal 836A) and the action text (signal 836B) can be most predictive factors of an aging management requirement. The other signals 836E-N can include, but are not limited to, in the following order of most important to least important: system description, recommendation text word count, locations with a previous aging management classification, safety related equipment flag, recommendation text flagged for having the word "secur," operational notes text flagged for having the word "alarm," recommendation text flagged for having the word "ba," operational notes text flagged for having the word "inact," recommendation text flagged for having the word "learn," recommendation text flagged for having the word "rp," recommendation text flagged for having the word "calibr," recommendation text flagged for having the word "step," operational notes text flagged for having the word "temp," recommendation text flagged for having the word "respons," recommendation text flagged for having the word "light," and recommendation text flagged for having the word "commun."

Referring back to the FIGS. 8A-J, each of the models 812A-N generate the respective output 814A-N based on processing the received signal(s) (block C, 844).

For example, with respect to the priority model 812A in FIG. 8B, the model 812A can generate the output 814A based on any of the following rules and/or predictions: issues involving a high number of words (e.g., a word count that satisfies some threshold word count or other criteria) in the issue notes text (signal 820A) are predictive of an output of "A/B;" item functions passive and active equipment (signal 820B) are more likely than "None" to generate output of "A/B;" issues involving a high number of words in the condition text (signal 820C) are more likely to result in the output "A/B;" issues involving a high number of words in the issue notes text (signal 820D) are less likely to result in the output "A/B;" issues with high counts of previous C issues at location are less likely to result in the output "A/B;" issues reviewed by SROs are less likely to result in the output "A/B;" issues involving a high number of words in the action text may be predictive of "A/B;" issues involving a high number of words in the operational notes text can result in the output "A/B;" issues containing the word "rule" in the operational notes text are less likely to result in the output "A/B;" issues containing the word "sa" in the operational notes text are also less likely to result in the output "A/B;" issues containing the word "k" in the operational notes text are less likely to result in the output "A/B;" issues containing the word "close" in the recommendation text are less likely to result in the output "A/B;" equipment types logic controller and/or position transmitter are slightly more likely to result in the output "A/B;" issues involving a high number of words in the recommendation text are predictive of "A/B" output; issues containing the word "kpi" in the condition notes text have mixed effects on likelihood of the output being "A/B;" issues on safety-related equipment are more likely to result in the output "A/B;" issues with low counts of previous A/B issues at location are more likely to result in the output "A/B;" issues containing the word "dri" in the condition text are less likely to result in the output "A/B;" issues containing the word "now" in the condition text are less likely to result in the output "A/B;" and issues flagged for SRO Nuclear safety are more likely to result in the output "A/B."

As another example, with respect to the CAQ model 812B in FIG. 8C, the model 812B can generate the output 814B based on any of the following rules and/or predictions: item functions passive and active equipment are more likely than "None" to result in the output "CAQ;" a high number of words in the operational notes are more likely to result in the output "CAQ;" issues reviewed by SRO are likely to be classified as CAQ issues; equipment type descriptions of nuclear instrumentation, p-field control box, and de-aerator are more likely to result in the output "CAQ;" issues tied to safety related equipment are highly likely to be CAQ; a high number of words in the conditions text are more likely to result in the output "CAQ;" a high number of words in the issue notes text are more likely to result in the output "CAQ;" item functions of SEIS II/I and transfer heat equipment are more likely than "None" to result in the output "CAQ;" a high number of words in the recommendation text are more likely to result in the output "CAQ;" issues causing unplanned LCO are more likely to be classified as CAQ issues; a high number of words in the action text are more likely to result in the output "CAQ;" issues which previously had C-level CAQs are less likely to result in the output "CAQ;" items with text 'fu' in operation notes are less likely to result in the output "CAQ;" issues tied to tech spec equipment are highly likely to result in the output "CAQ;" issues tagged for SRO nuclear safety are slightly more likely to result in the output "CAQ;" a low number of words in the issue text have a mixed effect on CAQ likelihood; item functions of MSPB, Passive, and Active equipment are more likely than "None" to result in the output "CAQ;" items with text 'ill' in condition text are less likely to result in the output "CAQ;" SRO-reviewed issue identification of Tech spec/ Requirement, tech spec, ODCM, and EP ISSUE2 are likely to result in the output "CAQ;" and items with text 'ww' in action text are less likely to result in the output "CAQ."

With respect to the maintenance model 812C in FIG. 8D, the model 812C can generate the output 814C based on any of the following rules and/or predictions: systems of Security Lighting and Grounding, and Hot Lab Vent system descriptions are more likely to result in the outputted value of "CTPMN" (or "Yes"); level indicating controller, speed transmitter, and package equipment descriptions are more likely to result in the output "CTPMN;" issues containing the word "ep" in the recommendation text are more likely to be classified CTPMN; a high number of words in the recommendation text are less likely to result in the output "CTPMN;" issues containing the word "et" in the recommendation text are more likely to be classified CTPMN; issues containing the word "CE" in the recommendation text are less likely to be classified CTPMN; issues containing the word "fleet" in the condition text are less likely to be classified CTPMN; issues containing the word "il" in the operational notes text have mixed effects on CTPMN output determinations; issues containing the word "pl" in the operational notes text have mixed effects on CTPMN output determinations; issues containing the word "learn" in the recommendation text are less likely to be classified CTPMN; issues occurring on safety related equipment have mixed effects on CTPMN; issues containing the word "qualif" in the condition text are less likely to be classified CTPMN; issues containing the word "mov" in the recommendation text are more likely to be classified CTPMN; issues containing the word "fleet" in the recommendation text are less likely to be classified CTPMN; issues containing the word "il" in the operational text have mixed effects on CTPMN; issues containing the word "cfr" in the condition text are less likely to be classified CTPMN; issues containing the word "medic" in the condition text are less likely to be classified CTPMN; issues on tech spec equipment are less likely to be classified CTPMN; issues containing the word "otha" in the recommendation text are less likely to be classified CTPMN; and issues containing the word "commit" in the condition text are less likely to be classified CTPMN by the model 812C.

With respect to the MOC model 812D in FIG. 8E, the model 812D can generate the output 814D based on any of the following rules and/or predictions: a high number of words in the recommendation text are more likely to result in the output of "CTMOC" (or "Yes"); issues containing the word "repair" in the action text are less likely to be classified CTMOC; issues occurring on E5 Emerg. Generators, Tech Support Center, or Crane equip. systems are more likely to be CTMOC; issues occurring on Humidifiers and motor valves as part of the equipment description are more likely to be CTMOC; issues containing the word "mn" in the action text are less likely to be classified CTMOC; issues containing references to 12-digit MOCs in the issue notes are highly likely to result in the output "CTMOC;" issues containing the word "clean" in the recommendation text are less likely to be classified CTMOC; issues containing references to 12-digit MOCs in the action text are highly likely to be CTMOC; issues containing references to 12-digit MOCs in the recommendation text are highly likely to be CTMOC; issues occurring on safety related equipment are more likely to result in the output "MOC" (or "No"); issues containing the word "dispatch" in the action text are less likely to be classified CTMOC; issues containing the word "cord" in the action text have mixed effects on CTMOC likelihood; issues containing the word "dispos" in the action text are less likely to be classified CTMOC; issues containing the word "unabl" in the action text are less likely to be classified CTMOC; issues containing the word "capwr" in the action text are less likely to be classified CTMOC; issues containing the word "ctt" in the recommendation text are less likely to be classified CTMOC; issues containing the word "fdt" in the action text are less likely to be classified CTMOC; issues containing the word "employe" in the recommendation text are less likely to be classified CTMOC; issues containing the word "nli" in the issues notes text have mixed effects on CTMOC likelihood; and issues containing the word "fpwmnlmp" in the issue notes text are less likely to be classified CTMOC by the model 812D.

With respect to the CTT model 812E in FIG. 8F, the model 812E can generate the output 814E based on any of the following rules and/or predictions: issues occurring on condensate demin, 250 V DC, and 125 V DC systems are more likely to result in the output "CTT;" a large number of words in the recommendation text are less likely to be CTT; issues containing the word "mn" in the action text are less likely to be CTT; issues containing the word "g" in the operational notes have mixed effects on CTT likelihood; issues containing a large number of words in condition text are less likely to be CTT; issues containing a large number of words in action text are less likely to be CTT; issues containing the word "ce" in the recommendation text have mixed effects on CTT likelihood; issues containing the word "ff" in the issue action text are less likely to be CTT; issues occurring on safety related equipment are less likely to be CTT; issues containing the word "wr" in the issue action text have mixed effects on CTT likelihood; issues containing the word "shoot" in the recommendation text are less likely to be CTT; issues containing the word "cord" in the recommendation text are less likely to be CTT; issues containing the word "measur" in the action text are less likely to be CTT; issues containing the word "repair" in the operational notes text are less likely to be CTT; issues containing the word "enter" in the operational notes text are less likely to be CTT; issues containing the word "pack" in the recommendation text have mixed effects on CTT likelihood; issues containing the word "fit" in the recommendation text are less likely to be CTT; issues occurring on tech spec equipment have mixed effects on CTT likelihood; issues containing the word "mu" in the operational notes text have mixed effects on CTT likelihood; and issues containing the word "bulb" in the recommendation text are less likely to be CTT.

With respect to the CTAT model 812F in FIG. 8G, the model 812F can generate the output 814F based on any of the following rules and/or predictions: issues occurring on measurement and test equipment, 24V DC, and ALARA systems are more likely to result in the output "CTAT" (or "Yes"); a high number of words in the action text are more likely to be CTAT; a high number of words in the recommendation text are less likely to be CTAT; issues that are In-Operable and Non-functional are more likely to be closed to CTAT; issues containing the word "mn" in the action text are less likely to be CTAT; a high number of words in the condition text are less likely to be CTAT; a high number of words in the operational notes text are less likely to be CTAT; issues containing the word "ti" in the recommendation text have mixed effects on CTAT likelihood; issues containing the word "wr" in the action text have mixed effects on CTAT likelihood; issues containing the word "ctat" in the recommendation text are more likely to be CTAT; issues containing the word "sa" in the recommendation text have mixed effects on CTAT likelihood; issues containing the word "nc" in the action text have mixed effects on CTAT likelihood; issues occurring on safety related equipment have mixed effects on CTAT likelihood; issues containing the word "eng" in the recommendation text have mixed effects on CTAT likelihood; issues containing the word "ba" in the recommendation text have mixed effects on CTAT likelihood; issues occurring on tech spec equipment have mixed effects on CTAT likelihood; issues containing the word "boric" in the operational notes text are less likely to be CTAT; issues containing the word "fdt" in the action text are less likely to be CTAT; issues containing the word "vulner" in the recommendation text are less likely to be CTAT; and issues containing the word "reg" in the recommendation text are less likely to be CTAT.

With respect to the evaluation model 812G in FIG. 8H, the model 812G can generate the output 814G based on any of the following rules and/or predictions: a large number of words in recommendation text are more likely to result in output indicating that the issue requires evaluation (or "Yes" as the output); Tech Support Systems, External Agency, Unknown, Unknown Equipment1 identified as the issue SRO review are more likely to require evaluation; a large number of words in condition text are more likely to require evaluation; a large number of words in issue notes are more likely to require evaluation; GRD & Cathodic Protection, Rod Position Indication, and Nuclear Instrumentation system type descriptions are more likely to require evaluation; a large number of words in operational notes text are more likely to require evaluation; Test Equipment, Small Bore Hanger, and Blender equipment type descriptions are more likely to require evaluation; In-Operable equipment determinations are highly likely to require evaluation; issues containing the word "ce" in the recommendation text are more likely to require evaluation; issues occurring on safety related equipment are more likely to require evaluation; issues containing the word "ctat" in the recommendation text are less likely to require evaluation; issues containing the word "ste" in the operational notes text have mixed effects on likelihood of requiring evaluation; issues containing the word "ast" in the recommendation text are more likely to require evaluation; issues containing the word "boric" in the operational notes text are more likely to require evaluation; issues tied to tech spec equipment have mixed effects on likelihood of requiring evaluation; issues containing the word "wm" in the recommendation text are less likely to require evaluation; issues containing the word "inact" in the operational notes text are more likely to require evaluation; issues containing the word "gate" in the recommendation text are less likely to require evaluation; issues containing the word "bulb" in the recommendation text are less likely to require evaluation; and issues containing the word "door" in the operational notes text are less likely to require evaluation.

With respect to the MRE model 812H in FIG. 8I, the model 812H can generate the output 814H based on any of the following rules and/or predictions: a large number of words in operational notes are more likely to result in output that an issue requires MRE (or an output value of "Yes"); issues occurring on safety related equipment are more likely to require MRE; a high number of maintenance notifications are less likely to require MRE; a large number of words in condition text are more likely to require MRE; issues containing the word "evaluate" in the recommendation text are more likely to require MRE; a large number of words in issue notes are more likely to require MRE; a large number of words in recommendation text are more likely to require MRE; issues containing the word "ce" in the recommendation text are more likely to require MRE; issues containing the word "determine" in the recommendation text are more likely to require MRE; issues containing the word "inact" in the operational notes text are more likely to require MRE; issues containing the word "latch" in the operational notes text are less likely to require MRE; issues containing the word "wastage" in the operational notes text are more likely to require MRE; issues occurring on tech spec equipment have mixed effects on evaluation; issues containing the word "investigate" in the recommendation text have mixed effects to require MRE; issues containing the word "boric" in the recommendation text are more likely to require MRE; issues containing the word "cause" in the recommendation text are more likely to require MRE; issues containing the word "ce" in the issue notes text are more likely to require MRE; issues containing the word "door" in the operational notes text are less likely to require MRE; issues containing "extent of condition" in the recommendation text are more likely to require MRE; and issues containing the word "wo" in the action text are have mixed effects on evaluation.

With respect to the aging model 812N in FIG. 8J, the model 812N can generate the output 814N based on any of the following rules and/or predictions: a large number of words in the condition text are more likely to require aging management, and thus the output can be "Yes;" a large number of words in the action text are less likely to require Aging management; SRO Operability determinations of Operable and Functional are more likely to require Aging management; equipment types of Blender, Piping and Transmitter are more likely to require Aging management; system descriptions of Cathodic Protection, and Residual Heat Removal are more likely to require Aging management; a large number of words in the recommendation text are less likely to require Aging management; issues in locations with a previous Aging management are more likely to require Aging management; issues in safety related equipment is uncertain to require Aging management; issues containing the word "secur" in the recommendation text are less likely to require Aging management; issues containing the word "alarm" in the operational notes text are less likely to require Aging management; issues containing the word "ba" in the recommendation text has a mixed effect on requiring Aging management; issues containing the word "inact" in the operational notes text are more likely to require Aging management; issues containing the word "learn" in the recommendation text are less likely to require Aging management; issues containing the word "rp" in the recommendation text are less likely to require Aging management; issues containing the word "calibr" in the recommendation text are less likely to require Aging management; issues containing the word "step" in the recommendation text are less likely to require Aging management; issues containing the word "temp" in the operational notes text are less likely to require Aging management; issues containing the word "respons" in the recommendation text are less likely to require Aging management; issues containing the word "light" in the recommendation text are less likely to require Aging management; and issues containing the word "commun" in the recommendation text are less likely to require Aging management.

Referring back to the FIGS. 8B-J, the computer system 102 can determine at least one recommendation for a condition or issue documented in the CAP report 800 based on the model 812A-N's output 814A-N in block D (846). The computer system 102 can generate at least one recommendation per model output 814A-N. Additionally or alternatively, the computer system 102 can generate at least one recommendation based on a combination of one or more of the outputs 814A-N. Refer to description of the process 300 in FIGS. 3A-C for further discussion.

Still referring to the FIGS. 8B-J, for each of the models 812A-N, the computer system 102 can also identify at least one signal that satisfies model importance criteria (block E, 848). In other words, the computer system 102 can identify which signal(s) is most critical or dispositive in determining the output for a particular model. As a result, the selection of signals provided to each model in block B (842) can change over time if one or more signals become more or less dispositive in the model's processing and output generation.

Accordingly, the computer system 102 can iteratively train each of the models 812A-N based on the respective identified signals (block F, 850).

Although FIGS. 8A-J describe enumerated outputs, one or more other values can also be generated and outputted by the models described herein.

Figure 9:
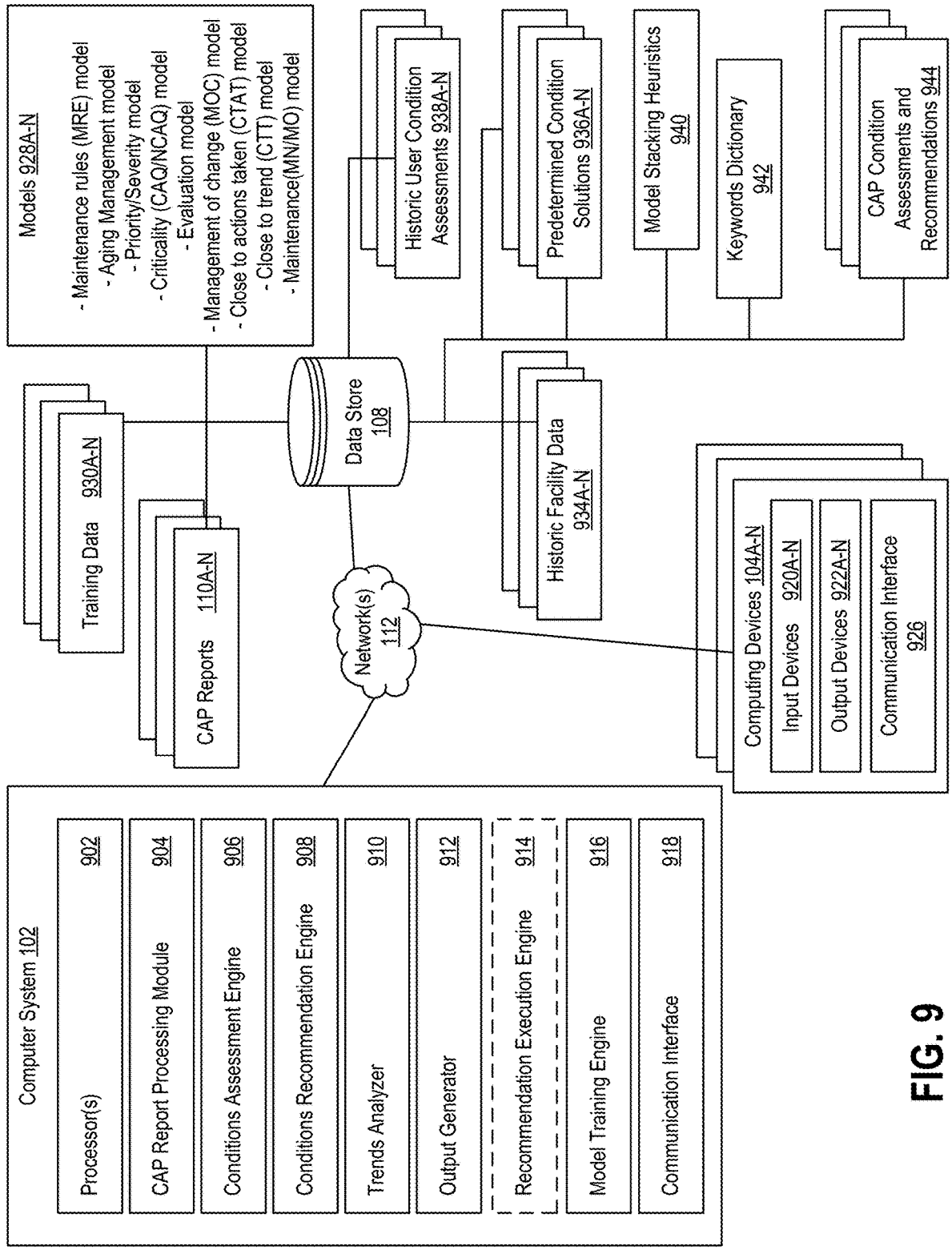
FIG. 9 is a system diagram of one or more components used for performing the techniques described herein.

FIG. 9 is a system diagram of one or more components used for performing the techniques described herein. As described above in reference to FIG. 1, the computer system 102, computing devices 104A-N, and data store 108 communicate (e.g., wired and/or wirelessly) via the network(s) 112.

The computer system 102 can include processor(s) 902, CAP report processing module 904, conditions assessment engine 906, conditions recommendation engine 908, trends analyzer 910, output generator 912, an optional recommendation execution engine 914, model training engine 916, and a communication interface 918. The components 902-918 are merely illustrative. The computer system 102 can include one or more additional, fewer, or other components, modules, and/or engines to perform the techniques described herein.

The CAP report processing module 904 can be configured to process CAP reports 110A-N for one or more facilities that are received from the computing devices 104A-N (and/or retrieved from the data store 108) to extract and identify details, such as text and other values inputted into the reports, that can be used to identify and assess negative conditions or issues that are documented in the CAP reports. For example, the engine 904 can use a keywords dictionary 942, accessible from the data store 108, to identify and extract keywords from the CAP reports 110A-N. The extracted keywords may be used by the conditions assessment engine 906 to identify a type of negative condition documented in each CAP report 110A-N. Refer to block C (124) in FIG. 1 and block 304 in the process 300 for further discussion about processing the CAP reports 110A-N.

The conditions assessment engine 906 can be configured to identify negative conditions documented in the CAP reports 110A-N and one or more characteristics/information about the negative conditions. The engine 906 can apply one or more models 928A-N to the details that were extracted from the CAP reports 110A-N by the CAP report processing module 904. The engine 906 can retrieve the models 928A-N from the data store 108. The models 928A-N can include, but are not limited to, a maintenance rules model, an aging management model, a priority model, a criticality model, an evaluation model, a management of change model, a close to actions taken model, a close to trend model, and/or a maintenance model. One or more other models 928A-N can also be stored in the data store 108 and retrieved by the conditions assessment engine 906 during runtime execution. The conditions assessment engine 906 can also apply model stacking heuristics 940 in order to determine an order in which to apply the models 928A-N. Refer to block D (128) in FIG. 1, blocks 308-336 in the process 300 of FIGS. 3A-C, and the process 400 in FIGS. 4A-C for further discussion about operations of the conditions assessment engine 906.

The conditions recommendation engine 908 can be configured to generate one or more CAP condition assessments and recommendations 944 about the negative condition that was identified and analyzed by the conditions assessment engine 906. The recommendations can include, for example, corrective actions to be taken by one or more relevant users associated with the facility. The recommendations can include assignments of the identified condition(s) to various groups, teams, individuals, or other entities associated with the facility. The engine 908 can also generate confidence values for each recommendation or a group of recommendations. Refer to block E (128) in FIG. 1 and blocks 316-338 in the process 300 of FIGS. 3A-C for further discussion about generating recommendations.

The trends analyzer 910 can be configured to determine one or more trends for the facilities. The trends can be based on any determinations made by the CAP report processing module 904, conditions assessment engine 906, and/or conditions recommendation engine 908. For example, the trends analyzer 910 can determine top keywords that were identified by the module 904 as being used in CAP reports 110A-N over a predetermined period of time (e.g., a last 2 years). The analyzer 910 can additionally or alternatively determine probabilities that one or more keywords and/or trend codes will spike over some future period of time. The analyzer 910 can additionally or alternatively determine values for KPI metrics of the facility, based on the conditions and activities that are identified in the CAP reports 110A-N associated with the facility. The analyzer 910 can also determine any other trends or performance metrics that can be used by relevant users in the facilities to monitor, plan, and/or improve their operations and management. Refer to FIGS. 7A-J for further discussion about different trends and/or performance metrics that can be determined by the trends analyzer 910.

The output generator 912 can be configured to generate any of the output described throughout this disclosure, based on the CAP condition assessments and recommendations 944 from the conditions assessment engine 906 and/or the conditions recommendation engine 908. The generator 912 can also generate output indicating trends of other performance metrics determined by the trends analyzer 910. Refer to blocks F, H, and I in FIG. 1, blocks 340-348 in the process 300 of FIGS. 3A-C, and FIGS. 5-7 for further discussion about output generation. The output generated by the generator 912 can be transmitted to one or more of the computing devices 104A-N, as described further below.

The optional recommendation execution engine 914 can be configured to automatically execute one or more of the recommendations, such as corrective actions, assignments of activities or actions to various users associated with the facility, etc., generated by the conditions recommendation engine 908. Sometimes, the engine 914 can also execute one or more recommendations, interventions, or other actions that are inputted by relevant users at the computing devices 104A-N. Refer to block I (136) in FIG. 1 and block 346 in the process 300 of FIGS. 3A-C for further discussion.

The model training engine 916 can be configured to generate, train, and iteratively or continuously improve the generated models 928A-N. The engine 916 can retrieve, from the data store 108, training data 930A-N, historic user condition assessments 938A-N, predetermined condition solutions 936A-N, and historic facility data 934A-N to be used in generating and training the models 928A-N. In brief, the training data 930A-N can include previously completed and/or assessed CAP reports, annotated CAP reports, or any other training data described herein (e.g., refer to block 202 in the process 200 of FIG. 2). The historic user condition assessments 938A-N can include information generated as part of manual human review of CAP reports for the facility or a group of facilities. As an illustrative example, the information can include a human-made determination that a particular CAP report documents an issue of high priority and high criticality. The predetermined condition solutions 936A-N can include rules and/or a list of solutions, recommendations, and/or determinations that can be made for one or more different types of conditions that can be documented in the CAP reports 110A-N. Sometimes, for example, the predetermined condition solutions 936A-N can include information annotated in the training data 930A-N, the CAP reports 110A-N, and/or the historic user condition assessments 938A-N. The historic facility data 934A-N can include historic data about each facility, including information such as trends in counts of CAPs, open CAP activities, closed CAP activities, and various KPI metrics associated with the facility. The data 934A-N may also include organizational structure information, such as jobs, roles, responsibilities, and titles, which can be used to train one or more of the models 928A-N how and to whom to assign various activities and actions associated with conditions documented in the CAP reports 110A-N.

The engine 916 can also retrieve, from the data store 108, the CAP reports 110A-N, the keywords dictionary 942, and/or the CAP condition assessments and recommendations 944 for use in continuously training or improving the models 928A-N once they are used during runtime execution. The keywords dictionary 942 can include a list of keywords that can be used by the computer system 102 (and/or any of the models 928A-N) to identify a negative condition documented in the CAP reports 110A-N. The dictionary 942 can include a mapping of keywords and/or phrases that may be used in CAP reports 110A-N that correspond to different types of negative conditions or issues. The dictionary 942 can be updated over time to add or remove keywords that are commonly used and/or likely to be used to describe various different conditions in the facility or group of facilities.

The engine 916 may also receive user input from the computing devices 104A-N, such as user-provided interventions, actions, and/or assessments of the conditions documented in the CAP reports 110A-N, to be used in continuously and iteratively training or improving any of the models 928A-N. Refer to block G (132) in FIG. 1, the process 200 in FIG. 2, and block 350 in the process 300 of FIGS. 3A-C for further discussion about training the models 928A-N.

The processor(s) 902 can be configured to execute instructions that cause the computer system 102 to perform the techniques described herein. The communication interface 918 can provide for the computer system 102 to communicate with one or more of the other components described herein across the network(s) 112.

The computing devices 104A-N can each include input devices 920A-N, output devices 922A-N, and a communication interface 926. The input devices 920A-N can include any type of device that can be used by a relevant user to provide user input at the computing devices 104A-N. For example, the input devices 920A-N can include but are not limited to keyboards, mice, touchscreens, and/or microphones. The output devices 922A-N can include any type of device for displaying and presenting information to the users at the computing devices 104A-N. The output devices 922A-N can include but are not limited to touchscreens, display screens, speakers, or other types of outputting devices. The output devices 922A-N can present, in GUI displays, for example, any of the GUIs described in reference to FIGS. 5-7. The communication interface 926 can provide for the computing devices 104A-N to communicate with one or more of the other components described herein across the network(s) 112.

Figure 10:
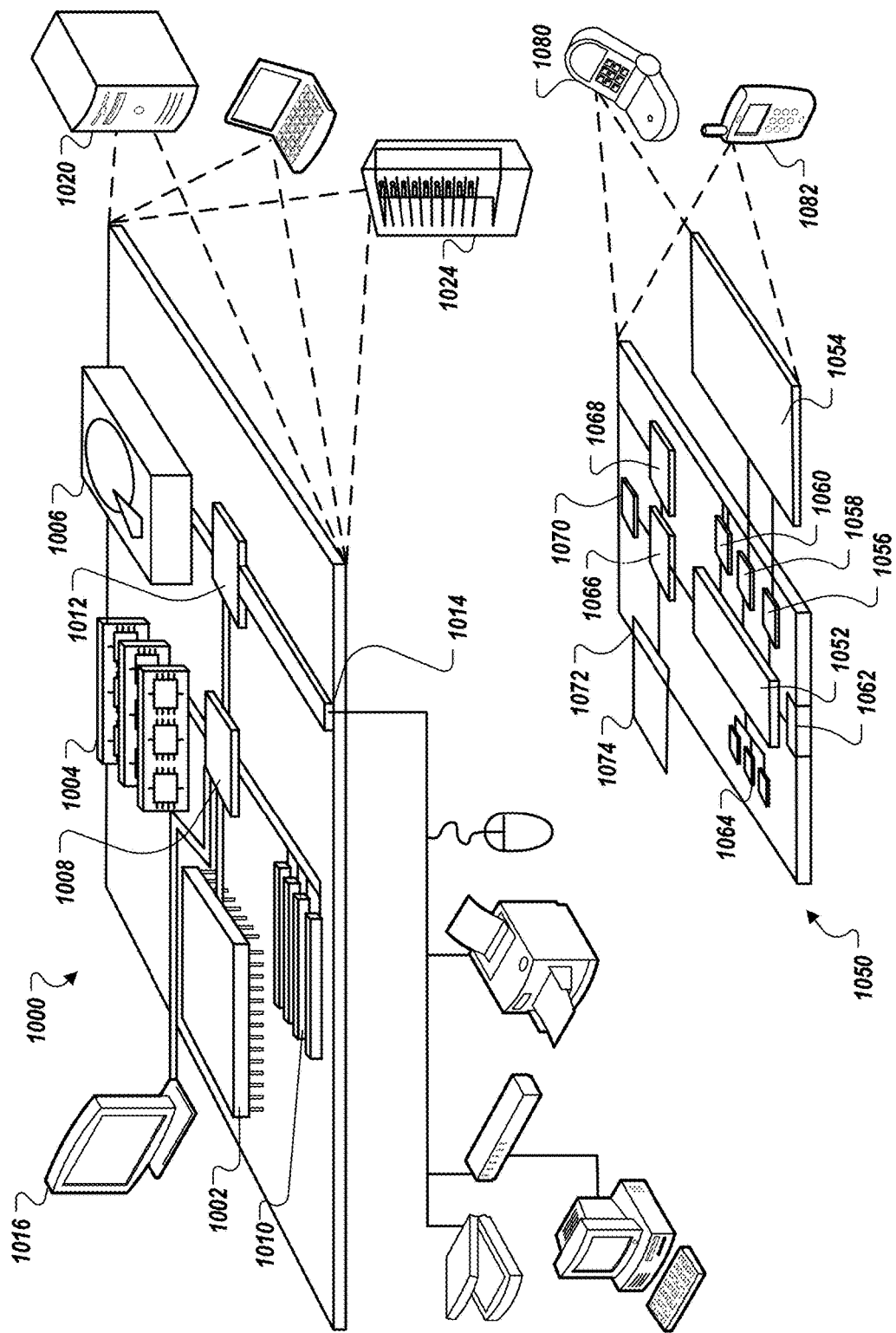
FIG. 10 is a schematic diagram that shows an example of a computing device and a mobile computing device.

FIG. 10 shows an example of a computing device 1000 and an example of a mobile computing device that can be used to implement the techniques described here. The computing device 1000 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1000 includes a processor 1002, a memory 1004, a storage device 1006, a high-speed interface 1008 connecting to the memory 1004 and multiple high-speed expansion ports 1010, and a low-speed interface 1012 connecting to a low-speed expansion port 1014 and the storage device 1006. Each of the processor 1002, the memory 1004, the storage device 1006, the high-speed interface 1008, the high-speed expansion ports 1010, and the low-speed interface 1012, are interconnected using various busses, and can be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as a display 1016 coupled to the high-speed interface 1008. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1004 stores information within the computing device 1000. In some implementations, the memory 1004 is a volatile memory unit or units. In some implementations, the memory 1004 is a non-volatile memory unit or units. The memory 1004 can also be another form of computer-readable medium, such as a magnetic or optical disk.

The storage device 1006 is capable of providing mass storage for the computing device 1000. In some implementations, the storage device 1006 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1004, the storage device 1006, or memory on the processor 1002.

The high-speed interface 1008 manages bandwidth-intensive operations for the computing device 1000, while the low-speed interface 1012 manages lower bandwidth-intensive operations. Such allocation of functions is exemplary only. In some implementations, the high-speed interface 1008 is coupled to the memory 1004, the display 1016 (e.g., through a graphics processor or accelerator), and to the high-speed expansion ports 1010, which can accept various expansion cards (not shown). In the implementation, the low-speed interface 1012 is coupled to the storage device 1006 and the low-speed expansion port 1014. The low-speed expansion port 1014, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1000 can be implemented in a number of different forms, as shown in the figure. For example, it can be implemented as a standard server 1020, or multiple times in a group of such servers. In addition, it can be implemented in a personal computer such as a laptop computer 1022. It can also be implemented as part of a rack server system 1024. Alternatively, components from the computing device 1000 can be combined with other components in a mobile device (not shown), such as a mobile computing device 1050. Each of such devices can contain one or more of the computing device 1000 and the mobile computing device 1050, and an entire system can be made up of multiple computing devices communicating with each other.

The mobile computing device 1050 includes a processor 1052, a memory 1064, an input/output device such as a display 1054, a communication interface 1066, and a transceiver 1068, among other components. The mobile computing device 1050 can also be provided with a storage device, such as a micro-drive or other device, to provide additional storage. Each of the processor 1052, the memory 1064, the display 1054, the communication interface 1066, and the transceiver 1068, are interconnected using various buses, and several of the components can be mounted on a common motherboard or in other manners as appropriate.

The processor 1052 can execute instructions within the mobile computing device 1050, including instructions stored in the memory 1064. The processor 1052 can be implemented as a chipset of chips that include separate and multiple analog and digital processors. The processor 1052 can provide, for example, for coordination of the other components of the mobile computing device 1050, such as control of user interfaces, applications run by the mobile computing device 1050, and wireless communication by the mobile computing device 1050.

The processor 1052 can communicate with a user through a control interface 1058 and a display interface 1056 coupled to the display 1054. The display 1054 can be, for example, a TFT (Thin-Film-Transistor Liquid Crystal Display) display or an OLED (Organic Light Emitting Diode) display, or other appropriate display technology. The display interface 1056 can comprise appropriate circuitry for driving the display 1054 to present graphical and other information to a user. The control interface 1058 can receive commands from a user and convert them for submission to the processor 1052. In addition, an external interface 1062 can provide communication with the processor 1052, so as to enable near area communication of the mobile computing device 1050 with other devices. The external interface 1062 can provide, for example, for wired communication in some implementations, or for wireless communication in other implementations, and multiple interfaces can also be used.

The memory 1064 stores information within the mobile computing device 1050. The memory 1064 can be implemented as one or more of a computer-readable medium or media, a volatile memory unit or units, or a non-volatile memory unit or units. An expansion memory 1074 can also be provided and connected to the mobile computing device 1050 through an expansion interface 1072, which can include, for example, a SIMM (Single In Line Memory Module) card interface. The expansion memory 1074 can provide extra storage space for the mobile computing device 1050, or can also store applications or other information for the mobile computing device 1050. Specifically, the expansion memory 1074 can include instructions to carry out or supplement the processes described above, and can include secure information also. Thus, for example, the expansion memory 1074 can be provide as a security module for the mobile computing device 1050, and can be programmed with instructions that permit secure use of the mobile computing device 1050. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1064, the expansion memory 1074, or memory on the processor 1052. In some implementations, the computer program product can be received in a propagated signal, for example, over the transceiver 1068 or the external interface 1062.

The mobile computing device 1050 can communicate wirelessly through the communication interface 1066, which can include digital signal processing circuitry where necessary. The communication interface 1066 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1068 using a radio-frequency. In addition, short-range communication can occur, such as using a Bluetooth, WiFi, or other such transceiver (not shown). In addition, a GPS (Global Positioning System) receiver module 1070 can provide additional navigation- and location-related wireless data to the mobile computing device 1050, which can be used as appropriate by applications running on the mobile computing device 1050.

The mobile computing device 1050 can also communicate audibly using an audio codec 1060, which can receive spoken information from a user and convert it to usable digital information. The audio codec 1060 can likewise generate audible sound for a user, such as through a speaker, e.g., in a handset of the mobile computing device 1050. Such sound can include sound from voice telephone calls, can include recorded sound (e.g., voice messages, music files, etc.) and can also include sound generated by applications operating on the mobile computing device 1050.

The mobile computing device 1050 can be implemented in a number of different forms, as shown in the figure. For example, it can be implemented as a cellular telephone 1080. It can also be implemented as part of a smart-phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A computing system for assessing conditions in a regulated facility, the system comprising:

one or more processors;

a data store;

and one or more storage devices storing instructions that, when executed by the one or more processors, cause the one or more processors to perform operations comprising:

training a plurality of models for analyzing corrective action program ("CAP") reports, wherein the training comprises:

training predictive machine learning models using historical data that classifies activities or issues identified in the CAP reports as occurrences of negative conditions in a group of regulated facilities, wherein the group of regulated facilities includes the regulated facility, training statistical machine learning models using the historical data to generate a probability distribution of the negative condition occurrences that is used to identify a likelihood for future activities or issues identified in the CAP reports as occurrences of negative conditions in the group of regulated facilities, training time-series machine learning models using the historical data to determine a likelihood of the negative condition occurrences identified in the CAP reports in the future in the group of regulated facilities based on a time-series of previously-observed negative condition occurrences, and storing the predictive machine learning models, the statistical machine learning models, and the time-series machine learning models in the data store;

receiving a corrective action program ("CAP") report from a computing device, the CAP report including structured and unstructured user-inputted information documenting a user-identified condition in the regulated facility;

extracting condition evaluation information from the CAP report based on the structured and unstructured user-inputted information included in the CAP report to identify details regarding the condition in the regulated facility;

retrieving the plurality of models from the data store, wherein each of the plurality of models is configured to use different portions of the conditions evaluation information to automatically assess different aspects of conditions in the regulated facility;

applying different portions of the extracted condition evaluation information to each of the plurality of models to generate a plurality of assessments related to the condition in the regulated facility, wherein each of the plurality of assessments includes a corresponding confidence value indicating a degree of certainty regarding an assessment's accuracy, wherein applying the predictive machine learning models comprises applying stacking heuristics to determine an order for applying the predictive machine learning models to the condition evaluation information, wherein applying the predictive machine learning models based on applying the stacking heuristics comprises applying the predictive machine learning models in the following order: applying a maintenance rules model, applying an aging management model, applying a priority model, applying a criticality model, applying a disposition model, and applying an actions model;

determining at least one recommendation related to the condition in the regulated facility based on the plurality of assessments and the corresponding confidence values;

generating output for the condition that includes the at least one recommendation;

transmitting the output to at least the computing device, for presentation in a graphical user interface (GUI) display of the computing device;

receiving, from the computing device in response to presentation of the output in the GUI display of the computing device, user input indicating an action to be taken with regard to the condition; automatically executing the action based on the user input; and iteratively training the plurality of models based on the extracted condition evaluation information from the CAP report and a comparison of the output and the user input, wherein the iterative training causes mappings within the plurality of models to fine-tune associations between the extracted evaluation information from the CAP reports and the output based on the action indicated by the user input.

2. The computing system of claim 1, wherein applying different portions of the extracted condition evaluation information to each of the plurality of models to generate a plurality of assessments related to the condition in the regulated facility comprises determining a criticality value for the condition based on at least one of (i) identifying keywords in the condition evaluation information that satisfy keyword criteria and (ii) determining a word count for the user-inputted information in at least one data input field in the CAP report that exceeds a threshold word count.

3. The computing system of claim 2, wherein applying different portions of the extracted condition evaluation information to each of the plurality of models to generate a plurality of assessments related to the condition in the regulated facility comprises determining a severity level based at least in part on the determined criticality value.

4. The computing system of claim 1, wherein extracting condition evaluation information from the CAP report comprises applying a model to the CAP report that was trained to identify keywords in one or more data input fields in the CAP report, wherein identifying the keywords includes identifying text values in the data input fields that match keywords stored in a dictionary of keywords, wherein the condition evaluation information includes the identified keywords.

5. The computing system of claim 1, wherein applying the plurality of models comprises applying the models in series.

6. The computing system of claim 1, wherein the plurality of models include at least one of a management of change model, a close to actions taken model, and a close to trend model.

7. The computing system of claim 1, wherein applying different portions of the extracted condition evaluation information to each of the plurality of models to generate a plurality of assessments related to the condition in the regulated facility comprises:

providing a portion of the condition evaluation information as input to the priority model, wherein the priority model was trained to estimate and assign a priority level for the condition documented in the CAP report, wherein the priority level is at least one of "C" indicating low priority, "uncertain," or "A/B," indicating high priority, wherein the portion of the condition evaluation information includes at least: a word count of an issue-notes-text data input field in the CAP report, an indication of item-functions-passive-equipment or item-functions-active-equipment in an item-function data input field in the CAP report, a word count of a condition-text data input field in the CAP report, and a word count of an issue-text data input field in the CAP report;

and receiving, as output from the priority model, the assigned priority level with the corresponding confidence value.

8. The computing system of claim 1, wherein applying different portions of the extracted condition evaluation information to each of the plurality of models to generate a plurality of assessments related to the condition in the regulated facility comprises:

providing a portion of the condition evaluation information as input to a condition-adverse-to-quality (CAQ) model, wherein the CAQ model was trained to estimate and assign a safety risk level for the condition documented in the CAP report, wherein the safety risk level is at least one of "CAQ" indicating a high safety risk, "uncertain," or "NCAQ," indicating a low safety risk, wherein the portion of the condition evaluation information includes at least: an indication of item-functions-passive-equipment or item-functions-active-equipment in an item-function data input field in the CAP report, a word count of an operational-notes-text data input field in the CAP report, an indication of whether the condition was reviewed by a senior actor operator (SRO) in a reviewed-by-SRO data input field in the CAP report, and an equipment-type-description in an equipment-type-description data input field in the CAP report; and receiving, as output from the CAQ model, the assigned safety risk level with the corresponding confidence value.

9. The computing system of claim 1, wherein applying different portions of the extracted condition evaluation information to each of the plurality of models to generate a plurality of assessments related to the condition in the regulated facility comprises:

providing a portion of the condition evaluation information as input to a maintenance (MN/MO) model, wherein the MN/MO model was trained to assign a maintenance notification recommendation for the condition documented in the CAP report, wherein the maintenance notification recommendation is at least one of "Y" indicating that a notification should be recommended, "uncertain," or "N," indicating that the notification should not be recommended, wherein the portion of the condition evaluation information includes at least: a system description in a system-description data input field in the CAP report, an equipment-type-description in an equipment-type-description data input field in the CAP report, and a word count of the recommendation-text data input field; and receiving, as output from the MN/MO model, the assigned maintenance notification recommendation with the corresponding confidence value.

10. The computing system of claim 1, wherein applying different portions of the extracted condition evaluation information to each of the plurality of models to generate a plurality of assessments related to the condition in the regulated facility comprises:
providing a portion of the condition evaluation information as input to a management-of-change (MOC) model, wherein the MOC model was trained to assign a change in process recommendation for the condition documented in the CAP report, wherein the change in process recommendation level is at least one of "Y" indicating a recommendation to close to MOC (CTMOC), "uncertain," or "N," indicating a recommendation not to CTMOC, wherein the portion of the condition evaluation information includes at least: a word count of a recommendation-text data input field in the CAP report, a word "repair" in the recommendation-text data input field in the CAP report, a system description in a system-description data input field in the CAP report, and an equipment-type-description in an equipment-type-description data input field in the CAP report; and
receiving, as output from the MOC model, the assigned change in process recommendation with the corresponding confidence value.

11. The computing system of claim 1, wherein applying different portions of the extracted condition evaluation information to each of the plurality of models to generate a plurality of assessments related to the condition in the regulated facility comprises:
providing a portion of the condition evaluation information as input to a close to trend (CTT) model, wherein the CTT model was trained to assign a CTT recommendation for the condition documented in the CAP report, wherein the condition is identified as a not-condition-adverse-to-quality (NCAQ) condition, wherein the CTT recommendation level is at least one of "OTHA" indicating a recommendation to take action on the NCAQ condition, "uncertain," or "CTT," indicating a recommendation to not take action on the NCAQ condition, wherein the portion of the condition evaluation information includes at least: a system description in a system-description data input field in the CAP report and a word count of a recommendation-text data input field in the CAP report; and
receiving, as output from the CTT model, the assigned CTT recommendation with the corresponding confidence value.

12. The computing system of claim 1, wherein applying different portions of the extracted condition evaluation information to each of the plurality of models to generate a plurality of assessments related to the condition in the regulated facility comprises:
providing a portion of the condition evaluation information as input to a close-to-actions-taken (CTAT) model, wherein the CTAT model was trained to assign a CTAT recommendation based on predicting whether the condition documented in the CAP report has already been closed to actions, wherein the CTAT recommendation is at least one of "Y" indicating that the condition has already been closed to actions, "uncertain," or "N," indicating that the condition has not yet been closed to actions, wherein the portion of the condition evaluation information includes at least: a system description in a system-description data input field in the CAP report, a word count of an action-text data input field in the CAP report, a word count of a recommendation-text data input field in the CAP report, and a determination of whether the condition is in-operable and non-functional; and
receiving, as output from the CTAT model, the assigned CTAT recommendation with the corresponding confidence value.

13. The computing system of claim 1, wherein applying different portions of the extracted condition evaluation information to each of the plurality of models to generate a plurality of assessments related to the condition in the regulated facility comprises:
providing a portion of the condition evaluation information as input to an evaluation model, wherein the evaluation model was trained to assign an additional evaluation recommendation for the condition documented in the CAP report based on determining whether the condition requires additional evaluation, wherein the condition is identified as a condition-adverse-to-quality (CAQ) or significant-condition-adverse-to-quality (SCAQ) condition, wherein the additional evaluation recommendation is at least one of "Y" indicating that the additional evaluation is recommended for either the CAQ or SCAQ condition, "uncertain," or "N," indicating that the additional evaluation is not recommended for either the CAQ or SCAQ condition, wherein the portion of the condition evaluation information includes at least: a word count of a recommendation-text data input field in the CAP report, a word count of a condition-text data input field in the CAP report, and a word count of an issue-notes-text data input field in the CAP report; and
receiving, as output from the evaluation model, the assigned additional evaluation recommendation with the corresponding confidence value.

14. The computing system of claim 1, wherein applying different portions of the extracted condition evaluation information to each of the plurality of models to generate a plurality of assessments related to the condition in the regulated facility comprises:
providing a portion of the condition evaluation information as input to a maintenance-rules-evaluation (MRE) model, wherein the MRE model was trained to assign an MRE recommendation for the condition documented in the CAP report, wherein the MRE recommendation is at least one of "Y" indicating a recommendation to perform an MRE, "uncertain," or "N," indicating a recommendation to not perform the MRE, wherein the portion of the condition evaluation information includes at least: a word count of an operational-notes-text data input field in the CAP report, an indication of whether the condition is occurring on safety-related equipment in a safety-related-equipment data input field in the CAP report, a count of maintenance notifications in a maintenance-notifications-count data input field in the CAP report, and a word count of a condition-text data input field in the CAP report; and
receiving, as output from the MRE model, the assigned MRE recommendation with the corresponding confidence value.

15. The computing system of claim 1, wherein applying different portions of the extracted condition evaluation information to each of the plurality of models to generate a plurality of assessments related to the condition in the regulated facility comprises:

provide a portion of the condition evaluation information as input to the aging management model, wherein the aging management model was trained to assign an Aging Management Program (AMP) action recommendation for the condition documented in the CAP report, wherein the AMP action recommendation is at least one of "Y" indicating a recommendation to perform an AMP action, "uncertain," or "N," indicating a recommendation to not perform the AMP action, wherein the portion of the condition evaluation information includes at least: a word count of a condition-text data input field in the CAP report, a word count of an action-text data input field in the CAP report, a senior actor operator (SRO) operability determination of operable and functional in an operability-determination data input field in the CAP report, and an equipment-type-description in an equipment-type-description data input field in the CAP report;

and receiving, as output from the aging management model, the assigned AMP action recommendation with the corresponding confidence value.

16. The computing system of claim 1, wherein applying different portions of the extracted condition evaluation information to each of the plurality of models to generate a plurality of assessments related to the condition in the regulated facility comprises determining whether the condition involves at least one maintenance rule and generating the corresponding confidence value above a threshold value based on a determination that the condition involves the at least one maintenance rule.

17. The computing system of claim 1, wherein applying different portions of the extracted condition evaluation information to each of the plurality of models to generate a plurality of assessments related to the condition in the regulated facility comprises determining aging management data for the condition and generating the corresponding confidence value above a threshold value based on a determination that the aging management data about the condition satisfies aging management criteria.

18. The computing system of claim 1, wherein applying different portions of the extracted condition evaluation information to each of the plurality of models to generate a plurality of assessments related to the condition in the regulated facility comprises determining a severity value for the condition based on identifying the user-inputted information in a data input field in the CAP report that corresponds to a severity metric.

19. The computing system of claim 1, wherein applying different portions of the extracted condition evaluation information to each of the plurality of models to generate a plurality of assessments related to the condition in the regulated facility comprises determining one or more corrective actions to be taken in response to the condition in the CAP report, wherein the corrective actions are determined based on output from at least one of the plurality of models.

20. The computing system of claim 1, wherein applying different portions of the extracted condition evaluation information to each of the plurality of models to generate a plurality of assessments related to the condition in the regulated facility comprises determining at least one user to assign the condition or at least one action associated with the condition based on a process comprising:

identifying a role associated with the condition or the at least one action;

retrieving roles data from a human resources system for defined roles in the regulated facility;

mapping the identified role associated with the condition or the at least one action with a role in the roles data;

identifying, based on the roles data and the mapping, a user in the regulated facility to assign the condition or the at least one action associated with the condition; and transmitting a notification to a computing device of the identified user that, when presented in a GUI display of the computing device of the identified user, causes the computing device to display information about the condition, and the role assignment for the identified user.

21. The computing system of claim 1, wherein automatically executing the action based on the user input comprises iteratively training at least one model in the plurality of models based on the user input.

22. The computing system of claim 1, wherein automatically executing the action based on the user input comprises assigning actions associated with the condition to one or more groups, teams, or users in the regulated facility and transmitting information representing the assigned actions to computing devices of the one or more groups, teams, or users.

23. The computing system of claim 1, wherein transmitting the output to at least the computing device, for presentation in a graphical user interface (GUI) display of the computing device causes the computing device to present, in the GUI display, the at least one recommendation for review by a user of the computing device.

24. The computing system of claim 1, wherein transmitting the output to at least the computing device, for presentation in a graphical user interface (GUI) display of the computing device causes the computing device to present, in the GUI display, instructions to guide a user of the computing device to perform one or more corrective actions in the at least one recommendation.

25. The computing system of claim 1, the operations further comprising performing an evaluation process of each of the plurality of models, wherein the evaluation process comprises:

providing quality assurance check test cases to the model, wherein the test cases measure accuracy of the model in identifying signals, issues, or conditions in the CAP report;

determining whether the model passes a threshold quantity of the test cases; and based on determining that the model does not pass the threshold quantity of the test cases, iteratively training the model.

* * * * *